United States Patent
Sharma et al.

(10) Patent No.: US 10,896,307 B2
(45) Date of Patent: Jan. 19, 2021

(54) GENERATING AND READING OPTICAL CODES WITH VARIABLE DENSITY TO ADAPT FOR VISUAL QUALITY AND RELIABILITY

(71) Applicant: Digimarc Corporation, Beaverton, OR (US)

(72) Inventors: Ravi K. Sharma, Portland, OR (US); Tomas Denemark, Beaverton, OR (US); Brett A. Bradley, Portland, OR (US); Geoffrey B. Rhoads, West Linn, OR (US); John F. Stach, Portland, OR (US); Joel R. Meyer, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 118 days.

(21) Appl. No.: 16/002,989

(22) Filed: Jun. 7, 2018

(65) Prior Publication Data

US 2019/0171856 A1 Jun. 6, 2019

Related U.S. Application Data

(60) Provisional application No. 62/673,738, filed on May 18, 2018, provisional application No. 62/670,562, (Continued)

(51) Int. Cl.
*G06K 7/10* (2006.01)
*G06K 9/36* (2006.01)
(Continued)

(52) U.S. Cl.
CPC ..... *G06K 7/1417* (2013.01); *G06K 19/06037* (2013.01); *G06K 19/06103* (2013.01)

(58) Field of Classification Search
CPC ....... G06T 1/0028; G06T 1/0021; G06T 5/10; G06T 9/00; G06T 9/007; G06T 5/002;
(Continued)

(56) References Cited

U.S. PATENT DOCUMENTS 3,628,271 A 12/1971 Carrell
5,206,490 A 4/1993 Petigrew
(Continued)

FOREIGN PATENT DOCUMENTS

EP 0638614 A1 2/1995
EP 1367810 A2 12/2003
(Continued)

OTHER PUBLICATIONS

Chapter II demand in PCT/US2019/019410 (published as WO2019165364), dated Sep. 23, 2019, including earlier Article 19 amendments.
(Continued)

*Primary Examiner* — Thien T Mai
(74) *Attorney, Agent, or Firm* — Digimarc Corporation

(57) ABSTRACT

The parameters of an optical code are optimized to achieve improved signal robustness, reliability, capacity and/or visual quality. An optimization program can determine spatial density, dot distance, dot size and signal component priority to optimize robustness. An optical code generator employs these parameters to produce an optical code at the desired spatial density and robustness. The optical code is merged into a host image, such as imagery, text and graphics of a package or label, or it may be printed by itself, e.g., on an otherwise blank label or carton. A great number of other features and arrangements are also detailed.

22 Claims, 53 Drawing Sheets

Related U.S. Application Data filed on May 11, 2018, provisional application No. 62/659,641, filed on Apr. 18, 2018, provisional application No. 62/634,898, filed on Feb. 25, 2018, provisional application No. 62/582,871, filed on Nov. 7, 2017.

(51) Int. Cl.
  *G06K 9/80* (2006.01)
  *G06K 7/14* (2006.01)
  *G06K 19/06* (2006.01)

(58) Field of Classification Search
  CPC .. G06T 7/136; G06T 1/20; G06T 1/60; G06T 3/4092; G06T 11/40; G06T 15/005; G06T 15/04; G06T 3/4007; G06T 3/4015; H04N 1/4051; H04N 19/90; G06K 19/06037; G06K 19/06103; G06K 2009/366; G06K 7/10722; G06K 7/10811; G06K 7/1434; G06K 9/00; G06K 9/00288; G06K 9/00463; G06K 9/00476; G06K 9/00684; G06K 9/00986; G06K 9/348; G06K 9/38; G06K 9/4652; G06K 9/6267; G06K 9/6284
  See application file for complete search history.

(56) References Cited

U.S. PATENT DOCUMENTS

| | | |
|---|---|---|
| 5,329,108 A | 7/1994 | Lamoure |
| 5,383,995 A | 1/1995 | Phillips |
| 5,396,559 A | 3/1995 | McGrew |
| 5,416,312 A | 5/1995 | Lamoure |
| 5,444,779 A | 8/1995 | Daniele |
| 5,453,605 A | 9/1995 | Hecht |
| 5,481,377 A | 1/1996 | Udagawa |
| 5,492,222 A | 2/1996 | Weaver |
| 5,521,372 A | 5/1996 | Hecht |
| 5,542,971 A | 8/1996 | Auslander |
| 5,576,532 A | 11/1996 | Hecht |
| 5,636,292 A | 6/1997 | Rhoads |
| 5,745,604 A | 4/1998 | Rhoads |
| 5,752,152 A | 5/1998 | Gasper |
| 5,790,703 A | 8/1998 | Wang |
| 5,809,139 A * | 9/1998 | Girod ................... G06T 1/0035 375/E7.026 |
| 5,832,119 A | 11/1998 | Rhoads |
| 5,843,564 A | 12/1998 | Gasper |
| 5,859,920 A | 1/1999 | Daly |
| 5,862,260 A | 1/1999 | Rhoads |
| 5,919,730 A | 7/1999 | Gasper |
| 5,998,609 A | 12/1999 | Aoki |
| 6,011,857 A | 1/2000 | Sowell |
| 6,060,428 A | 5/2000 | Chang |
| 6,076,738 A | 6/2000 | Bloomberg |
| 6,122,392 A | 9/2000 | Rhoads |
| 6,122,403 A | 9/2000 | Rhoads |
| 6,149,719 A | 11/2000 | Houle |
| 6,168,081 B1 | 1/2001 | Urano |
| 6,177,683 B1 | 1/2001 | Kolesar |
| 6,246,778 B1 | 6/2001 | Moore |
| 6,345,104 B1 | 2/2002 | Rhoads |
| 6,361,916 B1 | 3/2002 | Chen |
| 6,373,965 B1 | 4/2002 | Liang |
| 6,441,380 B1 | 8/2002 | Lawandy |
| 6,449,377 B1 | 9/2002 | Rhoads |
| 6,456,729 B1 | 9/2002 | Moore |
| 6,522,767 B1 | 2/2003 | Moskowitz |
| 6,567,532 B1 | 5/2003 | Honsinger |
| 6,567,534 B1 | 5/2003 | Rhoads |
| 6,590,996 B1 | 7/2003 | Reed |
| 6,603,864 B1 | 8/2003 | Matsunoshita |
| 6,614,914 B1 | 9/2003 | Rhoads |
| 6,625,297 B1 | 9/2003 | Bradley |
| 6,683,966 B1 | 1/2004 | Tian |
| 6,692,031 B2 | 2/2004 | McGrew |
| 6,694,041 B1 | 2/2004 | Brunk |
| 6,698,860 B2 | 3/2004 | Berns |
| 6,706,460 B1 | 3/2004 | Williams |
| 6,718,046 B2 | 4/2004 | Reed |
| 6,723,121 B1 | 4/2004 | Zhong |
| 6,760,464 B2 | 7/2004 | Brunk |
| 6,775,391 B2 | 8/2004 | Hosaka |
| 6,775,394 B2 | 8/2004 | Yu |
| 6,786,397 B2 | 9/2004 | Silverbrook |
| 6,804,377 B2 | 10/2004 | Reed |
| 6,829,063 B1 | 12/2004 | Allebach |
| 6,839,450 B2 | 1/2005 | Yen |
| 6,912,674 B2 | 6/2005 | Trelewicz |
| 6,914,699 B1 * | 7/2005 | Takata ................... G06T 5/10 358/1.9 |
| 6,940,993 B2 | 9/2005 | Jones |
| 6,947,571 B1 | 9/2005 | Rhoads |
| 6,961,442 B2 | 11/2005 | Hannigan |
| 6,987,861 B2 | 1/2006 | Rhoads |
| 6,993,152 B2 | 1/2006 | Patterson |
| 6,995,859 B1 | 2/2006 | Silverbrook |
| 6,996,252 B2 | 2/2006 | Reed |
| 7,072,490 B2 | 7/2006 | Stach |
| 7,076,082 B2 | 7/2006 | Sharma |
| 7,114,657 B2 | 10/2006 | Auslander |
| 7,152,021 B2 | 12/2006 | Alattar |
| 7,218,750 B1 | 5/2007 | Hiraishi |
| 7,231,061 B2 | 6/2007 | Bradley |
| 7,280,672 B2 | 10/2007 | Powell |
| 7,321,667 B2 | 1/2008 | Stach |
| 7,340,076 B2 | 3/2008 | Stach |
| 7,352,878 B2 | 4/2008 | Reed |
| 7,412,072 B2 | 8/2008 | Sharma |
| 7,529,385 B2 | 5/2009 | Lawandy |
| 7,532,741 B2 | 5/2009 | Stach |
| 7,536,553 B2 | 5/2009 | Auslander |
| 7,555,139 B2 | 6/2009 | Rhoads |
| 7,559,983 B2 | 7/2009 | Starling |
| 7,684,088 B2 | 3/2010 | Jordan |
| 7,721,879 B2 | 5/2010 | Weaver |
| 7,738,673 B2 | 6/2010 | Reed |
| 7,757,952 B2 | 7/2010 | Tuschel |
| 7,800,785 B2 | 9/2010 | Bala |
| 7,831,062 B2 | 11/2010 | Stach |
| 7,856,143 B2 | 12/2010 | Abe |
| 7,892,338 B2 | 2/2011 | Degott |
| 7,926,730 B2 | 4/2011 | Auslander |
| 7,965,862 B2 | 6/2011 | Jordan |
| 7,986,807 B2 | 7/2011 | Stach |
| 8,009,893 B2 | 8/2011 | Rhoads |
| 8,064,100 B2 | 11/2011 | Braun |
| 8,144,368 B2 | 3/2012 | Rodriguez |
| 8,157,293 B2 | 4/2012 | Bhatt |
| 8,159,657 B2 | 4/2012 | Degott |
| 8,180,174 B2 | 5/2012 | Di |
| 8,194,919 B2 | 6/2012 | Rodriguez |
| 8,223,380 B2 | 7/2012 | Lapstun |
| 8,227,637 B2 | 7/2012 | Cohen |
| 8,301,893 B2 | 10/2012 | Brundage |
| 8,345,315 B2 | 1/2013 | Sagan |
| 8,360,323 B2 | 1/2013 | Widzinski |
| 8,412,577 B2 | 4/2013 | Rodriguez |
| 8,515,121 B2 | 8/2013 | Stach |
| 8,593,696 B2 | 11/2013 | Picard |
| 8,620,021 B2 | 12/2013 | Knudson |
| 8,675,987 B2 | 3/2014 | Agarwaia |
| 8,687,839 B2 | 4/2014 | Sharma |
| 8,699,089 B2 | 4/2014 | Eschbach |
| 8,730,527 B2 | 5/2014 | Chapman |
| 8,805,110 B2 | 8/2014 | Rodriguez |
| 8,840,029 B2 | 9/2014 | Lawandy |
| 8,867,782 B2 | 10/2014 | Kurtz |
| 8,879,735 B2 | 11/2014 | Lord |
| 8,913,299 B2 | 12/2014 | Picard |
| 8,947,744 B2 | 2/2015 | Kurtz |
| 9,008,315 B2 | 4/2015 | Lord |

(56) References Cited

U.S. PATENT DOCUMENTS

| | | | |
|---|---|---|---|
| 9,013,501 B2 | 4/2015 | Scheibe |
| 9,055,239 B2 | 6/2015 | Tehranchi |
| 9,064,228 B2 | 6/2015 | Woerz |
| 9,070,132 B1 | 6/2015 | Durst |
| 9,087,376 B2 | 7/2015 | Rodriguez |
| 9,269,022 B2 | 2/2016 | Rhoads |
| 9,275,428 B2 | 3/2016 | Chapman |
| 9,319,557 B2 | 4/2016 | Chapman |
| 9,380,186 B2 | 6/2016 | Reed |
| 9,400,951 B2 | 7/2016 | Yoshida |
| 9,401,001 B2 | 7/2016 | Reed |
| 9,449,357 B1 | 9/2016 | Lyons |
| 9,562,998 B2 | 2/2017 | Edmonds |
| 9,593,982 B2 | 3/2017 | Rhoads |
| 9,635,378 B2 | 4/2017 | Holub |
| 9,690,967 B1 | 6/2017 | Brundage |
| 9,747,656 B2 | 8/2017 | Stach |
| 9,749,607 B2 | 8/2017 | Boles |
| 9,754,341 B2 | 9/2017 | Falkenstern |
| 10,223,560 B2 | 3/2019 | Boles |
| 10,304,151 B2 | 5/2019 | Falkenstern |
| 10,424,038 B2 | 9/2019 | Holub |
| 2001/0037455 A1 | 11/2001 | Lawandy |
| 2002/0054356 A1 | 5/2002 | Kurita |
| 2002/0080396 A1 | 6/2002 | Silverbrook |
| 2002/0085736 A1 | 7/2002 | Kalker |
| 2002/0136429 A1 | 9/2002 | Stach |
| 2002/0147910 A1 | 10/2002 | Brundage |
| 2002/0169962 A1 | 11/2002 | Brundage |
| 2003/0005304 A1 | 1/2003 | Lawandy |
| 2003/0012548 A1 | 1/2003 | Levy |
| 2003/0021437 A1 | 1/2003 | Hersch |
| 2003/0039376 A1* | 2/2003 | Stach .................. G06T 1/0028 382/100 |
| 2003/0053654 A1 | 3/2003 | Patterson |
| 2003/0063319 A1 | 4/2003 | Umeda |
| 2003/0116747 A1 | 6/2003 | Lem |
| 2003/0156733 A1 | 8/2003 | Zeller |
| 2003/0174863 A1 | 9/2003 | Brundage |
| 2004/0023397 A1 | 2/2004 | Vig |
| 2004/0032972 A1* | 2/2004 | Stach .................. G06T 1/0021 382/104 |
| 2004/0046032 A1 | 3/2004 | Urano |
| 2004/0146177 A1 | 7/2004 | Kalker |
| 2004/0149830 A1 | 8/2004 | Allen |
| 2005/0127176 A1 | 6/2005 | Dickinson |
| 2006/0022059 A1 | 2/2006 | Juds |
| 2006/0078159 A1 | 4/2006 | Hamatake |
| 2006/0115110 A1 | 6/2006 | Rodriguez |
| 2006/0147082 A1 | 7/2006 | Jordan |
| 2006/0165311 A1 | 7/2006 | Watson |
| 2007/0102920 A1 | 5/2007 | Bi |
| 2007/0152032 A1 | 7/2007 | Tuschel |
| 2007/0152056 A1 | 7/2007 | Tuschel |
| 2007/0210164 A1 | 9/2007 | Conlon |
| 2007/0221732 A1 | 9/2007 | Tuschel |
| 2007/0262154 A1 | 11/2007 | Zazzu |
| 2007/0262579 A1 | 11/2007 | Bala |
| 2008/0112590 A1 | 5/2008 | Stach |
| 2008/0149820 A1 | 6/2008 | Jordan |
| 2008/0159615 A1 | 7/2008 | Rudaz |
| 2008/0164689 A1 | 7/2008 | Jordan |
| 2008/0277626 A1 | 11/2008 | Yang |
| 2009/0018996 A1 | 1/2009 | Hunt |
| 2009/0040022 A1 | 2/2009 | Finkenzeller |
| 2009/0059299 A1 | 3/2009 | Yoshida |
| 2009/0129592 A1 | 5/2009 | Swiegers |
| 2009/0158318 A1 | 6/2009 | Levy |
| 2009/0266877 A1 | 10/2009 | Vonwiller |
| 2010/0025476 A1 | 2/2010 | Widzinski |
| 2010/0048242 A1 | 2/2010 | Rhoads |
| 2010/0062194 A1 | 3/2010 | Sun |
| 2010/0080471 A1* | 4/2010 | Haas .................. H04N 1/32213 382/217 |
| 2010/0119108 A1 | 5/2010 | Rhoads |
| 2010/0150434 A1 | 6/2010 | Reed |
| 2010/0317399 A1 | 12/2010 | Rodriguez |
| 2011/0007092 A1 | 1/2011 | Ihara |
| 2011/0008606 A1 | 1/2011 | Sun |
| 2011/0051989 A1 | 3/2011 | Gao |
| 2011/0085209 A1 | 4/2011 | Man |
| 2011/0111210 A1 | 5/2011 | Matsunami |
| 2011/0127331 A1 | 6/2011 | Zhao |
| 2011/0214044 A1 | 9/2011 | Davis |
| 2011/0249051 A1 | 10/2011 | Chretien |
| 2011/0249332 A1 | 10/2011 | Merrill |
| 2011/0255163 A1 | 10/2011 | Merrill |
| 2012/0014557 A1 | 1/2012 | Reed |
| 2012/0065313 A1 | 3/2012 | Demartin |
| 2012/0074220 A1 | 3/2012 | Rodriguez |
| 2012/0078989 A1 | 3/2012 | Sharma |
| 2012/0133954 A1 | 5/2012 | Takabayashi |
| 2012/0205435 A1 | 8/2012 | Woerz |
| 2012/0214515 A1 | 8/2012 | Davis |
| 2012/0218608 A1 | 8/2012 | Maltz |
| 2012/0224743 A1 | 9/2012 | Rodriguez |
| 2012/0229467 A1 | 9/2012 | Czerwinski |
| 2012/0243797 A1 | 9/2012 | Di |
| 2012/0275642 A1 | 11/2012 | Aller |
| 2012/0311623 A1 | 12/2012 | Davis |
| 2013/0001313 A1 | 1/2013 | Denniston, Jr. |
| 2013/0114876 A1 | 5/2013 | Rudaz |
| 2013/0223673 A1 | 8/2013 | Davis |
| 2013/0259297 A1 | 10/2013 | Knudson |
| 2013/0260727 A1 | 10/2013 | Knudson |
| 2013/0286443 A1 | 10/2013 | Massicot |
| 2013/0329006 A1 | 12/2013 | Boles |
| 2013/0335783 A1 | 12/2013 | Kurtz |
| 2014/0022603 A1 | 1/2014 | Eschbach |
| 2014/0052555 A1 | 2/2014 | MacIntosh |
| 2014/0084069 A1 | 3/2014 | Mizukoshi |
| 2014/0108020 A1 | 4/2014 | Sharma |
| 2014/0245463 A1 | 8/2014 | Suryanarayanan |
| 2014/0293091 A1 | 10/2014 | Rhoads |
| 2014/0325656 A1 | 10/2014 | Sallam |
| 2014/0339296 A1 | 11/2014 | McAdams |
| 2015/0071485 A1 | 3/2015 | Rhoads |
| 2015/0156369 A1 | 6/2015 | Reed |
| 2015/0187039 A1 | 7/2015 | Reed |
| 2015/0269617 A1 | 9/2015 | Mikurak |
| 2015/0286873 A1 | 10/2015 | Davis |
| 2015/0317923 A1 | 11/2015 | Edmonds |
| 2016/0000141 A1 | 1/2016 | Nappi |
| 2016/0026853 A1 | 1/2016 | Wexler |
| 2016/0180207 A1 | 6/2016 | Rodriguez |
| 2016/0196630 A1 | 7/2016 | Blesser |
| 2016/0217546 A1 | 7/2016 | Ryu |
| 2016/0217547 A1 | 7/2016 | Stach |
| 2016/0225116 A1 | 8/2016 | Tehranchi |
| 2016/0267620 A1 | 9/2016 | Calhoon |
| 2016/0275639 A1 | 9/2016 | Holub |
| 2017/0024840 A1 | 1/2017 | Holub |
| 2017/0024845 A1 | 1/2017 | Filler |
| 2017/0230533 A1 | 8/2017 | Holub |
| 2018/0068463 A1 | 3/2018 | Risser |
| 2018/0082407 A1 | 3/2018 | Rymkowski |
| 2018/0082715 A1 | 3/2018 | Rymkowski |
| 2018/0150947 A1 | 5/2018 | Lu |
| 2018/0158224 A1 | 6/2018 | Bethge |
| 2018/0189619 A1 | 7/2018 | Garak |
| 2018/0211157 A1 | 7/2018 | Liu |
| 2018/0285679 A1 | 10/2018 | Amitay |
| 2018/0357800 A1 | 12/2018 | Oxholm |
| 2018/0373999 A1 | 12/2018 | Xu |
| 2019/0139176 A1 | 5/2019 | Stach |
| 2019/0213705 A1 | 7/2019 | Kamath |
| 2019/0266369 A1 | 8/2019 | Boles |

FOREIGN PATENT DOCUMENTS

| | | |
|---|---|---|
| EP | 1370062 A1 | 12/2003 |
| EP | 3016062 A1 | 5/2016 |
| JP | 2017073696 A | 4/2017 |
| WO | 2006048368 | 5/2006 |

(56) References Cited

FOREIGN PATENT DOCUMENTS

| WO | 2010075363 | 7/2010 |
| --- | --- | --- |
| WO | 2011029845 | 3/2011 |
| WO | 2011029845 A2 | 3/2011 |
| WO | 2015077493 A1 | 5/2015 |
| WO | 2016153911 A1 | 9/2016 |
| WO | 2016153936 | 9/2016 |
| WO | 2018111786 | 6/2018 |

OTHER PUBLICATIONS

Written opinion by IPEA in PCT/US2019/019410 (published as WO2019165364), dated Feb. 11, 2020.
Reply to written opinion of IPEA in PCT/US2019/019410 (published as WO2019165364), dated Apr. 7, 2020.
Ando, et al, Image Recognition Based Digital Watermarking Technology for Item Retrieval in Convenience Stores, NTT Technical Review, vol. 15, No. 8, Aug. 2017.
Katayama, et al, New High-speed Frame Detection Method: Side Trace Algorithm (STA) for i-appli on Cellular Phones to Detect Watermarks, Proceedings of the ACM 3rd International Conference on Mobile and Ubiquitous Multimedia, pp. 109-116, 2004.
Japanese Patent Application JP2017022489, with machine translation, Jan. 26, 2017.
Japanese Patent Application JP2017183948, with machine translation, Oct. 5, 2017.
Nakamura, et al, Fast Watermark Detection Scheme for Camera-Equipped Cellular Phone, Proceedings of the ACM 3rd International Conference on Mobile and Ubiquitous Multimedia, pp. 101-108, 2004.
Secord, Weighted Voronoi Stippling, Proceedings of ACM 2nd International Symposium on Non-Photorealistic Animation and Rendering, pp. 37-43, 2002.
A. Secord, "Weighted Voronoi Stippling," Proc. 2nd Ann. Symp. Non-Photorealistic Animation and Rendering (NPAR 2002), ACM Press, 2002, pp. 27-43.
Aug. 22, 2016 International Search Report and Written Opinion, including search strategy, from PCT/US2016/022836 (published as WO 2016/153911) (23 pages).
Caldelli et al., "Geometric-Invariant Robust Watermarking Through Constellation Matching in the Frequency Domain," IEEE Proc. Int. Conf. on Image Processing, vol. 2, Sep. 2000, pp. 65-68.
Chao KE et al, "Kernel target alignment for feature kernel selection in universal steganographic detection based on multiple kernel SVM", Instrumentation&Measurement, Sensor Network and Automation (IMSNA), 2012 International Symposium On, IEEE, (Aug. 25, 2012), doi:10.1109/MSNA.2012.6324554, ISBN 978-1-4673-2465-6, pp. 222-227, XP032456671.
Cheng, et al., "Colloidal silicon quantum dots: from preparation to the modification of self-assembled monolayers (SAMs) for bio-applications," Chem. Soc. Rev., 2014, 43, 2680-2700. (21 pgs.).
Chu, et al, Halftone QR codes, ACM Transactions on Graphics, vol. 32, No. 6, Nov. 1, 2013, p. 217.
Davis B, Signal rich art: enabling the vision of ubiquitous computing. In Media Watermarking, Security, and Forensics III Feb. 8, 2011 (vol. 7880, p. 788002). International Society for Optics and Photonics.
European Patent Office Communication pursuant to Article 94(3) EPC for Application No. 16769366.2, which is the regional phase of PCT/US2016/022836 (published as WO 2016/153911), dated May 24, 2019, 7 pages.
Feb. 26, 2018 Response and Claim amendments in European patent application No. 16769366.2, which is the regional phase of PCT/US2016/022836 (published as WO 2016/153911) (8 pages).
Gatys, et al, A Neural Algorithm of Artistic Style. arXiv preprint arXiv:1508.06576, Aug. 26, 2015. 16 pages.
International Search Report and Written Opinion for Application No. PCT/US19/36126, dated Oct. 9, 2019, 12 pages.
International Search Report and Written Opinion for Application No. PCT/US2018/050677, dated May 10, 2019, 14 pages.
International Search Report and Written Opinion for Application No. PCT/US2019/019410, dated Aug. 12, 2019, 19 pages. (published as WO2019/165364).
International Search Report and Written Opinion in PCT/US2016/22967 dated Jul. 11, 2016. (17 pgs.) (published as WO2016/153936).
Invitation to Pay Additional Fees including Communication Relating to the Results of the Partial International Search in PCT/US2018/064516, dated Apr. 5, 2019. 17 pages.
J. Collins et al., "Intelligent Material Solutions, Covert Tagging and Serialization Systems", Proc. IS&T's NIP 29 International Conference on Digital Printing Technologies, pp. 153-157 (2013). (5 pgs.).
Jamie Hayes et al, "Generating Steganographic Images via Adversarial Training", Proceedings of the 31st annual conference on advances in Neural Information Processing Systems (NIPS'30), ISBN 978-1-5108-6096-4, (Mar. 1, 2017), pp. 1951-1960, URL: http://papers.nips.cc/paper/6791-generating-steganographic-images-via-adversaria l-training.pdf, (Mar. 22, 2019), XP055573249.
Johnson, et al, Perceptual losses for real-time style transfer and super-resolution, European Conference on Computer Vision, Oct. 8, 2016, pp. 694-711.
Johnson, excerpts from github web site "Fast-neural-style," Nov. 19, 2017. 19 pages.
Jun-Yan Zhu et al, "Unpaired Image-to-Image Translation Using Cycle-Consistent Adversarial Networks", 2017 IEEE International Conference on Computer Vision (ICCV), (Mar. 30, 2017), doi:10.1109/ICCV.2017.244, ISBN 978-1-5386-1032-9, pp. 2242-2251, XP055573065.
Kiyoto et al, Development of a Near-Infrared Reflective Film Using Disk-Shaped Nanoparticles, Fujifilm Research and Development Report No. 58-2013, 2013. (4 pgs.).
Konstantinos A Raftopoulos et al., "Region-Based Watermarking for Images," Mar. 15, 2017, Operations Research, Engineering, and Cyber Security, Springer, pp. 331-343, XP009512871, ISBN: 978-3-319-51498-7.
Lengstrom, excerpts from github web site, "Fast Style Transfer in TensorFlow," Oct. 3, 2017. 24 pages.
Lin, et al, Artistic QR code embellishment. Computer Graphics Forum, Oct. 1, 2013, vol. 32, No. 7, pp. 137-146.
Lin, et al, Efficient QR code beautification with high quality visual content, IEEE Transactions on Multimedia, vol. 17, No. 9, Sep. 2015, pp. 1515-1524.
Liu, et al, Line-based cubism-like image—A new type of art image and its application to lossless data hiding, IEEE Transactions on Information Forensics and Security, vol. 7, No. 5, Oct. 2012, pp. 1448-1458.
Machine Translation of JP2017-073696A, generated Aug. 28, 2018. (54 pages).
Nikulin, Exploring the neural algorithm of artistic style, arXiv preprint arXiv:1602.07188, Feb. 23, 2016. 15 pages.
Park et al.; Invisible Marker Based Augmented Reality System, SPIE Proc., vol. 5960, 2005, pp. 501-508. (9 pgs.).
Petersen et al., "Upconverting Nanoparticle Security Inks Based on Hansen Solubility Parameters", Proc. IS&T's NIP 29 International Conference on Digital Printing Technologies, pp. 383-385 (2014). (3 pgs.).
Photoshop Elements Help—Patterns, Web Archive, Mar. 13, 2014. 2 pages.
Preston, et al, Enabling hand-crafted visual markers at scale, Proceedings of the 2017 ACM Conference on Designing Interactive Systems, Jun. 10, 2017, pp. 1227-1237.
Puyang, et al, Style Transferring Based Data Hiding for Color Images, International Conference on Cloud Computing and Security, Jun. 8, 2018, pp. 440-449.
R. Steiger et al., "Photochemical Studies on the Lightfastness of Ink-Jet Systems," Proc. IS&T's NIP 14 conference, pp. 114-117 (1998). (4 pgs.).
Raval, excerpts from github web site, Style Transfer Using VGG-16 Model, Mar. 8, 2017. 15 pages.
Rongen et al., 'Digital Image Watermarking by Salient Point Modification Practical Results,' Proc. SPIE vol. 3657: Security and Watermarking of Multimedia Contents, Jan. 1999, pp. 273-282.

(56) References Cited

OTHER PUBLICATIONS

Rosebrock, excerpts from web page Neural Style Transfer with OpenCV, Aug. 27, 2018. 23 pages.

Simonyan et al, Very Deep Convolutional Networks for Large-Scale Image Recognition, arXiv preprint 1409.1556v6, Apr. 10, 2015. 14 pages.

Ulyanov, et al, Improved texture networks: Maximizing quality and diversity in feed-forward stylization and texture synthesis, Proc. 2017 IEEE Conference on Computer Vision and Pattern Recognition, pp. 6924-6932.

Yang, et al, ARTcode: Preserve art and code in any image, Proc. 2016 ACM International Joint Conference on Pervasive and Ubiquitous Computing, pp. 904-915.

Yousaf et al.; Formulation of an Invisible Infrared Printing Ink, Dyes and Pigments, vol. 27, No. 4, 1995, pp. 297-303. (7 pgs.).

\* cited by examiner e velit esse cillum dolore eu fugiat
adipiscing elit, sed do eiusmod ter
aute irure dolor in reprehenderit i
rum. Lorem ipsum dolor sit amet,
nisi ut aliquip ex ea commodo con
lpa qui officia deserunt mollit anir
m, quis nostrud exercitation ullam
occaecat cupidatat non proident,
dolore magna aliqua. Ut enim ad n
dolore eu fugiat nulla pariatur. E)
sed do eiusmod tempor incididunt
in reprehenderit in voluptate velit
m dolor sit amet, consectetur adip
ea commodo consequat. Duis au
eserunt mollit anim id est laborum.
exercitation ullamco laboris nisi u
atat non proident, sunt in culpa qu
qua. Ut enim ad minim veniam, qu

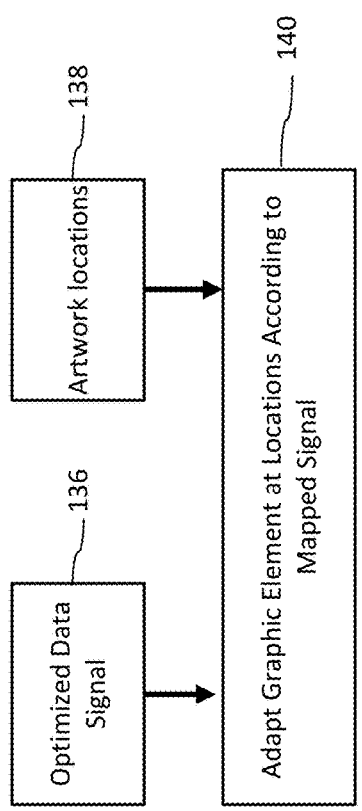
FIG. 38
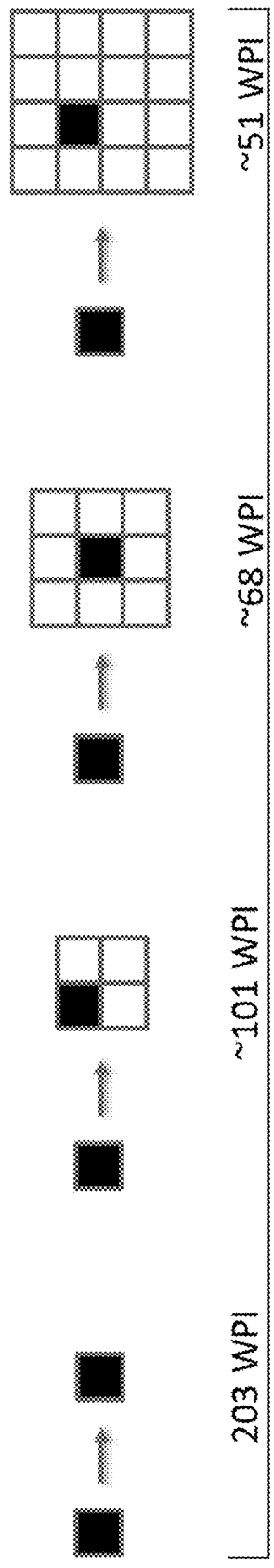
FIG. 39
FIG. 40

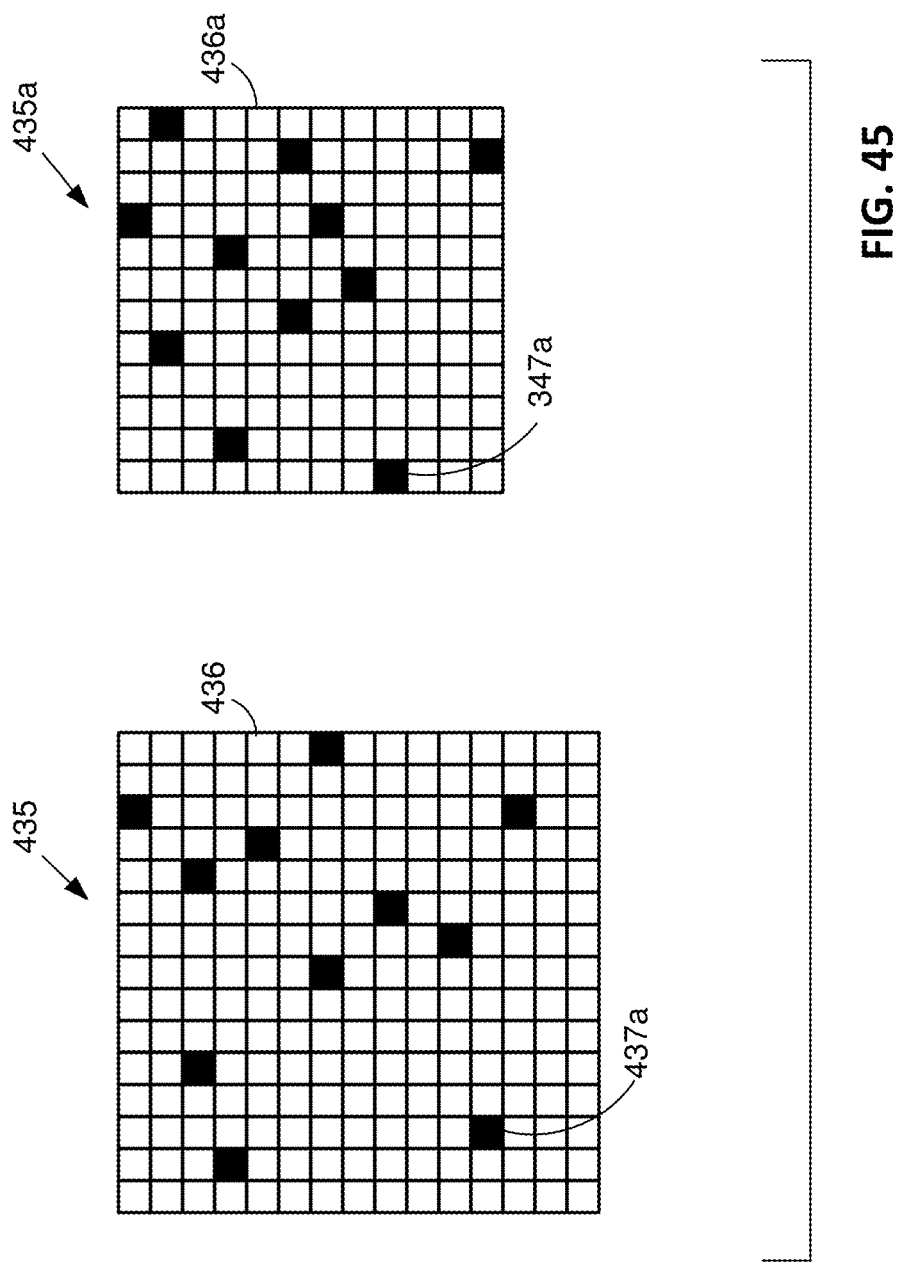

```
function logicalSparseTile = GetSparse_V3_Prime(grid,message,wpi,dpi)
% grid comes in at 'dim' dimension:  e.g. 292 with wpi=89 and dpi=203
% message comes in at 128x128 after encoding of 1 and -1
dim = round(dpi*128/wpi);
waxel_step = dpi/wpi;
logicalSparseTile = ones(dim);   % create tile as all-white to start for y=1:128
    yy=1+(y-1)*waxel_step;
    flyy = floor(yy);
    for x = 1:128
        xx=1+(x-1)*waxel_step;
        flxx=floor(xx);
        if message(y,x)== -1
            buffer = grid( flyy:(flyy+1), flxx:(flxx+1) );
            [~,idx] = sort(buffer(:), 'ascend');
            tmpx= flxx + floor(idx(1)/3);
            tmpy = flyy +1 - mod(idx(1),2);
            logicalSparseTile(tmpy,tmpx)=0;  % picks the lowest of the nearest four neighbors to place the dot
        end
    end
end
```

FIG. 46

FIG. 50A
FIG. 50B
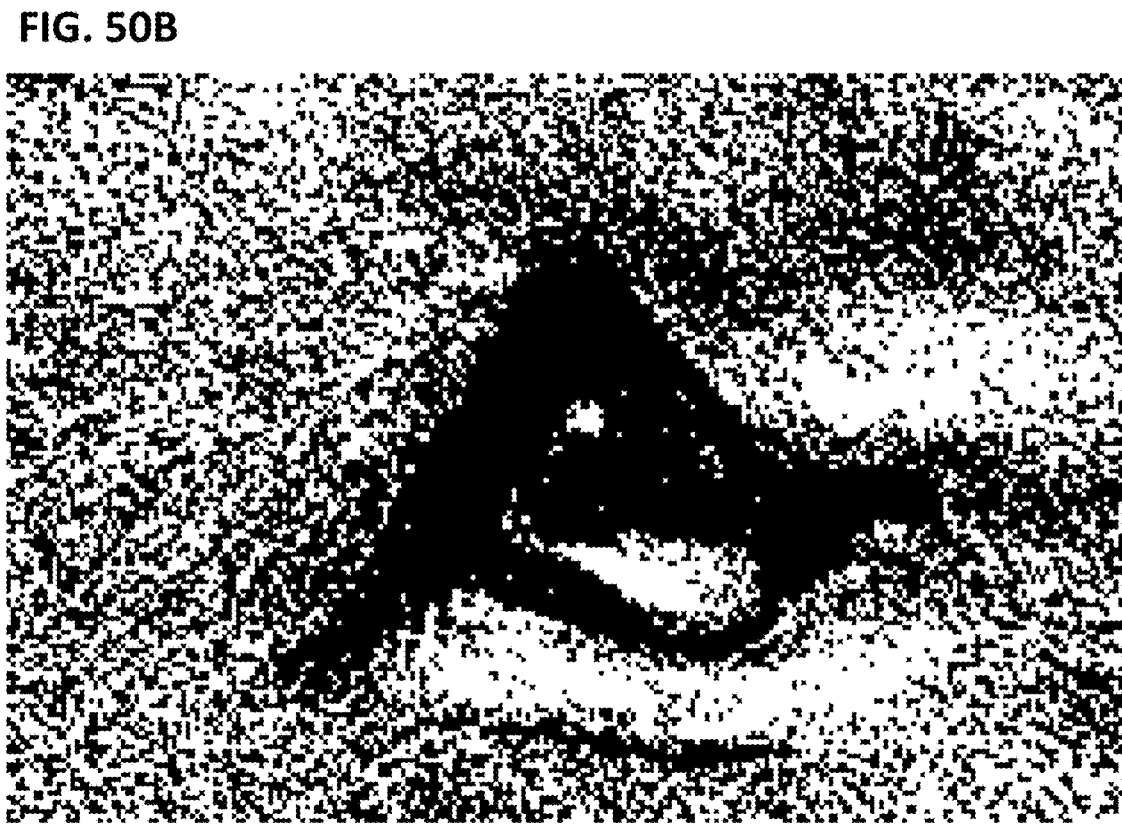

KEEP-OUT = 1.2 PIXELS

KEEP-OUT = 1.5 PIXELS

KEEP-OUT = 1.8 PIXELS

KEEP-OUT = 2.2 PIXELS

KEEP-OUT = 2.4 PIXELS

MAJOR AXIS = 1.9 PIXELS

MAJOR AXIS = 2.2 PIXELS

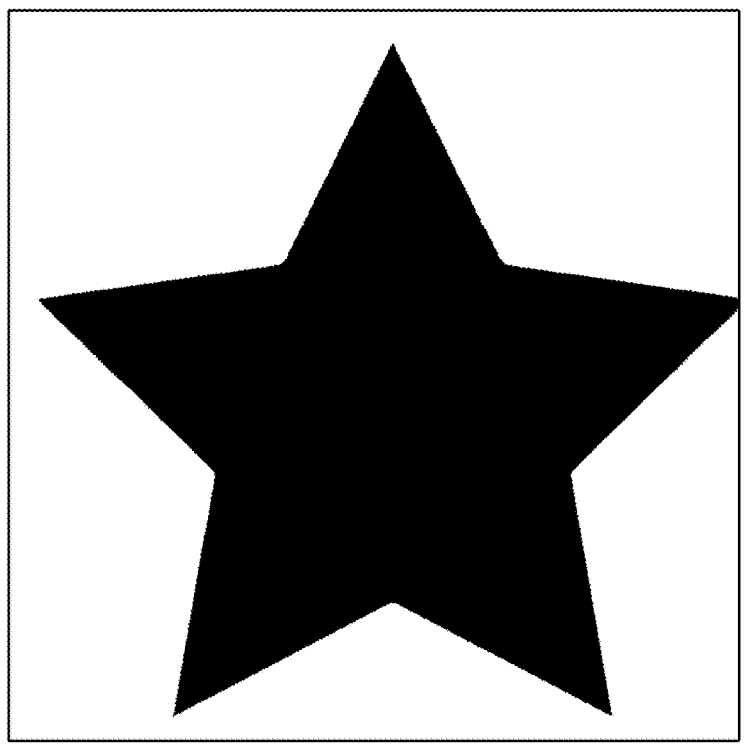
FIG. 61
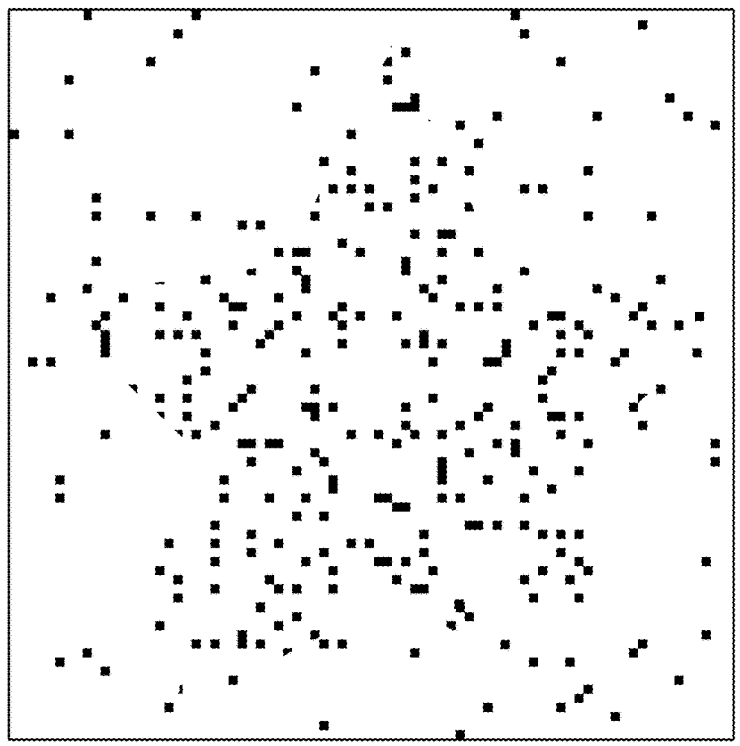
FIG. 62
 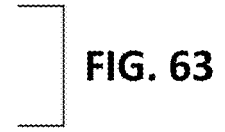
FIG. 63

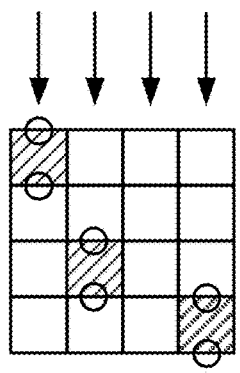
FIG. 65A
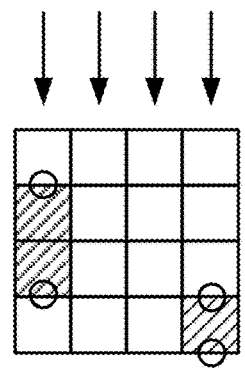
FIG. 65B
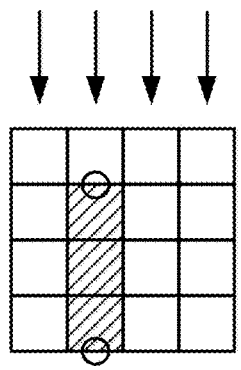
FIG. 65C
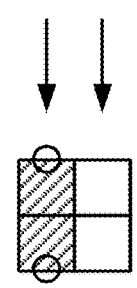
FIG. 65D
| Band #1 |
|---|
| Band #2 |
| Band #3 |
| Band #4 |
| Band #5 |
| Band #6 |
| |
| |
| |
| |
| |
| |
| |
| |
| |
| Band #16 |
FIG. 66

GENERATING AND READING OPTICAL CODES WITH VARIABLE DENSITY TO ADAPT FOR VISUAL QUALITY AND RELIABILITY

RELATED APPLICATION DATA

This application claims priority to provisional applications 62/673,738, filed May 18, 2018, 62/670,562, filed May 11, 2018, 62/659,641, filed Apr. 18, 2018, 62/634,898, filed Feb. 25, 2018, and 62/582,871, filed Nov. 7, 2017, each of which is incorporated by reference.

TECHNICAL FIELD

The present technology relates, generally, to image processing to generate machine-readable optical codes for printing (optionally after merging with host image content), complementary robustness measurements for optimizing the optical codes, and optical code readers for reliably and efficiently reading such codes from objects.

In part, this application concerns enhancements and improvements to the sparse signaling technologies detailed in applicant's U.S. Pat. No. 9,635,378 and publication 20170024840, which are incorporated herein by reference.

BACKGROUND AND SUMMARY

Optical codes, such as well-known one and two dimensional barcodes, are ubiquitous and critical in a wide variety of automatic data capture applications. Indeed, barcodes are so widespread, it is now common to see a variety of barcode types on a single object to carry different types of data, or to improve readability by redundantly encoding the same data on different parts of the object.

This growing use of barcodes poses a number of challenges for package and label designs. First, each barcode must occupy a distinct space to ensure that it can be read reliably. This takes up valuable space that could be used for more important information, such as product information and artistic design elements that enhance the value and attractiveness of the object to users. Second, it creates a potential for confusion and complexity in image processing for image-based scanners, which are rapidly replacing laser scanners. While laser scanners can be directed at particular barcodes, one at a time, image based scanners capture image frames that may contain part or all of one or more of the optical codes. Third, in an effort to reduce the visual impact of these codes, they are often reduced in size and confined to difficult to find locations on the objects. This makes them less reliable, and harder for users and machine vision equipment to locate and read reliably.

Other types of optical codes, such as robust digital watermarks, provide alternatives to conventional barcodes that address these challenges in various ways. Digital watermarks may be hidden within other images on the object, and thus not occupy valuable, dedicated space. They also may be redundantly encoded over the object surface to improve the ease of locating and reliably reading the digital data codes they carry (referred to as the payload, or message). This simplifies the task of imaging the object to obtain image frames from which the digital watermark payload can reliably be decoded. The watermark technology also improves computational efficiency and reliability of automatic data capture in a variety of usage scenarios. It does so because it facilitates reliable data capture from arbitrary and partial views of the object or label, even if ripped, smudged or crinkled.

While digital watermarks provide these enhancements, there are important applications where there is a need for improved optical data carrying capability that meets aesthetic, robustness, and data capacity requirements.

One challenge is the formation of minimally invasive optical codes for host image areas lacking image content that can mask the optical code or even act as a carrier of it. In these areas, it is possible to generate a subtle tint that carries machine-readable data. Additionally, in some cases, it is possible to select ink colors, or a combination of inks, to reduce visibility of the optical code to humans while retaining reliability for standard visual light scanning. For visual quality reasons, it is generally preferable to generate an optical code at a higher spatial resolution and also space the graphical elements (e.g., dots) of the code at a distance from each other so that they are less noticeable.

However, there are often limits to color selection and resolution that preclude these options. Many objects are printed or marked with technology that does not allow for color selection, and that does not reliably mark dots below a minimum dot size. The use of low resolution thermal printers to print optical codes on small labels, sometimes at high print speeds, is one example. Other examples include commercial printing of small packages that use techniques like dry offset or flexographic printing, which are incapable of rendering with high quality and consistency at high resolution and small dot sizes. Moreover, there are often restrictions based on design and cost constraints of using additional inks. Finally, even if rendering equipment is capable of leveraging higher resolution and smaller dot marking, and various color inks, the image capture infrastructure or mode of image capture may be incapable of capturing higher resolution or color information.

Another persistent challenge is the need to reliably read data from increasingly smaller spatial areas. The demand for increasing data capacity is fundamentally at odds with reliable recovery of that data from a limited area.

As detailed in this specification, we have developed several inventive optical code technologies that address these and other challenges for various applications. One inventive technology is a method for generating an optical code that optimizes parameters for visual quality and robustness (reliability) constraints. These parameters include spatial density, dot placement (e.g., spacing to avoid clumping), dot size and priority of optical code components. In the latter case, the priority of code components, such as reference (aka registration) signal and payload components, is optimized to achieve improved robustness and visual quality.

One aspect of the present technology is a method for generating an optical code. The method optimizes robustness by forming elements of the optical code according to signal priority and spatial constraints, including dot spacing, dot size and dot density. The elements are formed by dots or inverted dots. The dot is a marking surrounding by no or lighter markings, and an inverted dot (hole) is the absence of a mark or lighter marking surrounded by a region of darker marking. To achieve a desired visual quality, the method forms dots (or inverted dots) in order of the priority of the code components, while adhering to the constraints of dot size, dot density and dot spacing.

Another inventive technology is a method of optimizing the parameters based on a training set of test images. This method optimizes the noted parameters by generating and merging optical codes in the test images with varying optical code parameters, measuring robustness for the test images, and finding a combination of parameters that achieve optimal robustness across the test images.

Additional inventive technologies include optical code insertion and decoding methods. The optical code insertion methods merge the optical codes into host image content, such as a package or label design. Certain embodiments of the insertion method take into account and leverage attributes of a host image to improve visual quality and robustness. Embodiments of the decoding methods efficiently and reliably decode the payload from degraded images captured of marked objects.

These inventive methods are implemented in optical code generators, inserters, optimizers and decoder components. These components are implemented in software modules executed by processors of various kinds, such as those used in thermal label printers, pre-press workstations, mobile devices, and image-based barcode scanners of various kinds. The software instructions may also be converted to logic circuitry, such as application specific integrated circuits, programmable gate arrays, or combinations of them.

Additional inventive features will become apparent in the follow detailed description and accompanying drawings.

BRIEF DESCRIPTION OF THE DRAWINGS

FIG. 25 is yet another example in which tiles of the optical code have been merged with text.

FIG. 28 considers what happens if the starred pixel in the composite code excerpt of FIG. 27 is copied to an output tile as a black dot, and how a non-linear filter kernel can be applied to such black dot and a neighboring white pixel.

FIG. 38 is a diagram illustrating a method of mapping data signal elements to locations within host image artwork.

FIG. 39 shows examples of how to accommodate different optical code resolutions for a target output resolution, such as an image resolution for code insertion or for rendering a host image in which the code is inserted.

FIG. 40 illustrates dot pattern variation to achieve improved visual quality and robustness.

FIG. 45 compares excerpted outputs from the arrangement of FIG. 43, versus the arrangement of FIGS. 44A/44B.

FIG. 46 shows Matlab code related to the embodiments of FIGS. 43, 44A and 44B.

FIGS. 50A and 50B show excerpts of an image rendered with sparse signals of different bump sizes.

FIG. 61 shows a corporate logo serving as a mask.

FIG. 62 shows a sparse selection of marks, copied from the FIG. 59 message signal block at different densities, in accordance with the mask of FIG. 61.

FIG. 63 shows the FIG. 62 sparse mark in a tiled array at a more usual scale.

FIGS. 65A, 65B, 65C and 65D illustrate different marking patterns that cause different levels of thermal stress in a thermal printer.

FIG. 66 shows how a block may be divided into regions, each of which can be processed separately in selecting elements for marking.

DETAILED DESCRIPTION

This specification details embodiments of the technology with reference to flow diagrams and narrative descriptions. The diagrams and descriptions are implemented with processing modules that are most commonly realized by software instructions for configuring programmable hardware devices. In some embodiments, such software instructions are converted to firmware for integration into printers and scanners, or converted into digital logic circuitry.

Figure 1:
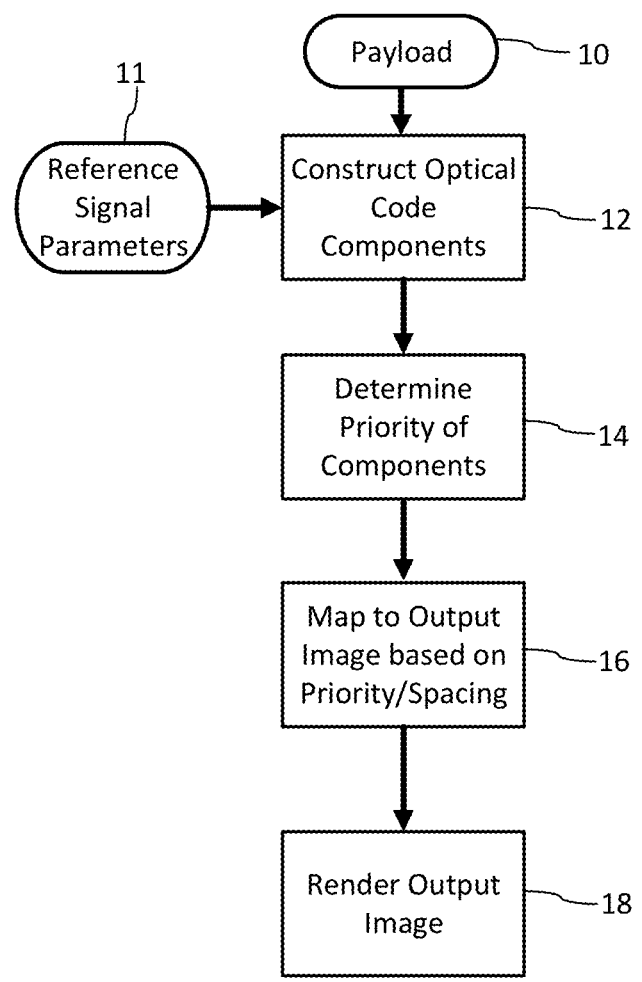
FIG. 1 is a diagram of a method of generating an optical code with variable spatial density to adapt for visual quality and reliability constraints.

FIG. 1 is a diagram of a method of generating an optical code with variable spatial density to adapt the code for visual quality and reliability constraints. An objective is to generate an optical code for insertion into an image or other carrier such that the parameters of the optical code are optimized. These parameters include robustness and visual quality. The method achieves improved robustness by determining a priority of optical message components that attains or surpasses robustness metrics while also providing desired spatial density and spacing of optical code elements. The density and spacing (to avoid dot clumping) constraints enable the method to optimize the optical code reliability while satisfying visual quality constraints.

The method begins with inputs of a variable payload sequence 10 and reference (registration) signal parameters 11. From these inputs, the method constructs components of the optical code (12). These components are comprised of payload and reference signal components. As detailed further below, these components are not necessarily distinct, yet need to be optimized to provide the robustness, signal capacity and visual quality per unit area in which they are applied to rendered output. This rendered output is an object marked with the optical code, such as by printing an image carrying the code ("output image"), including marking the output image onto a substrate by other means such as etching, engraving, burning, embossing, etc.

The method determines the priority to be applied to the components (14). This priority is derived by determining the parameters of the optical code that optimize robustness within constraints, such as dot size, spatial density and spacing of elements (e.g., dots or holes).

With the priorities, the method proceeds to map the optical code into an output image within the visual quality constraints (16). The output image is then rendered to a physical form, such as a paper or plastic substrate of a packaging or label material (18).

Figure 2:
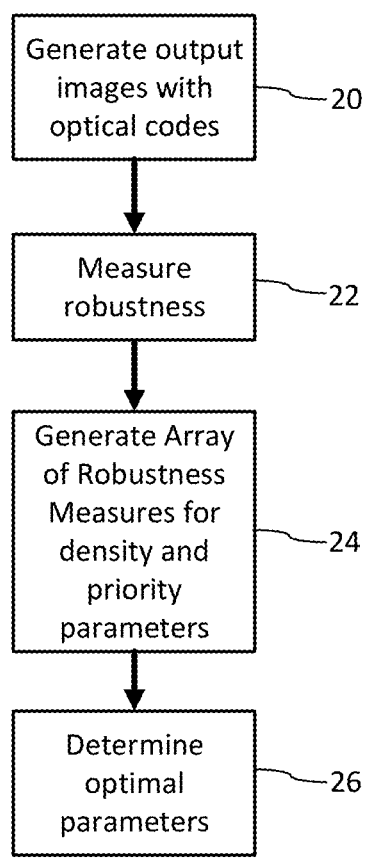
FIG. 2 is a diagram of a method for optimizing parameters of an optical code.

FIG. 2 is a diagram of a method for optimizing parameters of an optical code. This method optimizes the dot density, dot spacing and relative priority of optical code components. To optimize the optical code for a particular application, the method operates on a set of test images that are representative of the types of images of that application. For example, for optical codes used on labels, such as those typically printed by thermal printers for adhering to fresh food items (bakery items, meats and deli items, prepared foods, etc.), the test images are a set of label images. These label images are comprised of visual elements such as text, graphics, and conventional 1 or 2 dimensional barcodes. The test images are comprised of a mix of text, graphics and conventional, visible barcodes that are expected to be found on most of the label images in normal use.

Likewise, for packaging, the test images are a set of images that conform to a product manufacturer's style guides and are comprised of text in particular fonts, sizes and spacing, images, logos, color schema (including inks and spot colors), substrate types, including metal, plastic and paper based packaging materials, and preferred print technologies (offset, dry offset, digital offset, ink jet, thermal, flexographic, and gravure). In this case, the test images may be a set of training images of a particular package design, which simulate various forms of degradation incurred in the image due to rendering, use and scanning.

For each of the test images, the method generates an output image with an inserted optical code (20). The optical code is constructed from the payload and reference signal components using techniques detailed further below. The output of constructing a code for a test image is the test image bearing an array of optical code elements at spatial locations. For ease of description, we refer to these elements as "dots," and the particular geometric structure of a dot may take various shapes. The form of the image is binary in that its pixels correspond to a binary value, mark or no mark signal. For printing with inks, mark or no mark refers to ink or no ink at the pixel location for a particular color separation (e.g., process color CMY or K, or spot color). The pixels of the output image may correspond to test image elements, optical code elements or a mix of both. However, in some implementations, it is preferred to maintain a spacing of optical code elements at a minimum distance from image elements (including text) on the label, or to otherwise specify locations at which elements are not to appear.

For each output image, a set of parameters is selected by sampling each parameter value from an allowable range of values for that parameter. In one implementation, the parameters are dot density of the optical code, minimum inter-spacing of optical code elements, and priority of optical code components. In one implementation, the priority value is applied as a relative priority of optical code elements, namely a relative weighting of reference and encoded digital payload components.

After generating an output image, the method measures the robustness of the optical code in the output image (22). The robustness is measured by a robustness prediction program that computes detection metrics from the output image, simulating degradation due to rendering, use and scanning. These detection metrics are computed using the techniques detailed in U.S. Pat. No. 9,690,967, which is incorporated by reference. See also U.S. Provisional Application 62/628,193, attached as Appendix 1 to application 62/634,898, and incorporated herein by reference, and U.S. application Ser. No. 15/154,529, filed May 13, 2016 (now U.S. Pat. No. 10,217,182), and Ser. No. 15/918,924, filed Mar. 12, 2018 (now U.S. Pat. No. 10,382,645), which are also incorporated herein by reference.

The detection metrics include a metric that measures the reference signal of the optical code, and a metric from the digital payload (e.g., correspondence with an expected payload). The optical code is repeated in contiguous tiles of the output image. Additionally, there is spatial redundancy within a tile. Thus, the detection metrics may be computed per unit area, where the unit of area ranges from the smallest area from which the code may be detected to the area of a few contiguous tiles in horizontal and vertical dimensions.

The process of measuring robustness preferably takes into account the expected degradation of the optical code in its rendering, use and scanning. To do so, the degradation is simulated on the output image prior to measuring robustness. The scanning mode is also simulated, as the optical code may be read by a swiping motion, or by a presentment mode. In the presentment mode, the object is expected to be presented to an imager, such that the imager and object are substantially static. The mode of scanning has implications on the robustness of the optical code. One implication of swiping is that the scanning may introduce blur. Another is that the optical code may be read from plural tiles in the path of the swipe. An implication of presentment mode is that the imager may only capture a portion of the object, e.g., part of one side. Thus, the reliability at several different potential object views needs to be considered in the overall robustness score. In the case of a swipe mode, the robustness measure may be summed from detection metrics along one or more paths of a swipe scan.

The processes of generating optical codes and measuring robustness is executed for each test image and for each parameter being optimized (e.g., minimal optical code element spacing at an optical code density for a tile, and optical code component priority). The method then generates an array of robustness measurements, with a robustness measure per parameter space sampling (24). The parameter space refers to a multi-dimensional space in which the coordinates are parameter candidates, e.g., priority value, dot spacing, dot size, dot density, or some sub-combinations of these candidates.

Next the method determines the optimal parameters from the robustness measurements. To do so, the method analyzes the array of robustness measurements in the parameter space to find the region in the parameter space where the robustness measurements exceed a desired robustness constraint (26). This region defines the set of parameters for the optical code element spacing and priority that are expected to provide the desired robustness. In one approach, the method finds the location in the parameter space that minimizes the distance to a maxima in robustness score for each test image.

Having described the process of optimizing parameters for an optical code, we now describe embodiments of optical codes with variable density that are useful for integrating the codes on labels or packaging with text and graphics.

Figure 3:
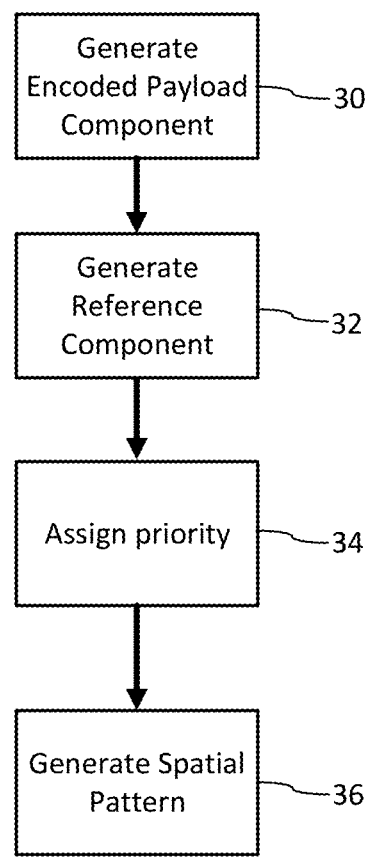
FIG. 3 is a diagram illustrating a process for constructing an optical code.

FIG. 3 illustrates a process for constructing an optical code. This is an embodiment of an optical code generator. In this embodiment, separate variable payload and reference signal components are generated and then combined. The payload is a sequence of data symbols, which each represent two or more (binary or M-ary) message symbol values. The integer value, M, in the term, M-ary, is the number of possible symbol values per symbol element. For example, in the case of M=3, the symbol values have one of three states, such as 1, 0 and −1, or correspond to signal feature values of three different quantization bins. The latter refers to a modulation scheme where a feature value of the host image is quantized to one of the quantization bins corresponding to the symbol value. To make the payload more robust, it is encoded redundantly using a combination of error correction, error detection, repetition and carrier signals. The processing in block 30 transforms the payload into a robust encoded payload component in which symbols of the payload are conveyed in plural elements of the encoded payload component. These elements form a payload signal waveform with a spatial arrangement and amplitude.

The reference signal component is a signal used to detect the optical code within the output image and perform geometric synchronization. The processing in block 32 generates the reference signal component by specifying its signal waveform properties, such its spatial arrangement and amplitude. An example of this type of optical code, with encoded payload and reference signal, is described in U.S. Pat. No. 6,590,996, which is incorporated by reference.

An exemplary reference signal is composed of several dozen spatial sinusoids that each spans a 2D spatial block with between 3 and 50 cycles in horizontal and vertical directions, typically with different phases. The integer frequencies assure that the composite signal is continuous at edges of the block. The continuous signal is sampled at uniformly-spaced 2D points to obtain, e.g., a 64×64 or 128×128 reference signal. (A particular reference signal, including frequencies and phases of its component sinusoids, is detailed in application 62/611,404, filed Dec. 28, 2017, the disclosure of which is incorporated herein by reference.)

In block 34, the embodiment assigns a priority to elements of the encoded payload and reference signal components. This is implemented by applying a weighting to the elements according to the assigned priority. For example, the method multiplies amplitude values of signal elements by a weighting factor proportional to the priority of the optical code component of those elements.

The embodiment of FIG. 3 then constructs the optical code into a two dimensional spatial image representation in block 36.

Figure 4:
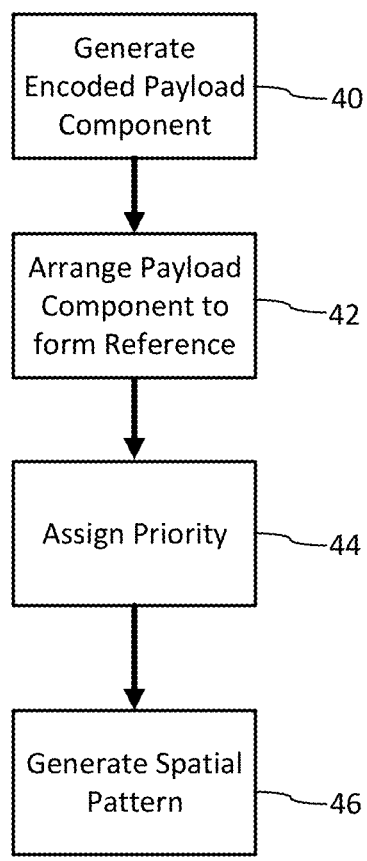
FIG. 4 is a diagram illustrating another process for constructing an optical code.

FIG. 4 illustrates another process for constructing an optical code. This is a variant of FIG. 3 in which the reference signal component is formed in the arrangement of encoded payload component. In block 40, this embodiment generates an encoded payload component. This approach may use similar error correction coding and modulating onto a carrier signal as the embodiment of FIG. 3. Then, in block 42, this embodiment arranges the encoded payload elements into a pattern that forms a reference signal component. An example of this approach is described in U.S. Pat. No. 9,747,656, which is incorporated by reference. In a variant of this approach, encoded payload elements are spatially interleaved with fixed reference signal elements. The fixed elements form a pattern of the reference signal component.

To assign priority to the components in block 44, the embodiment weights signal elements of the encoded payload and fixed elements. This approach produces a spatial pattern of weighted elements, arranged so as to form a reference signal (46).

Figure 5:
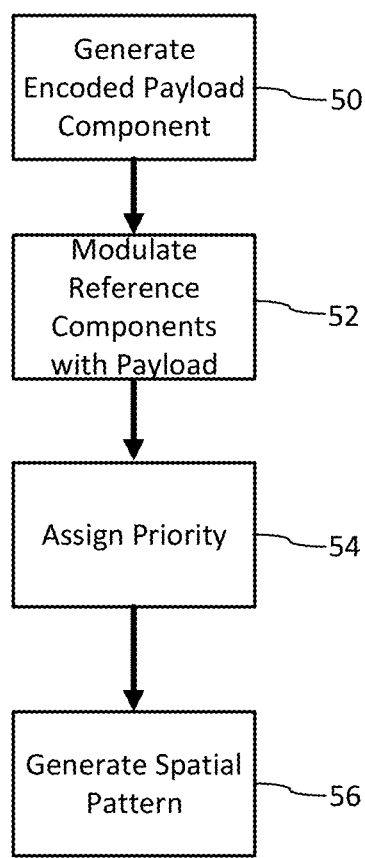
FIG. 5 is a diagram illustrating another process for constructing an optical code.

FIG. 5 is a diagram illustrating another process for constructing an optical code. This is another variant of FIG. 3 in which the reference signal component serves as a carrier for encoded payload signal elements. In block 50, this embodiment generates an encoded payload component. For example, the sequence of payload components is error correction-encoded by converting the sequence of payload symbols into a longer sequence of encoded symbols using error correcting codes such as block and/or convolution error correcting codes. Some examples of block codes include, e.g., Bose-Chaudhuri-Hocquenghem (BCH), and Reed-Solomon codes.

In block 52, the embodiment modulates components of a reference signal with elements of the encoded payload signal. In one implementation, the reference signal comprises a collection of spatial sine waves, each with a phase value. The payload is encoded by shifting the phase of a sine wave according to the value of an encoded payload signal element. In one protocol, the encoded payload elements are binary, meaning that they have one of two different values per element. One binary value is represented with zero phase shift and the other by a phase shift of $\pi$ (180 degrees) of the corresponding sine wave. In other protocol variants, the encoded payload signal is M-ary, with M>2. The value of M is limited by robustness constraints, as the higher it is, the more difficult it is to distinguish among different symbol values encoded in an image feature. The encoded payload is modulated onto the reference signal carrier component by shifting the phase into one of M corresponding phase shift states (e.g., 0, $\pi/2$, $\pi$, or $3\pi/2$ radians). This may be implemented as form of quantization based modulation, where the phase of the reference signal component is quantized to fall within the phase shift bin corresponding to the encoded payload symbol.

Not all components of the reference signal need to be modulated with payload signal. Instead, some subset of the reference signal may remain un-modulated, and this un-modulated component serves as a reliable signal for a first stage of detection. For example, the reference signal may be comprised of 200 sine waves, with a subset (e.g., 40-60) remaining fixed, and the others available for modulation by a corresponding payload signal element.

Another approach to modulating a reference signal is on-off keying of reference signal components. In this approach, a subset of reference signal sine waves are fixed, and the remainder are modulated to convey data using on-off keying. In this on-off keying, encoded payload symbols are encoded by including, or not, a sine wave at predetermined frequency location. Each encoded payload element is mapped to a frequency location within an image tile. Where the payload element is a first binary value (e.g., 0 or −1), the sine wave for that element is not included. Conversely, where the payload element has a second binary value (e.g., 1), the sine wave for that element is included.

In block 54, the embodiment assigns priority to the optical signal components. This is implemented for example, by applying a scale factor to selected sine wave components according to priority. Higher priority signal components are given greater weight by multiplying by a larger scale factor. Additionally, different scale factors may be applied to the fixed vs. modulated reference signal components to provide a greater relative priority to parts of the reference signal that are modulated or fixed.

In block 56, the embodiment generates a spatial pattern of the optical code with its modulated reference signal components. In the case of the sine wave embodiment, there are alternative methods to generate the spatial pattern. One alternative is to apply an inverse frequency domain transform on the complex components in the frequency domain, such as an inverse Fast Fourier Transform (FFT). Another alternative starts with spatial domain waveforms of each sine wave component, and adds them together to form the spatial pattern. As an alternative to sine waves, other carrier signals, such as orthogonal arrays, which have good auto-correlation but low cross correlation, may be used. These orthogonal arrays map to locations in a two dimensional image tile.

The output of each of the optical code generators in FIGS. 3-5 is a spatial domain image block. The pixel values of the block are multi-valued, e.g., eight bits per pixel. This image block may be used as signal tile, which is repeated and merged with host image content of a host image to form an output image. The output image is a label or package design, which is rendered onto a substrate by a printer or other marking equipment (embosser, engraver, etcher, or the like). The signal components are prioritized according to the assigned priority. This priority enables the optical code to be filled into spatial areas of the host image design according to a signal priority and dot density and spacing that optimizes robustness and visual quality constraints.

(For the avoidance of doubt, "multi-valued" as used in this document refers to elements/pixels that have more than two possible states. For example, they may be greyscale elements (e.g., an 8 bit representation), or they may have floating point values.)

We now detail sub-components of the optical code generators of FIGS. 3-5.

Figure 6:
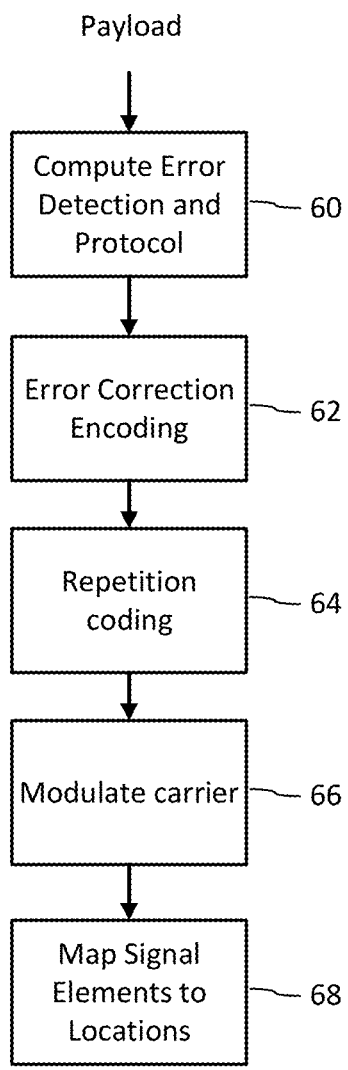
FIG. 6 is a diagram illustrating a method of encoding a variable digital payload to be conveyed in an optical code.

FIG. 6 is a diagram illustrating a method of encoding a variable digital payload to be conveyed in an optical code. This section explains additional examples of how to generate encoded payload components in the embodiments discussed previously.

In processing module 60, the data payload is processed to compute error detection bits, e.g., such as a Cyclic Redundancy Check, Parity, check sum or like error detection message symbols. Additional fixed and variable messages used in identifying the payload format and facilitating detection, such as synchronization signals may be added at this stage or subsequent stages.

Error correction encoding module 62 transforms the message symbols into an array of encoded message elements (e.g., binary or M-ary elements) using an error correction method. Examples include block codes, BCH, Reed Solomon, convolutional codes, turbo codes, etc.

Repetition encoding module 64 repeats the string of symbols from the prior stage to improve robustness. Repetition encoding may be removed and replaced entirely with error correction coding. For example, rather than applying convolutional encoding (e.g., at ⅓ rate) followed by repetition (e.g., repeat three times), these two can be replaced by convolution encoding to produce a coded payload with approximately the same length.

Next, carrier modulation module 66 takes message elements of the previous stage and modulates them onto corresponding carrier signals. For example, a carrier might be an array of pseudorandom signal elements, with equal number of positive and negative elements (e.g., 16, 32, 64 elements), or other waveform, such as sine wave or orthogonal array. In the case of positive and negative elements, the payload signal is a form of binary antipodal signal. It also may be formed into a ternary (of 3 levels, −1, 0, 1) or M-ary signal (of M levels). These carrier signals may be mapped to spatial domain locations or spatial frequency domain locations. Another example of carrier signals are the above-described sine waves, which are modulated using a modulation scheme like phase shifting, phase quantization, and/or on/off keying.

The carrier signal provides additional robustness, as it spreads the encoded message symbol over the carrier. As such, the use of larger carrier arrays reduces the redundancy employed in error correction and/or the need for repetition code. Thus, the error correction codes, repetition and carrier signals may be used in various combinations to produce an encoded payload signal for a tile that achieves the desired robustness and signal carrying capacity per tile.

Mapping module 68 maps signal elements of the encoded payload signal to locations within an image block. These may be spatial locations within an image tile. They may also be spatial frequency locations. In this case, the signal elements are used to modulate frequency domain values (such as magnitude or phase). The resulting frequency domain values are inverse transformed into the spatial domain to create a spatial domain signal tile.

Mapping module 68 also maps a reference signal to locations in the image block. These locations may overlap, or not, the locations of the payload. The encoded payload and reference signal are signal components. These components are weighted and together form an optical code signal.

To accurately recover the payload, an optical code reader must be able to extract estimates of the encoded data payload signal elements at their locations within an image. This requires the reader to synchronize the image under analysis to determine the tile locations, and data element locations within the tiles. The locations are arranged in two dimensional blocks forming each tile. The synchronizer determines rotation, scale and translation (origin) of each tile.

The optical code signal comprises an explicit and/or implicit reference (registration) signal. An explicit reference signal is a signal component separate from the encoded payload that is included with the encoded payload, e.g., within the same tile. An implicit reference signal is a signal formed with the encoded payload, giving it structure that facilitates geometric synchronization. Because of its role in geometric synchronization, we sometimes refer to the reference signal as a synchronization, calibration, grid, or registration signal. These are synonyms. Examples of explicit and implicit synchronization signals are provided in our U.S. Pat. Nos. 6,614,914, and 5,862,260, which are incorporated herein by reference.

In particular, one example of an explicit synchronization signal is a signal comprised of a set of sine waves, with pseudo-random phase, which appear as peaks in the Fourier domain of the suspect signal. See, e.g., U.S. Pat. Nos. 6,590,996 and 6,614,914, and 5,862,260, which describe use of a synchronization signal in conjunction with a robust data signal. Also see U.S. Pat. No. 7,986,807, which is incorporated by reference.

Our US Publications 20120078989 and 20170193628, which are also incorporated by reference, provide additional methods for detecting a reference signal with this type of structure, and determining rotation, scale and translation. US 20170193628 provides additional teaching of synchronizing an optical code reader and extracting a digital payload with detection filters, even where there is perspective distortion.

Examples of implicit synchronization signals, and their use, are provided in U.S. Pat. Nos. 6,614,914, 5,862,260, 6,625,297, 7,072,490, and 9,747,656, which are incorporated by reference.

Figure 7:
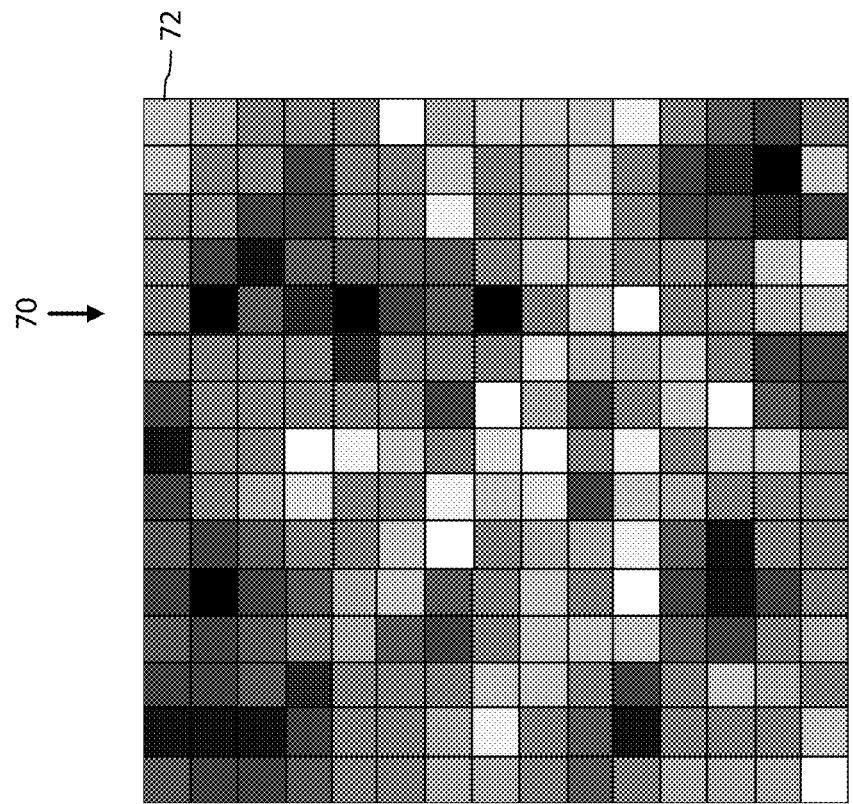
FIG. 7 is a diagram illustrating a tile of an optical code component. This may be used as a reference signal component, an encoded payload component, or a reference signal encoded with a payload. It may also be used as an encoded payload signal that is arranged into a reference signal structure.

FIG. 7 is a diagram illustrating part 70 of an image tile of an optical code component. This part is comprised of an array of pixels (e.g., 72), each having a value, depicted here as a gray scale value. This part of a tile has 15 by 15 pixels. We provide additional examples of tile size and dimensions used for optical codes below.

This component may be used as a reference signal component, an encoded payload component, or a reference signal encoded with a payload. It may also be used as an encoded payload signal that is arranged into a reference signal structure.

For the sake of illustration, we provide an example in which this part 70 is a reference signal component. Through this example, illustrated in the ensuing diagrams, we explain how reference and payload components are formed, prioritized, and combined to form a dense optical code signal tile. We refer to this state of the optical code as "dense," as the intent is to use it to produce a transformed version at a variable spatial density, which is more sparse (a sparse code signal at a desired dot density). To achieve the desired dot density, this dense optical code signal tile is then mapped into a spatial pattern based on priority of the code signal elements. In this example, the reference signal comprises sine waves which are converted to a spatial domain image, as depicted in FIG. 7. These sine waves form peaks in the spatial frequency domain. A similar effect may be achieved by using a spatial pattern of fixed or encoded payload elements with redundancy that also forms peaks in the spatial frequency domain.

Figure 8:
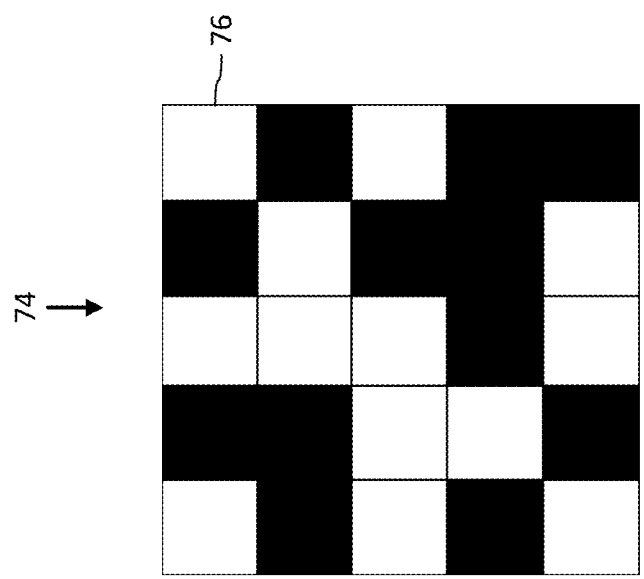
FIG. 8 is a diagram of a tile of an encoded payload signal.

FIG. 8 is a diagram illustrating part 74 of a tile of an encoded payload signal. This part 74 is an array of pixels (76) in which the pixel values are binary, either black or white. These values correspond to the encoded payload signal conveyed by modulating each of the binary values of an error correction coded payload onto a carrier (e.g., a PN sequence), and mapping the resulting modulated carrier signal elements to pixel locations. The result is an encoded payload signal, a part of which is depicted in FIG. 8.

Figure 9:
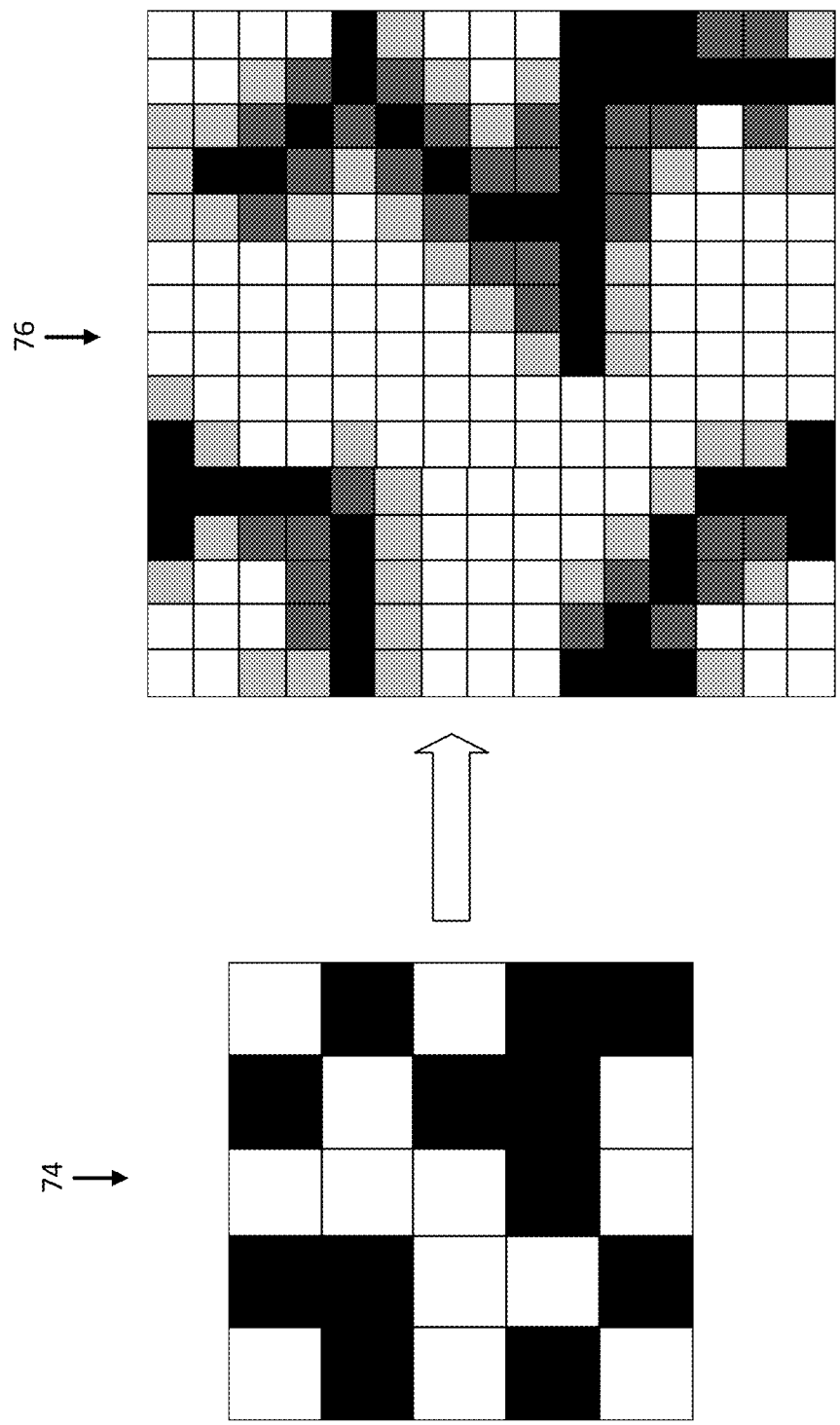
FIG. 9 is a diagram of the encoded payload signal of FIG. 8, transformed to the spatial resolution of the optical code component of FIG. 7.

FIG. 9 is a diagram of the encoded payload signal 74 of FIG. 8, transformed to the spatial resolution of the optical code component of FIG. 7. Prior to combining with the reference signal, the encoded payload component 74 is spatially scaled to a target resolution at which the optical code is inserted into a host image. This target resolution may also be the resolution at which the host image is rendered onto an object. In this example, the reference signal is generated at the target resolution for insertion into a host image, and the encoded payload signal is scaled to the same target resolution. This resolution is, for example, 203 dots per inch for many thermal label printers, or 300 dots per inch or higher for other commercial printing machines. These are just examples and the target resolution varies with application and printing technology employed. There are a variety of techniques that may be used for the resizing, such as bi-linear or cubic interpolation, Lanczos resampling, or the like. This spatial scaling of the encoded payload signal produces an image 76 such as the one shown on the right of FIG. 9 with pixels at the target elements per inch resolution. The gray scale depiction of the pixels in the 15 by 15 pixel array of image 76 reflects that the pixels are no longer binary valued.

Figure 10:
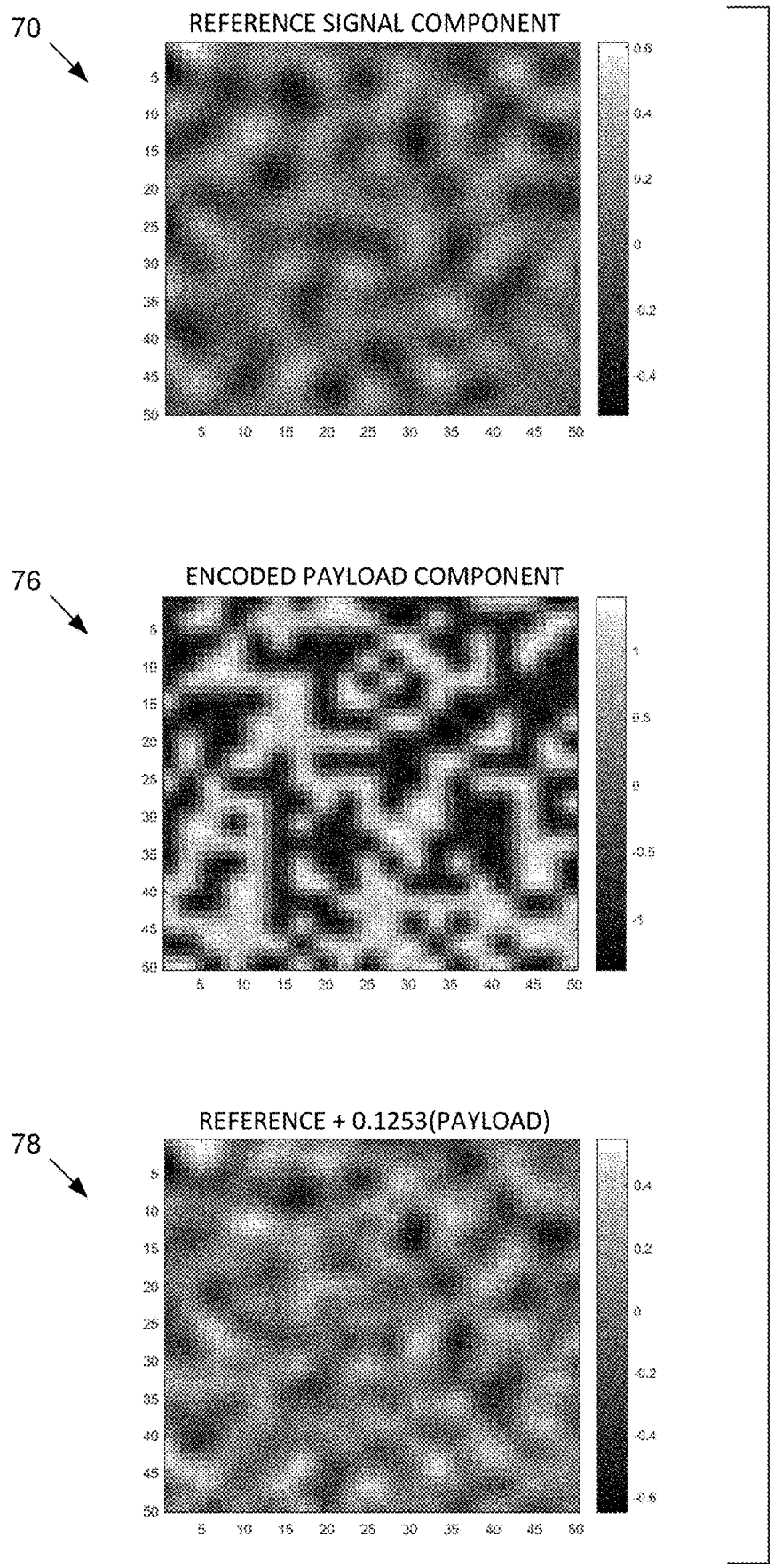
FIG. 10 is a diagram illustrating a combination of optical code elements, including an encoded payload and a reference component, to form a dense composite optical code.

FIG. 10 is a diagram illustrating a combination of a reference signal component 70 and an encoded payload (message) component 76 to yield a dense composite code signal 78.

In this example, the reference signal elements 70 are added to corresponding encoded payload signal elements 76 at the target resolution of the rendering system. This requires up-sampling the payload component, which produces some pixel elements of intermediate values, i.e., grey, rather than black or white. (Similarly, the upsampling, here done by a bicubic interpolation algorithm, yields some overshoot of signal values, resulting in some values above +1 and below −1.) To prioritize the elements, one of the reference or payload components is multiplied by a weighting factor representing a relative weighting of the reference signal to the encoded payload signal. In this example, the payload component 76 is weighted by a factor of 0.1253, and summed with the reference component 70 to form the dense, composite optical code signal 78. The magnitude of the resulting values establish the priority of the individual elements of the optical code signal 78.

FIG. 10 shows the component and composite signal values in floating point format. To the right of each of blocks 70, 76 and 78 is a graphical scale indicating the corresponding element values.

Figure 11:
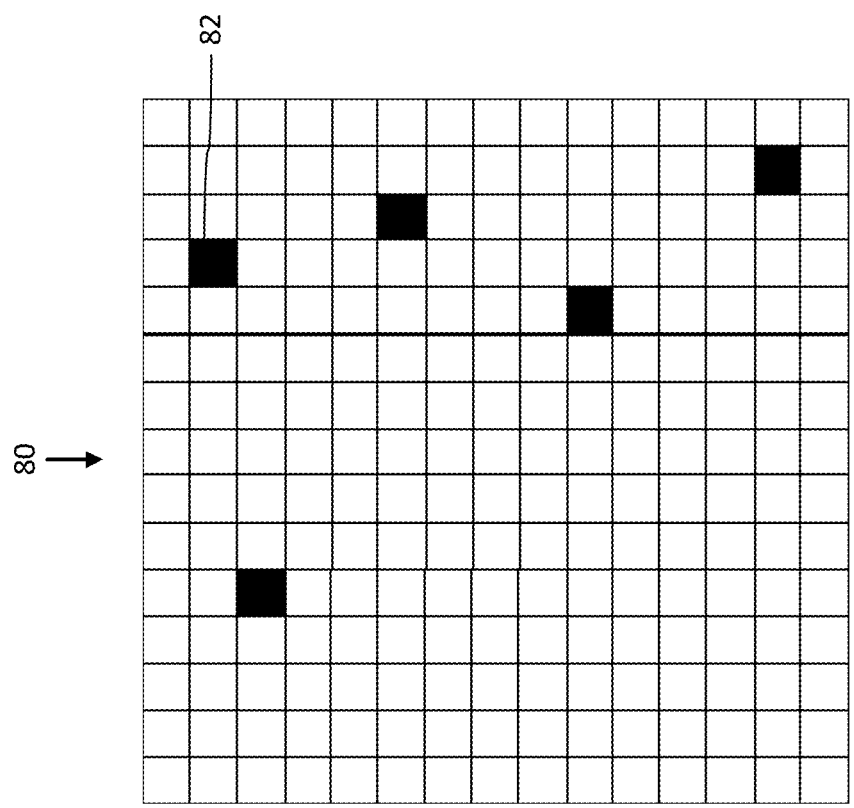
FIG. 11 is a diagram of a mapping of a dense composite optical code (like FIG. 10) to an output image according to priority of its optical code elements and spatial constraints (e.g., element spacing and signal density).

FIG. 11 is a diagram of a mapping of a dense composite optical code signal to an output image 80 according to priority of its optical code elements and spatial constraints (e.g., element spacing and signal density). In this mapping, the mapping method fills the pixel locations of the output image 80 according to the priority of the elements, with highest priority elements being filled first, followed by filling elements of next highest priority. Additionally, the filling process adheres to a spacing (placement) constraint, such as a minimum distance between dots. Both the priority of the components and the placements are optimized for a particular dot density using the method described above with reference to FIG. 2. The output of the mapping is a spatial pattern of the optical code, comprised of binary valued pixels at the target resolution. The binary valued pixels correspond to dots, which are marked on a substrate to apply the optical code to the substrate. Within the redundantly encoded signal of the dense optical code, we have found that the peaks of the dense signal are the most important to retain in a sparse signal to achieve robustness and reliability. There are positive and negative peaks. When these are conveyed in the luminance of an image, these positive and negative peaks correspond to high and low luminance values. The same is true for cases where the optical code is conveyed in color channels, such as color or chroma components (e.g., CMY) of a color image or spot colors. In one approach, the mapping retains the peaks corresponding to dark pixel (low luminance) on a relatively higher luminance substrate. This approach is reflected in FIG. 11, where dark pixels (e.g., 82) correspond to negative peaks.

This approach may be enhanced further by encoding positive peaks as a "hole" formed by an arrangement of dark pixels around a relatively higher luminance area. On a higher luminance substrate, the hole is formed by marking dark pixels around a blank pixel located at the positive peak. This blank pixel allows a lighter substrate or ink layer to be exposed, so that when imaged, it reflects a peak relative to its neighboring pixel values.

Figure 12:
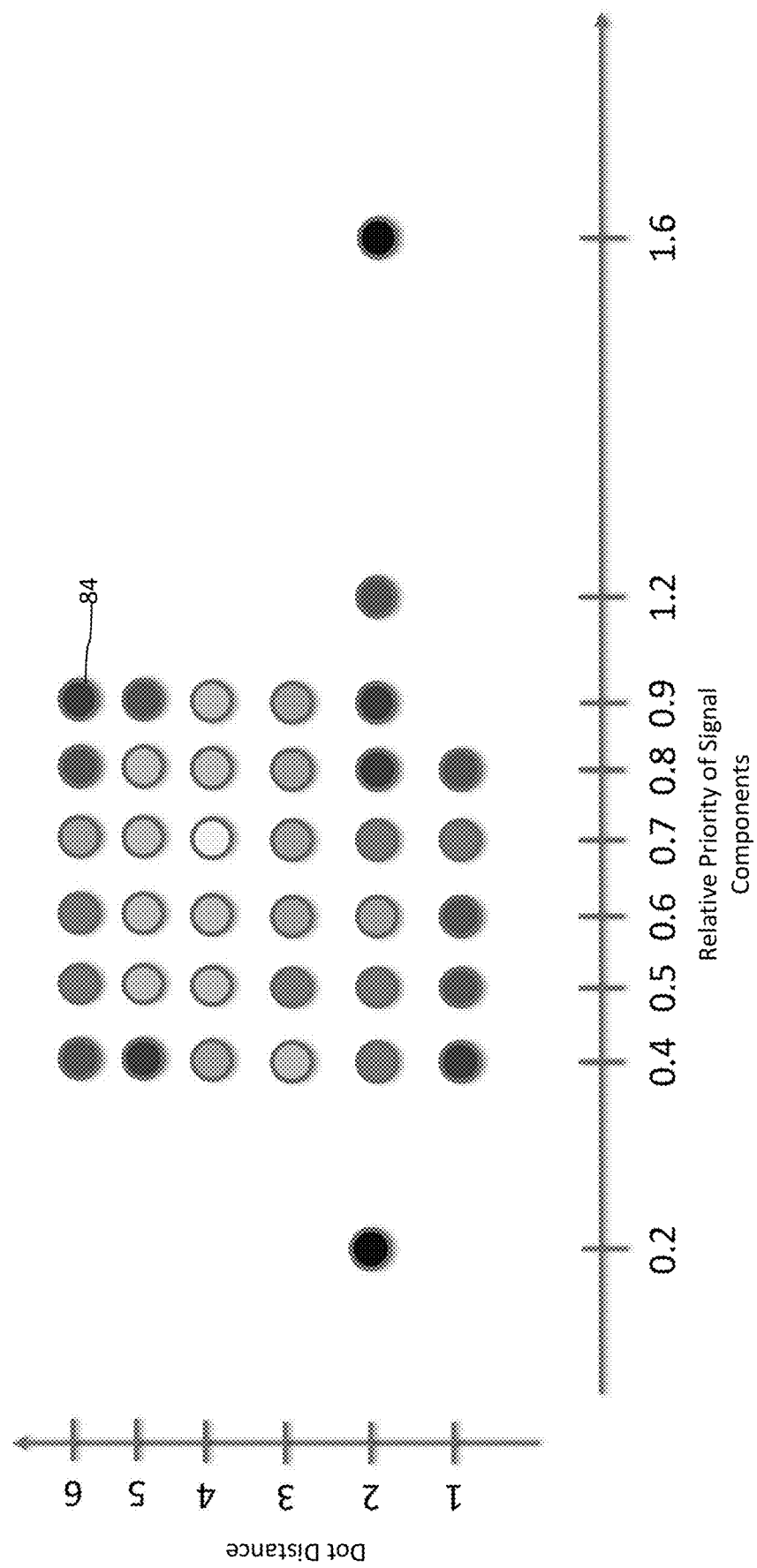
FIG. 12 is a diagram illustrating an example of a process for optimizing dot spacing and signal component strength ratios. These parameters are derived in a training process that generates and inserts optical codes at each of several combinations of these parameters into each test image in a set of test images.

We now elaborate further on the process of FIG. 2 for optimizing the optical code parameters. FIG. 12 is a diagram illustrating an example of a process for optimizing dot spacing and signal component priority for an optical code at a particular dot density. An additional parameter that may be optimized for a desired dot density is dot size. In this example, the dot spacing is represented as dot distance. The priority is represented as a relative priority of signal components. An example of this priority is the relative weighting of components explained in connection with FIG. 10. These priority and spacing parameters are derived in a training process that generates and inserts optical codes at each of several parameter space coordinates of priority and spacing parameters into each test image in a set of test images.

FIG. 12 illustrates a plot of robustness measurements for these test images. The vertical axis is the dot distance, which is a minimum distance between dots of the optical code. The horizontal axis is the relative priority of signal components, namely the reference and encoded payload signal components. The robustness measurements for the test images are shown as circles (e.g., 84), where the robustness measurements range from low (black) to high (white) values depicted in gray scale values.

As noted in connection with FIG. 2, a robustness prediction program is used to predict the robustness of the test image for a given rendering and scan process. Please see U.S. Pat. No. 9,690,967 for additional details on predicted code detection per unit area. In addition, U.S. Provisional Application 62/628,193, filed Feb. 13, 2018, entitled METHODS AND ARRANGEMENTS FOR PREDICTING RELIABILITY OF SIGNAL DECODING FROM ARTWORK ON PRINTED PACKAGING, is attached to application 62/634,898 as Appendix 1, and provides additional teaching on robustness measurements for packaging and labels, referred to as scores. Also see co-pending application Ser. No. 15/154,529, filed May 13, 2016, and Ser. No. 15/918,924, filed Mar. 12, 2018, which are incorporated by reference. These documents detail additional methods of computing detection metrics and using these metrics to predict robustness in response to simulated degradation and scanning modes.

The robustness prediction program produces a robustness measure for the test image, which is a composite of detection measurements it makes within the test image. The insertion process replicates tiles of the optical code in the test image. This replication of signal and the signal redundancy within a tile enables the robustness program to compute detection metrics within image block regions that are smaller than a signal tile. These detection metrics, including reference signal correlation and payload recovery metrics, are computed per spatial region and aggregated into a robustness score according to a function that takes into account the image capture (e.g., a swipe motion or static presentment of a marked object to a camera). Here the optical code is compatible with the digital watermark signal technology referenced in U.S. Pat. No. 9,690,967 and Appendix 1 to application 62/634,898. It is compatible in the sense that the signal detection for watermark signals described in these documents also applies to the optical codes described in this specification. The optical code conveys a compatible signal in the form of sparse dots on lighter areas and/or holes in blank or solid areas of a package or label design. The process for applying this optical code to a package or label design fills areas in the design with optical code elements at the desired dot density.

Figure 13:
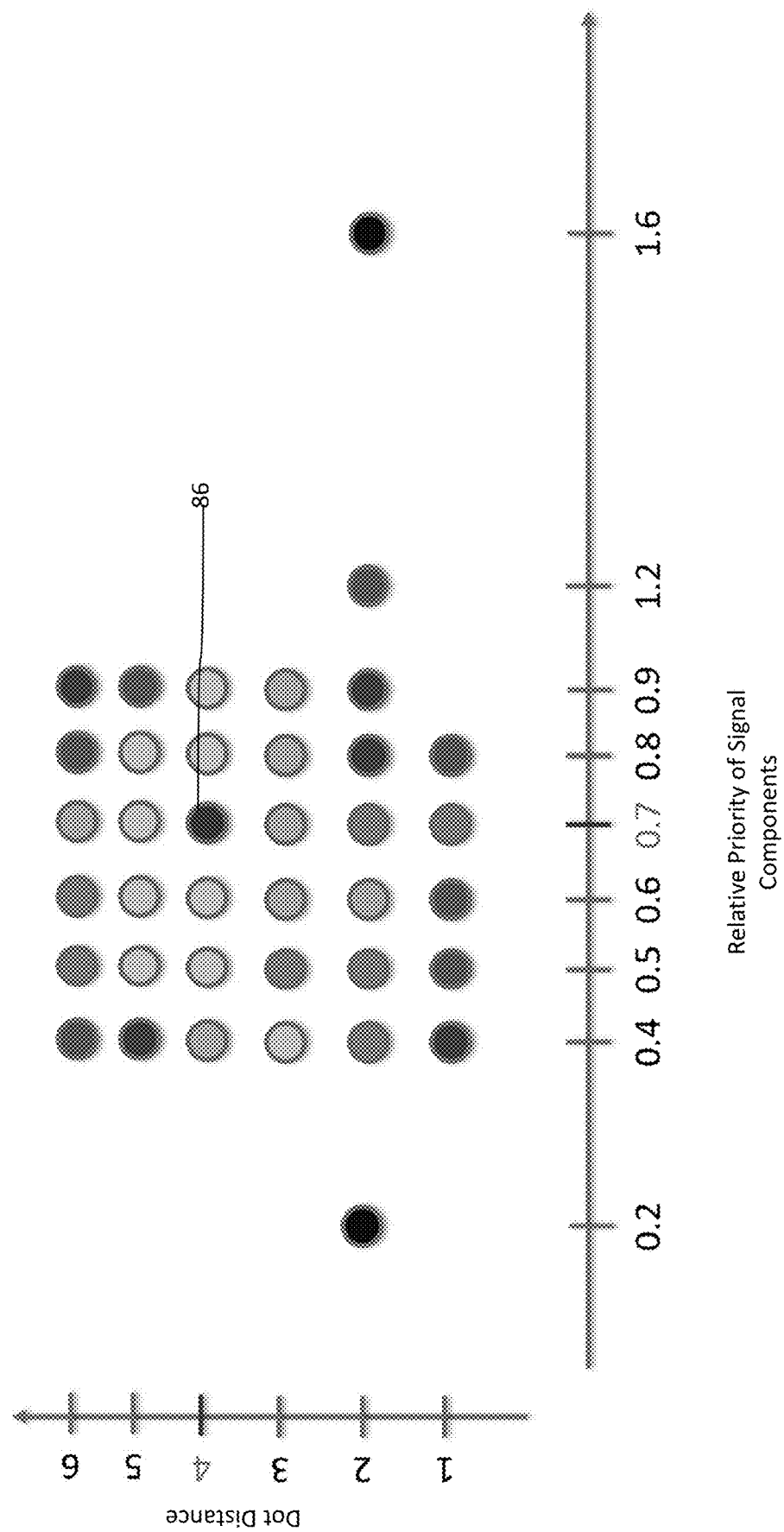
FIG. 13 is a diagram illustrating selection of optimal parameters in the example of FIG. 12 based on robustness metrics measured from the test images.

FIG. 13 is a diagram illustrating selection of optimal parameters in the example of FIG. 12 based on robustness metrics measured from the test images. In this example, the optimization method selects the location (86) in parameter space, at coordinates of dot distance=4, relative priority of 0.7, as this location has a robustness measure that exceeds a threshold value of reliability. In particular, in this example, this location provides a maxima in the measured robustness scores for the parameter ranges used in the training process.

One implementation searches for a location in parameter space that provides optimal robustness. It does so by computing the location in parameter space that provides a maximum robustness for each image in the training set of test images. The parameter space is defined as a space where the coordinates are values of the parameters being varied for the image, such as dot distance, dot size, dot density, and relative priority of signal component. Then, the optimization method finds the location in parameter space that minimizes the distance to the location of maximum robustness for each of the test images.

Figure 14:
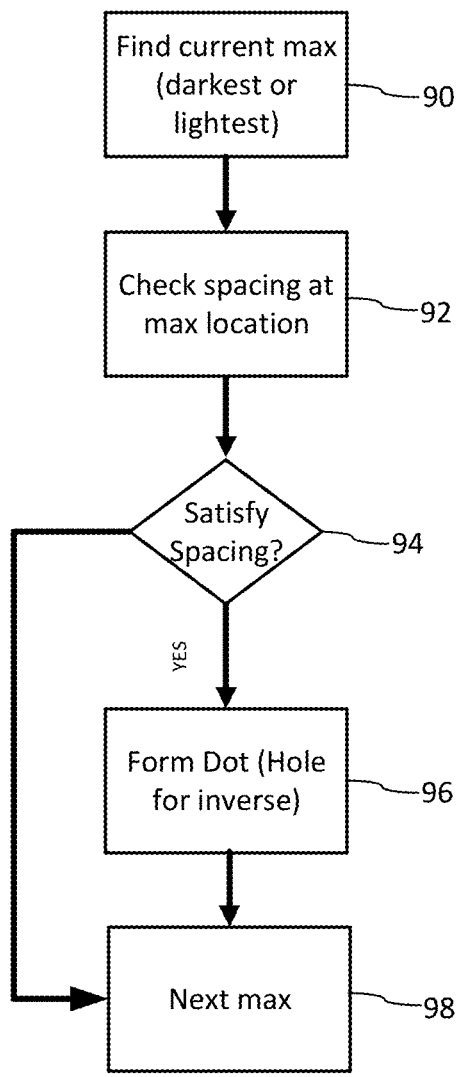
FIG. 14 is a flow diagram illustrating a method of forming elements of an optical code in a spatial area to achieve a desired dot density.

FIG. 14 is a flow diagram illustrating a method of forming elements of an optical code in a spatial area to achieve a desired dot density. This method begins with a dense, composite optical code, such as the one depicted in FIG. 10 (e.g., 78), having prioritized components. In this example, the priority is specified by amplitude of the element values in the optical code. It proceeds to map elements of the optical code to spatial locations of an output image to achieve a target spatial density. The mapping process prioritizes forming of the elements of the optical code in the output image based on amplitude. In the case of placing dark dots in a lighter area, the process proceeds in order of darkest to lightest element values in the optical code. Conversely, in the case of forming holes in a darker neighboring area, the process proceeds in order of lightest to darkest elements. Thus, to generalize, we use the term max in this description to cover both cases, with the perspective that the maxima (abbreviated as max) may refer to the darkest or lightest remaining element value as the process steps through element values in priority order determined based on amplitude.

In block 90, the mapping method begins by finding the max value among the multi-level pixel values in the dense optical code. An efficient way to implement the finding of the priority order is to sort the pixel values of the optical code by amplitude, and then step through in the order of the amplitude. The value being visited within an iteration of the process is referred to in FIG. 14 as the current max. For the current max, the process checks spacing of the location of the current max with the nearest element that has been formed previously in the output image (92).

If the location satisfies the minimum inter-spacing distance (94), it forms a dot at the location in the output image (96). The dot is placed according to the dot size and shape parameters set for the optical code at the target spatial resolution of the output image. When the location of the current max does not satisfy the minimum spacing requirement (94), the method proceeds to the next max among the remaining elements in the dense optical code (98), and a dot is not formed at the location of the current max. The placement process continues placing dots in this manner until the target spatial density is met.

The process of forming lighter "holes" amidst darker surrounding elements proceeds in a similar way, except that the max corresponds to the lightest element values of the optical code. Holes are formed by setting the pixel value at the output image location so that no ink, or a lighter ink relative to darker ink at neighboring locations, is applied at the location. In some variants, both dots and the inverse (holes) are formed at spaced apart locations satisfying the minimum spacing requirement. This has the advantage of increasing signal carrying capacity and signal robustness, as more signal of the optical code is retained in the output image.

FIGS. 15-22 illustrate this process graphically with a waveform 100 that represents the dense optical code in one dimension. In a discrete, digital form, the dense optical code signal is quantized into levels (e.g., 0-255 for 8 bit values) for a two dimensional array of pixel locations, sampled at a target spatial resolution. The waveform 100 has minima 102, 104 and maxima 106, 108, 110. Depending on the signaling scheme, the minima to maxima values range from darkest to lightest, or vice versa. For the sake of illustration, we describe an example where the minimum to maximum values range from darkest to lightest.

Figure 16:
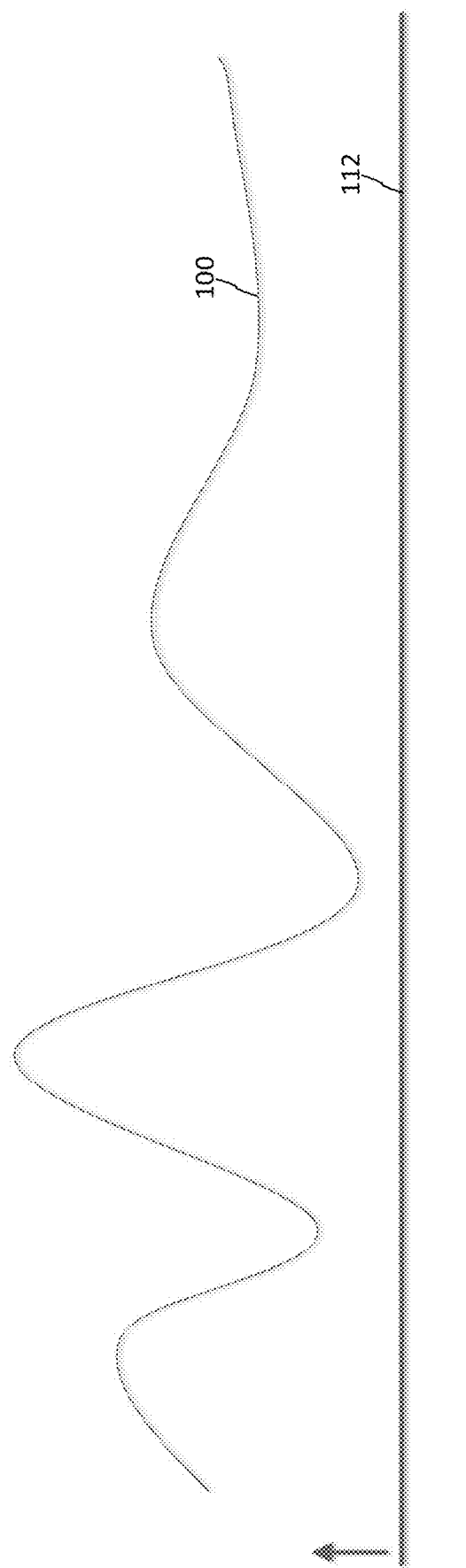

FIG. 16 depicts the start of the process forming optical elements in an output image. As noted, the method of FIG. 14 forms elements in order of priority, and the priority is conveyed in the amplitude. The line 112 moving toward the waveform 100 depicts the approach of visiting elements of the optical code in order of amplitude, starting from the minima and progressing upward. Though FIG. 16 shows the waveform of the optical code in its original spatial arrangement, its discrete amplitude values are preferably sorted by amplitude so that the method advances efficiently by stepping through a sorted list.

Figure 17:
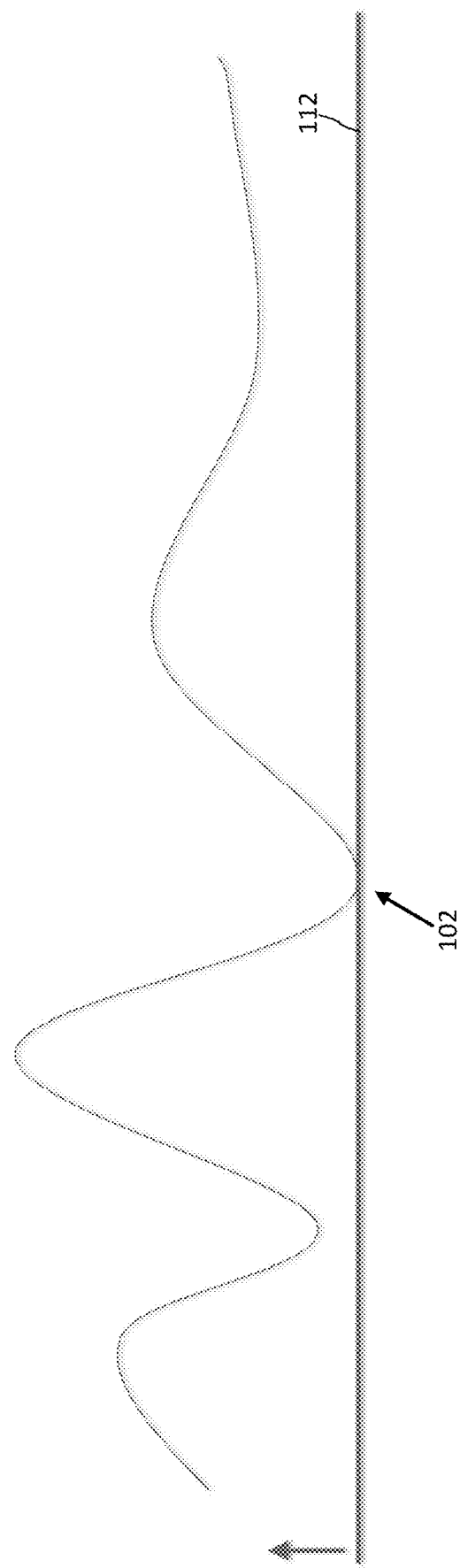
Figure 18:
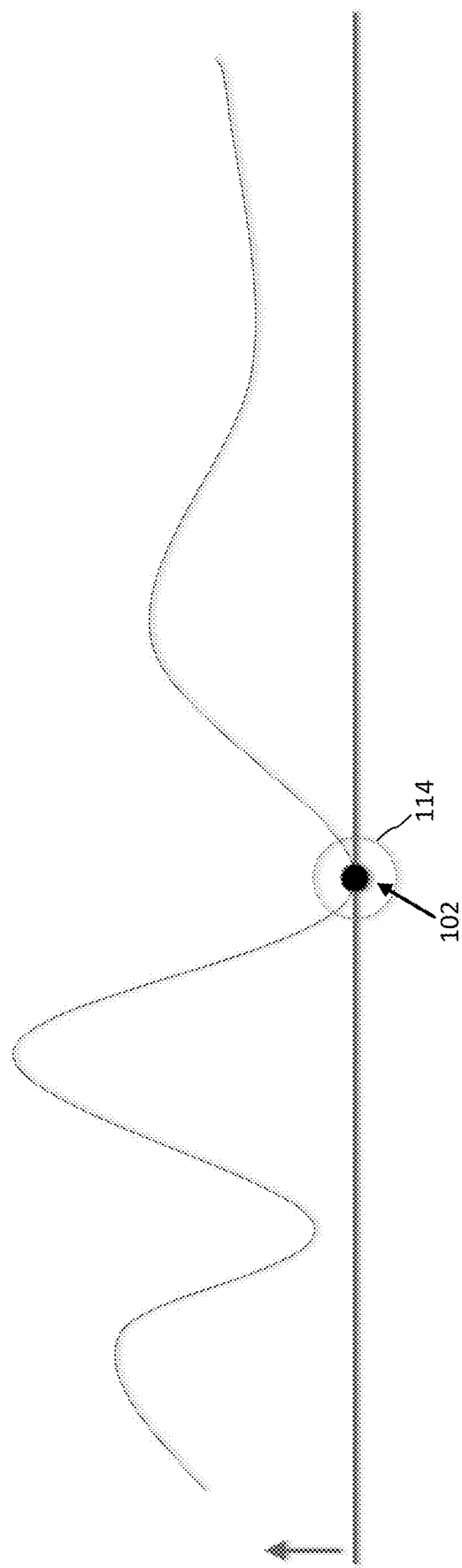

In FIG. 17, the process finds the darkest element (102). As shown in FIG. 18, an optical code element is formed at this location (102) and a minimum spacing depicted in ring 114 is enforced when the method forms additional elements of the optical code in the output image. The minimum distance refers to the minimum distance between outer edge of dot element 102 and nearest neighboring dot elements formed from the optical code signal.

Figure 15:
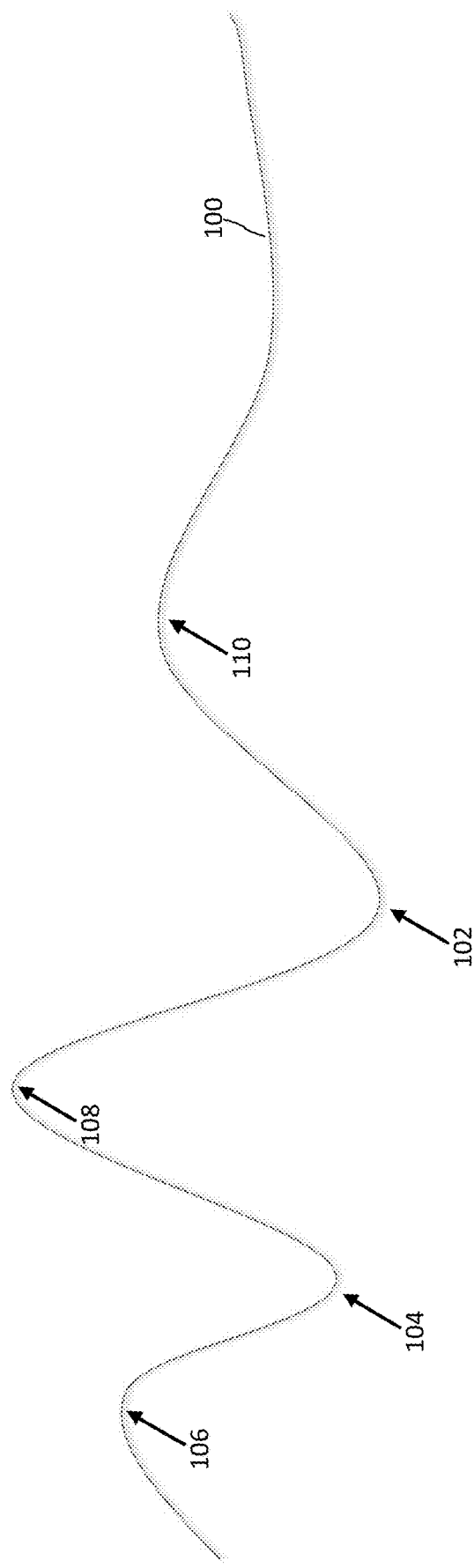
FIGS. 15-22 illustrate the process of FIG. 14 graphically with a waveform that represents a dense optical code.
Figure 19:
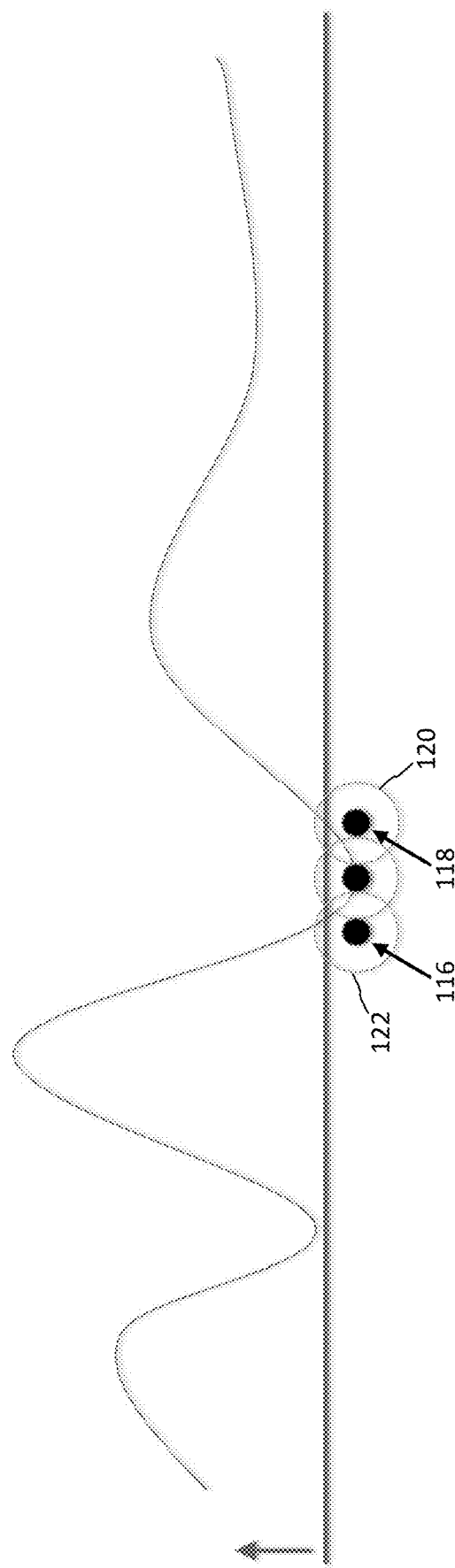
Figure 20:
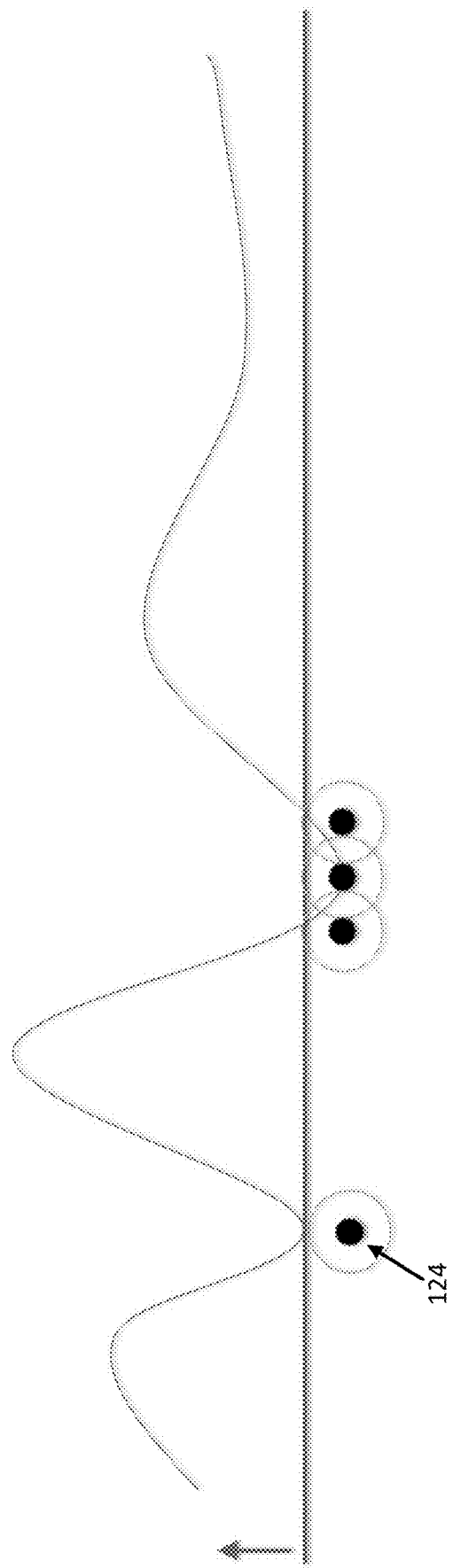
Figure 21:
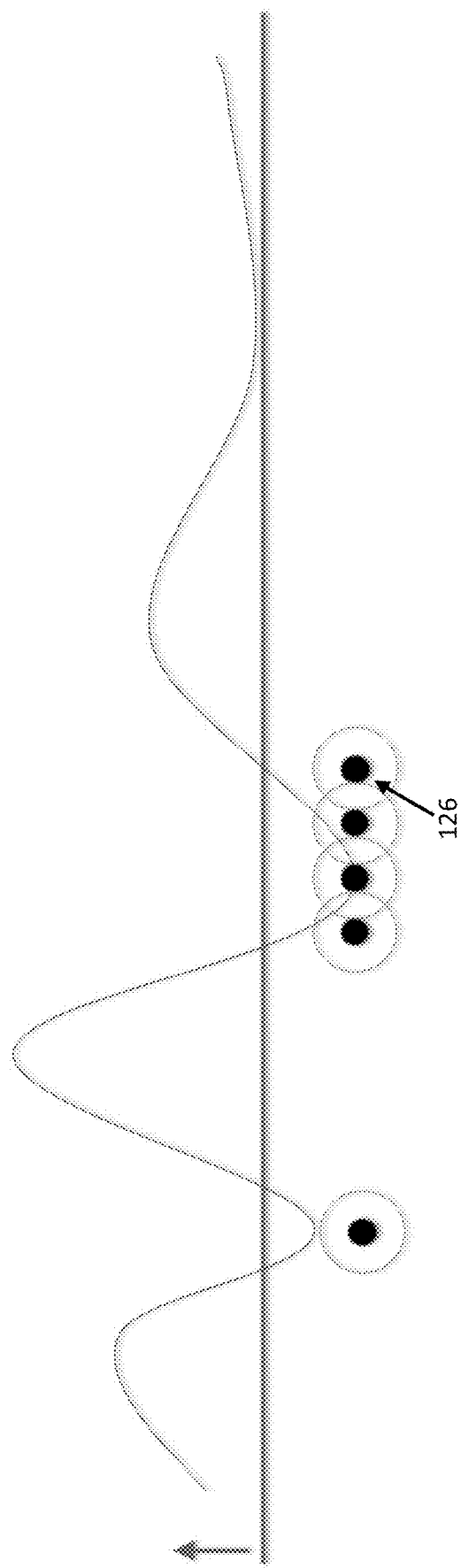
Figure 22:

FIG. 19 depicts placement of two additional elements (116, 118) at locations in the optical code that have the next highest priority and also satisfy the minimum spacing constraint (illustrated by rings 120, 122). As the method progresses, it visits and forms a dot in the output image at the location of another local minima at location 124 as shown in FIG. 20. This example illustrates how the method prioritizes placement of elements of the optical code signal elements in the output image around signal peaks, as these peaks convey signal components that are most important in the robustness and reliability of the optical code. Further depicting this point, FIG. 21 shows the forming of another dot 126 at the next highest priority, which is another dot around the minima 102 (FIG. 15). The process culminates when the dot density from forming the optical code elements in the output image reaches the desired dot density. FIG. 22 shows the placement of dots in one dimension, though the process applies to placing of dots in a two dimensional output image tile.

Figure 24:
FIG. 24 illustrates another example of the label design merged with the optical code, with additional degradation to illustrate robustness of the optical code.
Figure 23:
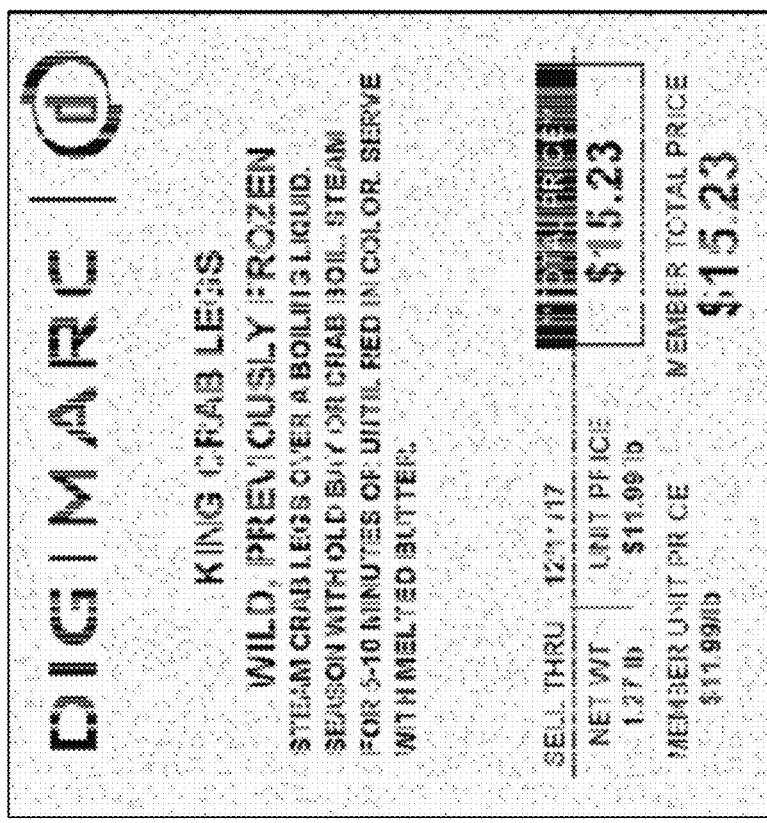
FIG. 23 illustrates an example of a label in which the output image of an optical code has been tiled and then merged.

For many applications, the output image comprising the mapped optical code elements is merged with a host image, which is then printed or otherwise marked on a substrate. FIGS. 23-24 illustrated examples where this output image is merged with a label design generated from a label template. The label design includes programmable elements such as a brand identifier and logo at the top and text providing product information. It also includes dynamically generated information within a scale, such as weight and price.

There are several strategies for merging the output image of the optical code (e.g., its "sparse" form at the target spatial density) with a host image, such as a label or package design image. In each, a tile of the optical code at the target spatial resolution is replicated in contiguous blocks over the entire host image and then merged with the host image. One method for merging is to overlay the optical code image with the host image. For example, the dot elements are placed within the host image. Both the host and optical code tile are binary, so where either the host or optical code has a dot, the printer prints a dot. Another method is to do an intelligent overlay, in which elements of the optical code are formed in the host image, while adhering to keep out distances from the boundary of characters of critical text content (such as price and weight). More specifically, dot elements are placed at all locations of the optical code, except where it is within a predefined keep out distance from the outer boundary of a critical host image character or graphic (such as conventional barcode line). (Such a keep out guard band around critical text and other graphics is detailed in publication 20170024840, referenced earlier.)

Yet another approach is to modulate the host image at the locations of the optical code elements so that the optical code is prioritized over non-critical host image information. The optical code, for example, is formed by modulating the host image with a dot or hole corresponding to the output image of the optical code signal. Dots are placed to encode dark elements of the optical code and holes are formed to encode light elements of the optical code.

FIG. 23 illustrates an example of a label in which the output image of an optical code has been tiled and then merged. This is a depiction of a thermally printed label in which some of the columns have been set to zero, corresponding to failure of a print element of the thermal printer that produced the printed label. When a thermal print element fails, it no longer marks a label along the column of the label stock that passes that print element. Our tests reveal that our methods for optimizing the optical code for a desired spatial density achieve improved robustness to the loss of information due to failure of print elements.

FIG. 24 illustrates an example of the label design merged with the optical code where even thicker columns of elements have been set to zero (meaning no dot elements printed). Again, in this case, our methods provide improved robustness, enabling the payload to be successfully decoded despite the image degradation.

FIG. 25 is yet another example in which tiles of the optical code have been merged with text. We tested the optical code merged with text as shown with varying font size and found increased robustness across a range of font sizes. The font size and text density is yet another feature that may be included in the test images used to optimize the parameters of the optical code at different spatial densities of the optical code.

Prioritizing of Data Signal Components

The transformation of a pristine, dense optical code into artwork of a host image results in loss of data signal of the optical code. This occurs because the transformations remove or distort portions of a dense data signal tile when it is converted to a more sparse spatial density (lower dot density per tile). Additionally, text, graphics and other image content of a host image into which the output image is inserted may interfere with the optical code. As sparsity of graphical elements increases, data signal elements are removed or altered, which reduces robustness. This reduces the capacity of the data channel in a given tile region of the output.

Incorporating the data signal into artwork also impacts the prioritization of signal components in the data channel of the artwork. This occurs because the artwork can interfere differently with the signal components. In addition, the amount of signal capacity dedicated to reference signal (e.g., synchronization signal) and payload signal to achieve reliable detection varies with the artwork design. Thus, the ratio of the signal components should be adapted for the artwork.

Figure 26:
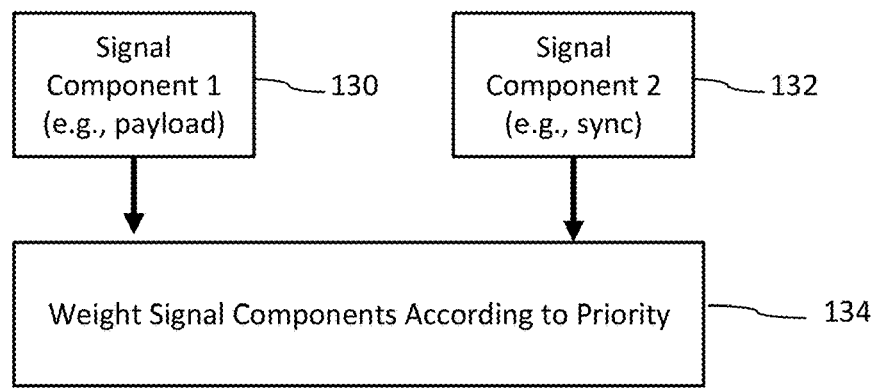
FIG. 26 is a diagram illustrating a method of weighting elements of a data signal prior to use in generating artwork that optimally carries the data signal.

Here we discuss strategies for prioritizing signal components to counteract loss of robustness. FIG. 26 is a diagram illustrating a method of weighting elements of a data signal prior to use in generating artwork that optimally carries the data signal. The optical code signal generator produces signal components. These include components that carry a subset of the payload bits (130) and components that provide a reference signal (e.g., synchronization signal) (132). In block 134, the optical code signal generator weights the components according to their priority. This priority is then used in the artwork generation to control which of the data signal elements are retained.

In one approach for adapting host images to carry tiles of the optical code signal, the process for inserting the optical code signal in a host image is executed with different weightings for the payload and reference components for a candidate artwork design and insertion strategy. This yields several variants of the artwork carrying the data signal. Additional permutations of each variant are then generated by distorting the artwork according to image shifts, rotation angles, reducing and enlarging spatial scale, noise addition, blur, and simulations of print element failure. Robustness measures based on both correlation with a reference signal for synchronization and correlation with the message signal are computed and stored for each artwork variant. Additionally the optical code reader is executed on each variant to determine whether it successfully decodes the payload. The component weighting and robustness metric thresholds are then derived by analyzing the distribution ratio of components that lead to successful payload decoding. The distribution illustrates which ratios and robustness metric values are required to lead to reliable detection. These ratios and robustness metrics are then used for the candidate artwork design and signal encoding method in an automated data encoding program.

Another approach optimizes the data signal in sparse artwork. To be compatible with sparse artwork, the data signal is also sparse, and is structured to be consistent with the sparse artwork. Sparse data signals can be binary (0,1), trinary (−1,0,1), or other coarse quantization. Sparse signals are typically low density, i.e., less than 50% ink or less than 50% space. Such a signal has maximum robustness at 50%, so any optimal sparse algorithm should increase in robustness as the ink/space density tends toward 50%

Sparse signals maintain robustness by using thresholds to create binary or trinary signals. These binary or trinary signals ensure that the detection filter will return a maximum value at desired signal locations. Between the sparse locations in the artwork, the detection filter will output a Gaussian distribution between maximum negative and positive outputs due to random noise introduced by the image capture (namely, scanner or camera noise). The Gaussian width depends on factors such as the amount of blur included in the image capture processing.

During optimization of sparse signals, a small amount of filtered noise is added to account for the fact that the detection filter will create non-zero values everywhere due to noise of the image capture device. The optimization parameters for sparse signals include weighting of reference signal to payload signal, element placement rules (e.g., minimum element spacing), and thresholds. There is a single threshold for binary signals. It is a negative threshold for low ink density, <50%, and a positive threshold for high ink density, >50%. There is a dual positive and negative threshold for trinary signals. The robustness objective is the same for dense and sparse signals. Namely, it is a detection robustness over the targeted workflow environment, which is modeled with distortions to the encoded artwork.

Selection of Data Signal Components: Filtering Considerations

Prior to decoding, imagery captured from a marked object may be processed by a predictive non-linear multi-axis filter. U.S. Pat. No. 7,076,082, which is incorporated by reference, details such a filter, termed an "oct-axis" filter. An exemplary form of oct-axis filtering compares a subject image sample with its eight surrounding neighbors to provide eight compare values (e.g., +1 for positive difference, −1 for negative difference, and 0 if equal), which are then summed. The filter output thus indicates how much the subject pixel varies from its neighbors. Different arrangements of neighbors and weights may be applied to shape the filter according to different functions. (Another filter variant is a criss-cross filter, in which a sample of interest is compared with an average of horizontal neighbors and vertical neighbors, which are then similarly summed.) Such filtering tends to accentuate the added code signal by attenuating the underlying artwork imagery to which the code signal is added.

In accordance with a further aspect of the present technology, when selecting data signal components to be included in a printed sparse mark, this anticipated filtering operation is taken into account.

Figure 27:
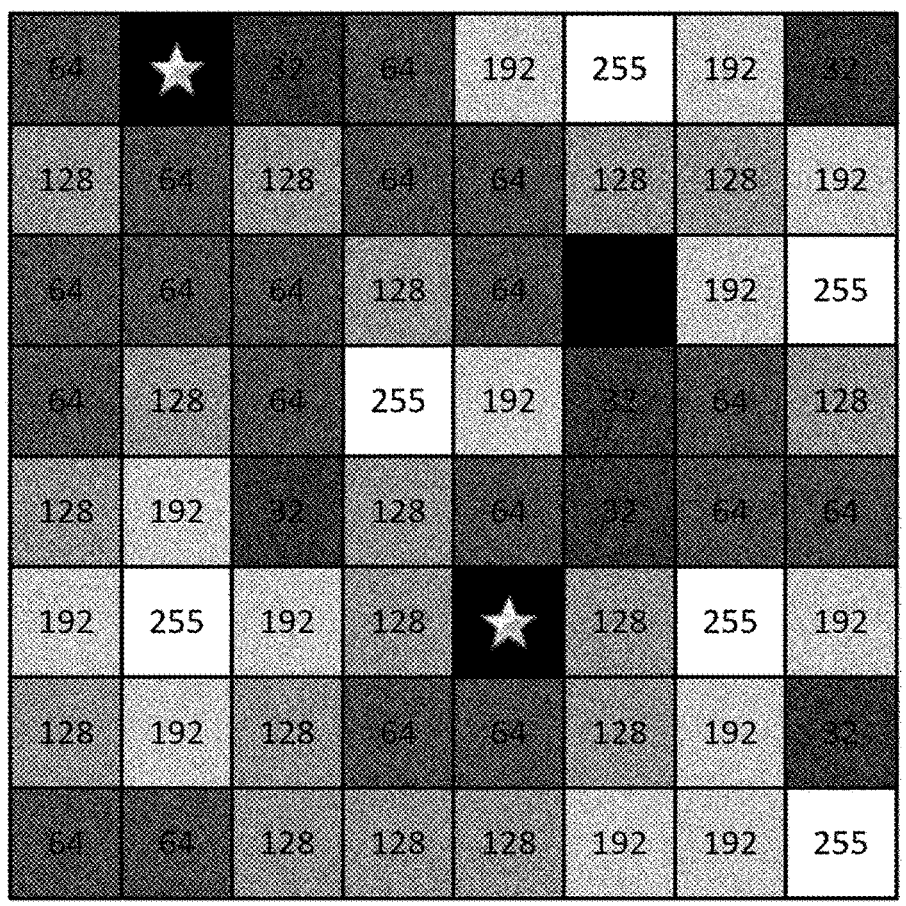
FIG. 27 shows an excerpt from a composite code, with the darkest elements marked for copying to an output tile as black dots.
Figure 30:
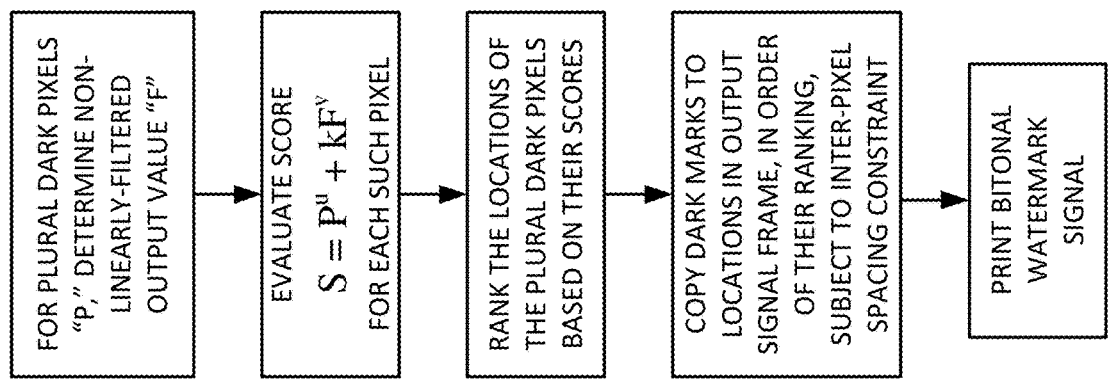
FIGS. 29, 30, 31, 32, 33 and 33a are flow charts illustrating aspects of the technology.
Figure 29:
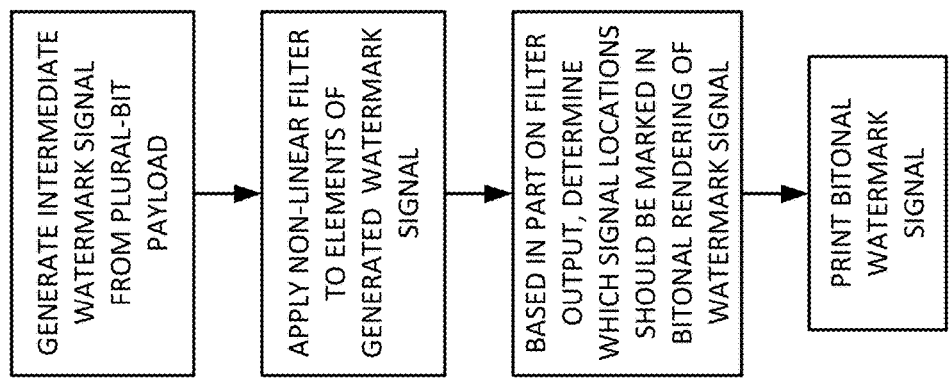
Figure 31:
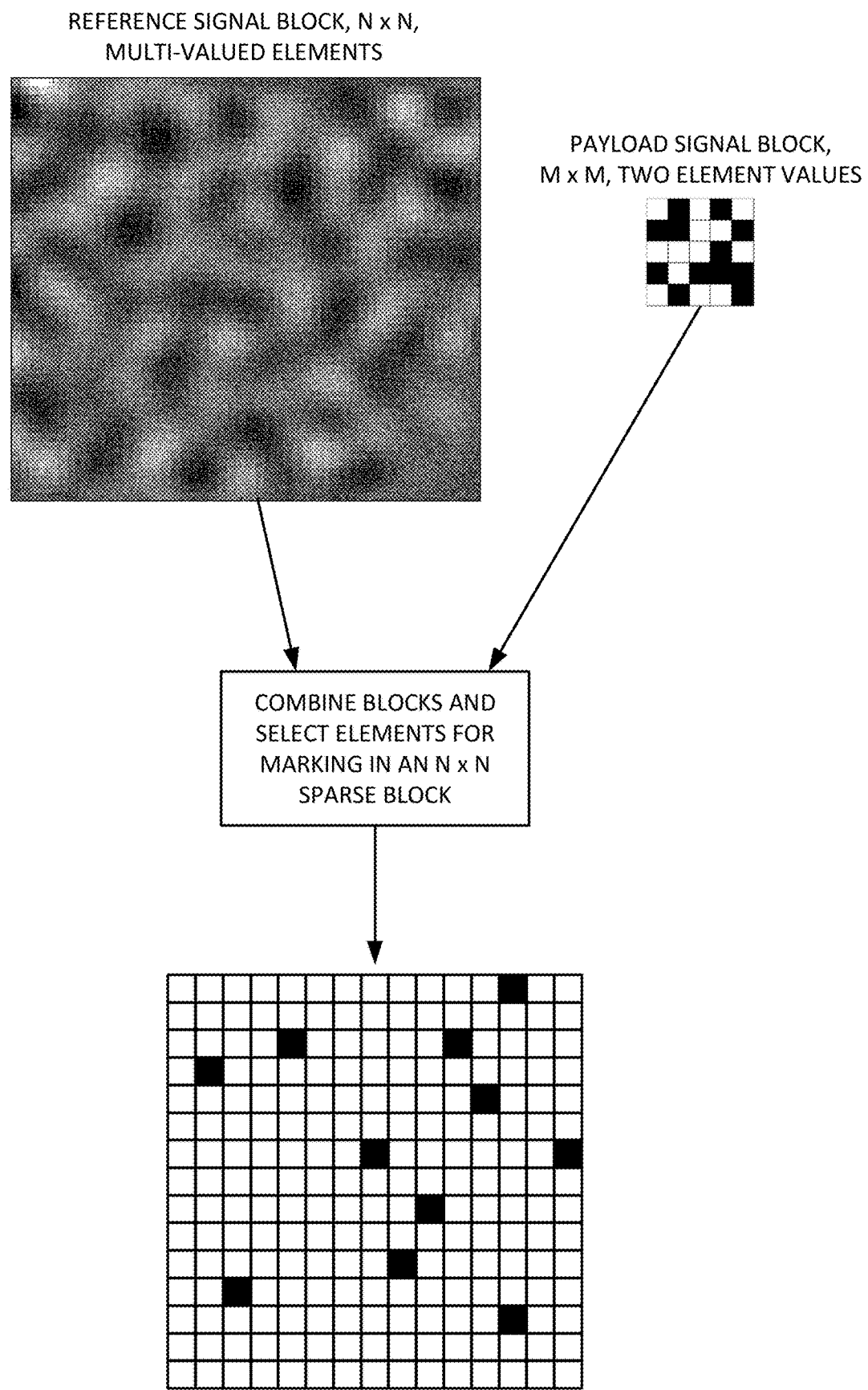

FIG. 27 shows an excerpt of a composite signal resulting from combining a reference signal at the target resolution, with an up-sampled payload signal, in a desired ratio, as described earlier in connection with FIG. 10. The numbers indicate pixel values, ranging from 0 at pure black, to 255 at pure white. To produce a sparse signal, an illustrative embodiment sorts this signal by pixel magnitude and identifies the starred pixels as locations to place a black dot in the output frame, because they are the darkest locations while meeting a placement (e.g., spacing) constraint.

However, such approach ignores the signaling potential of light pixels. The light pixels contribute nothing to decoding of a sparse mark, unless they are proximate to a printed, dark pixel. For the oct-axis, crisscross, or other non-linear filter to discern their light shade, they must be in the presence of darker pixels, so that the filter indicates their relative lightness. Else, the filter yields ambiguous output (e.g., values having a Gaussian distribution centered near zero).

To give the lighter pixels a role in conveying the code signal components, it is better to pick dark pixels for copying to the output frame that cause adjoining light pixels to be credited for their information as well. Picking one dark pixel may thus effect 2-, 3- or more-pixels' worth of information.

Figure 28:
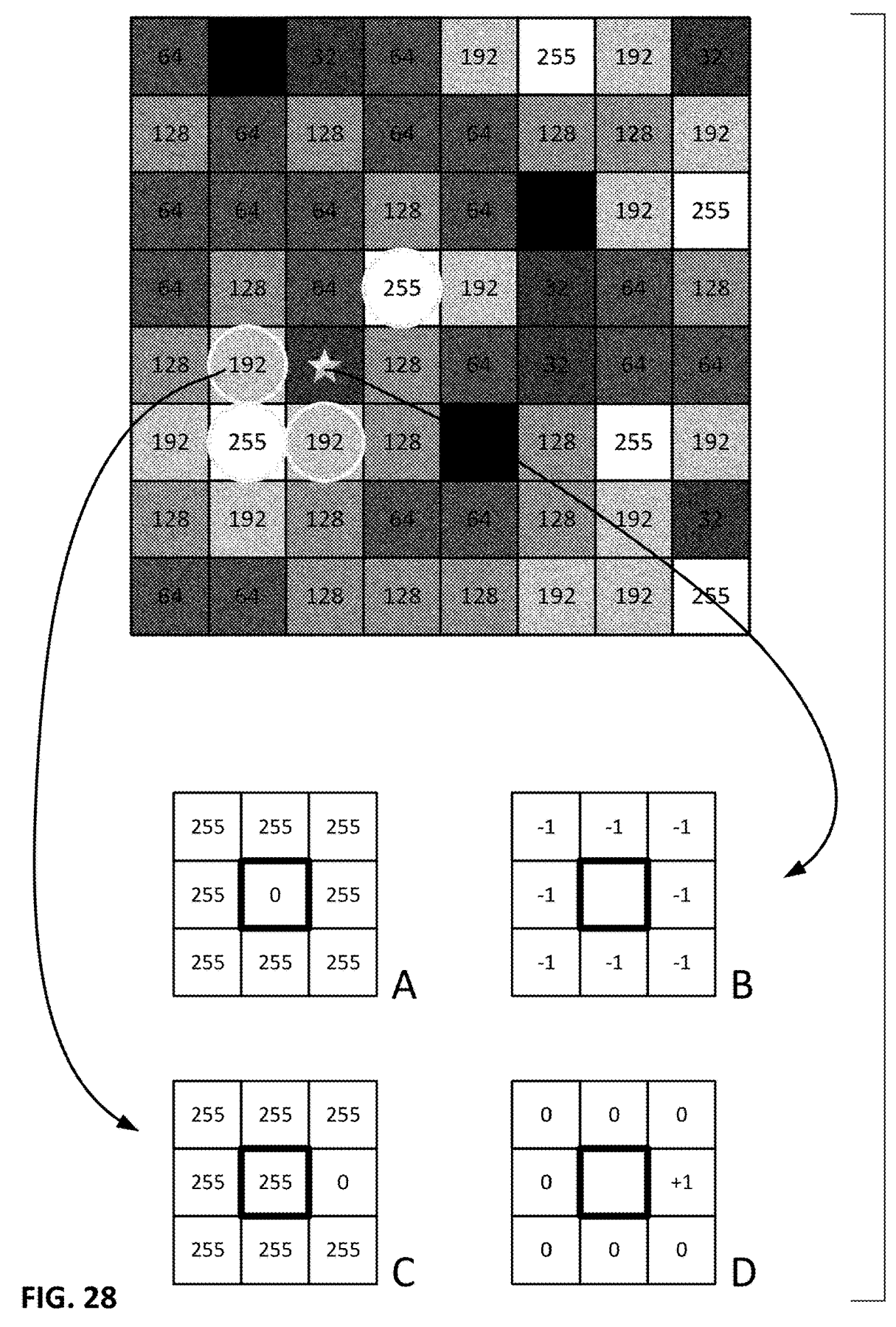

To illustrate, consider the starred dark pixel in FIG. 28. If the starred pixel is copied as a dark dot to the output frame, the circled, lighter pixels, all also contribute to decoded information in the detector. Data is contributed from five pixels, by copying only one dark pixel to the output frame.

That is, the starred mark copied to the output frame has a value of 0 (i.e., black). Each of the surrounding eight pixels is unprinted, and so thus has a very high pixel value in captured imagery—near 255. This is shown by inset A. Since the center pixel has a lower value than each of its eight neighbors, it produces a strong output from the oct-axis filter: −8, as shown in inset B.

Next consider, from FIG. 28, the leftmost of the light "192" circled pixels. It, and all its neighboring pixels—except the starred one—are unprinted. (Recall that only the starred dark pixel produces a dark dot in the output print.) The neighborhood centered on this light "192" pixel—as depicted in captured imagery—is thus as shown at inset C. Oct-axis processing produces an output for this "192" pixel, as shown at inset D, due to the presence of the adjoining dark pixel. (The oct-axis signal is weak, +1, but it is a signal nonetheless, and over the thousands of such pixels in the captured imagery, makes an important decoding difference.)

Similarly, each of the circled pixels in FIG. 28—none of which is printed—contributes some information to the decoder, since the adjoining starred dark pixel causes the predictive filter to produce non-zero output signals. And, of course, the dark pixel contributes information too.

The naïve selection of simply the darkest pixels sometimes results in picking dark pixels having this effect—enabling signal from adjoining light pixels to contribute information to the decoder. But that's just happenstance, not strategy.

In fact, naively picking simply the darkest pixels often results in surrounding pixels being misunderstood—by the decoder—as all being light in color. (They are, after all, unprinted.) This can mislead the decoder into understanding that, at such points, the message signal, plus weighted reference signal, at such points, has a high pixel value. If, in fact, the surrounding pixels are dark (e.g., with pixel values below 128), then this is exactly the wrong information.

To illustrate, consider the lower starred dark pixel in FIG. 27. If copied to the output frame, printed, and then imaged, it would cause the predictive filter to believe that all 8 of its surrounding pixels are relatively light. While true in a relative sense, this misleads the detector as to these surrounding pixels' import. Four are mid-grey, and the other four are various shades of dark. These latter four pixels, when predictive-filtered, would lead the detector astray—conveying information associated with light pixels, when they are actually dark pixels.

Thus, in picking dark pixels from FIG. 27 (or FIG. 10) for copying as dark dots to an output frame, it is best to pick pixels that are dark AND that are surrounded by a large number of truly light colored pixels. That way, the unprinted pixels surrounding the dark point in the output frame will be properly understood by the decoder—contributing correct information, rather than misleading information.

Such strategy can be implemented by applying the predictive non-linear filter that will likely be used for decoding, to the composite weighted-grid plus message signal. Dark pixels with the highest oct-axis filter scores are those that are surrounded by the lightest set of adjoining pixels. Picking these dark pixels for the output frame will help provide the most correct message and reference signal information per copied dark pixel.

Experimentation can determine a relative prioritization between these two criteria for selecting dark pixels for copying to the output frame: (a) the darkness of the candidate pixel, and (b) the value resulting from application of the filter function to the candidate pixel within the composite dense code signal. Such experimentation can reveal, for example, whether it is better to copy a dark pixel with a value of 10 and an oct-axis filtered value of −7, or a dark pixel with a value of 30 and an oct-axis filtered value of −8, etc. A factor "k" can be found that relates the two factors—optionally in conjunction with two exponents "u" and "v," such that a score can be evaluated for different {pixel value/filter value} pairs.

That is, a score (priority) S can be computed for a pixel value P and its corresponding filtered value F, as follows:

$$S = P^u + kF^v$$

Such a score can be determined for each dark pixel in the weighted-grid plus message signal (i.e., for each pixel having a value less than 128), and the results ranked. In this particular function the smallest scores are the best. Pixels can then be selected based on their position within the ranked list, subject to inter-pixel placement (spacing) constraints.

By such approach, dark pixel selection is based not just on inter-pixel spacing, but also on information efficiency considerations.

Figure 32:
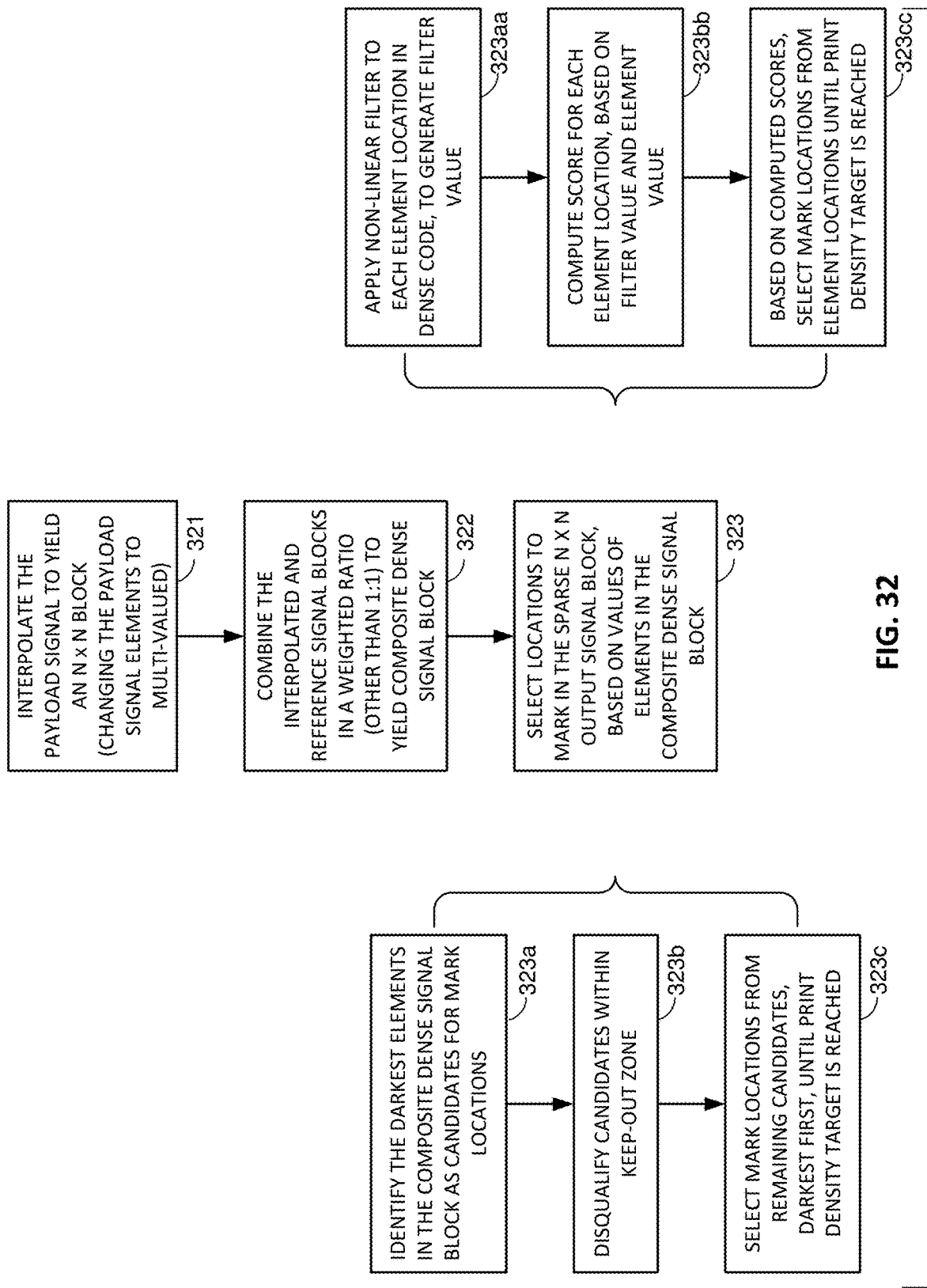

The flow charts of FIGS. 29, 30, 31 and 32 illustrate aspects of arrangements described above. In FIG. 32, blocks 323a-323c define particular algorithmic acts by which the function of block 323 can be achieved. Blocks 323aa-323cc define another algorithm by which the function of block 323 can be performed.

Selection of Data Signal Components: Payload Considerations

Codes of the sort detailed herein typically convey a plural bit payload (e.g., 20-100 bits). Each pixel in the composite signal frame of FIG. 10 (and FIG. 27) helps signal the value of one of the payload bits. The payload bits are encoded redundantly, so that across an output signal tile, each payload bit is typically expressed by between 4 and 60 dark dots in the output frame. These redundant bits are desirably spatially-spread, so that the complete payload can be recovered from imagery depicting just a fraction of the output signal tile (e.g., a quarter of the tile).

The light pixels of the output signal frame also can help signal the value of payload bit—provided that such light pixels are adjacent a dark pixel, and are correctly interpreted by the decoder—as discussed in the previous section.

In accordance with a further aspect of the present technology, understanding of which dark pixels in the composite frame correspond to which bits of the payload is considered, when picking dark pixels for copying to the output frame. Similarly, understanding of which adjoining light pixels in the composite frame correspond to which bits of the payload is likewise considered. Both considerations aim to have each of the payload bits expressed with approximately the same degree of strength in the output signal frame, desirably on a sub-tile basis.

In particular, the output signal tile can be divided into four square sub-tiles. A tally is then maintained of how many times each message bit is expressed by dark pixels, and by light pixels, in each sub-tile—yielding an aggregate strength per bit for each payload bit in each sub-tile.

Since light pixels produce only modest oct-axis output signals, their encoding of a bit may be weighted as contributing just a fraction (e.g., one-eighth) of the output signal strength contributed by a dark pixel encoding that same bit. That is, a dark dot may be regarded as representing a payload bit with a strength of "1," while adjoining light pixels represent their respective payload bits with strengths of 0.125. (However, not all eight adjoining light pixels may correctly represent payload bits, for reasons discussed above.)

In one particular embodiment, a target per-bit signal strength is determined, e.g., as follows: If the output tile is to have, say, 840 dark dots, and each dark dot represents one bit with a strength of "1" and, say, five other bits (due to surrounding white pixels that correctly encode bits) with a strength of 0.125, then the 840 dark dots can represent 840 payload bits at strength 1, and 4200 payload bits with strength 0.125. If there are 40 payload bits, then each can be represented by 21 dark dots, and by 105 light dots. Each bit is thus represented with an aggregate "strength" of 21+ (105*0.125), or about 34. Each sub-tile may thus represent each payload bit with an aggregate strength of about 8. This is a target value that governs copying of dark pixels to the output frame.

In particular, a ranked list of dark pixel candidates for copying to the output tile is produced, as detailed in the previous section. These dark pixel candidates are copied, in ranked order, to the output tile—subject to the dot placement (e.g., spacing) constraint. The tally of strength for each payload bit, in each sub-tile, is concurrently tracked (considering both dark pixels and adjoining light pixels). When the aggregate strength of any bit, in any sub-tile, first hits the target value of 8, then copying of candidate dark pixels to that sub-tile proceeds more judiciously.

In particular, if the next candidate dark pixel in the ranked list would yield aggregate strength for a particular bit, within that sub-tile, of more than 110% of the target strength (i.e., to 8.8 in the present example), then it is skipped. Consideration moves to the next candidate dark pixel in the ranked list.

By such approach, dark pixel selection is based not just on dot placement and information efficiency considerations; it is also based on approximately uniform distribution of signal energy across the different bits of the code payload, across the different sub-tiles.

(The just-detailed arrangement can naturally be applied to ranked lists of candidate dark pixels that are identified otherwise, e.g., by the naïve approach of ranking simply by pixel value, subject to a placement constraint.)

Figure 33:
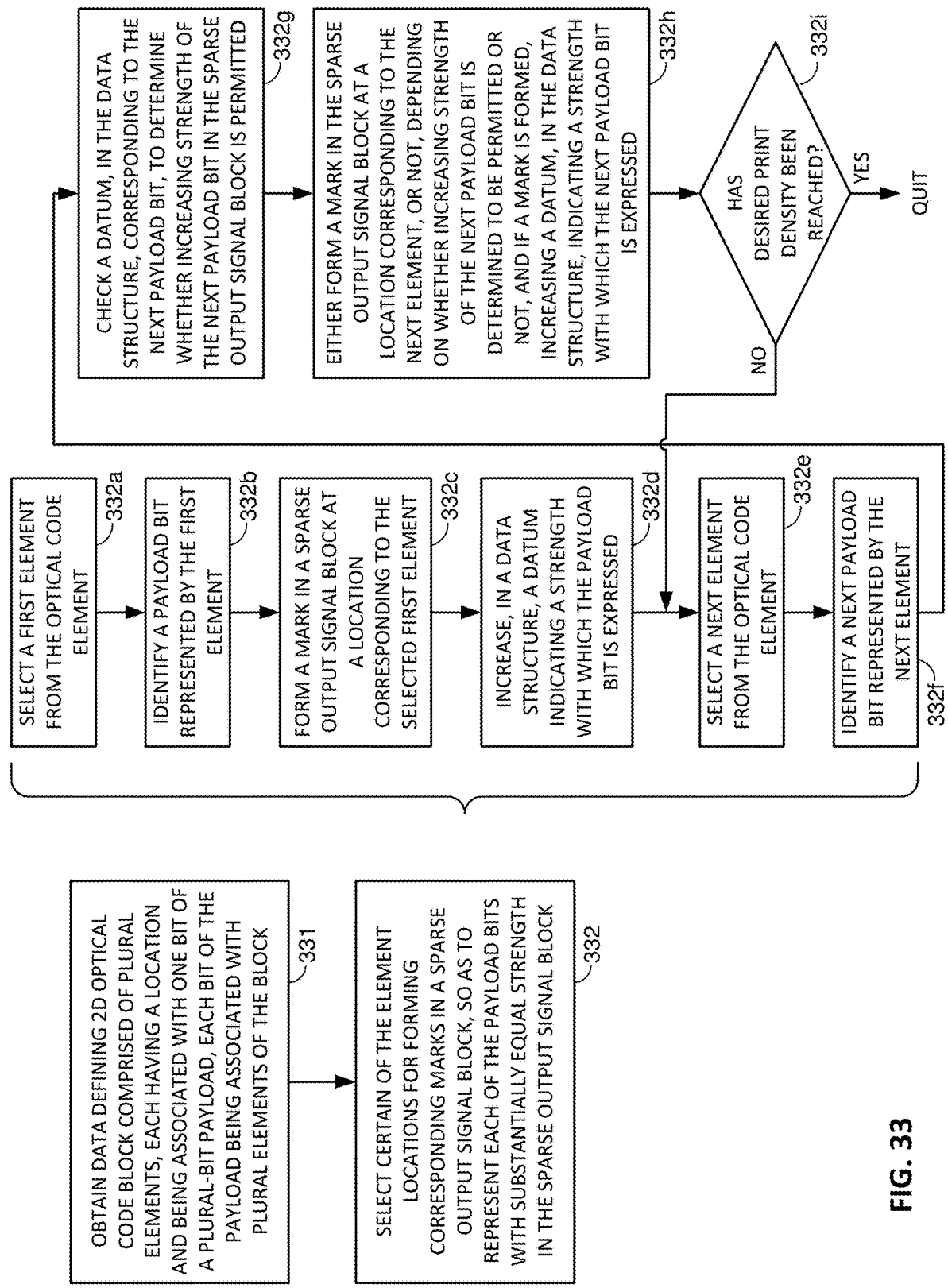
Figure 33A:
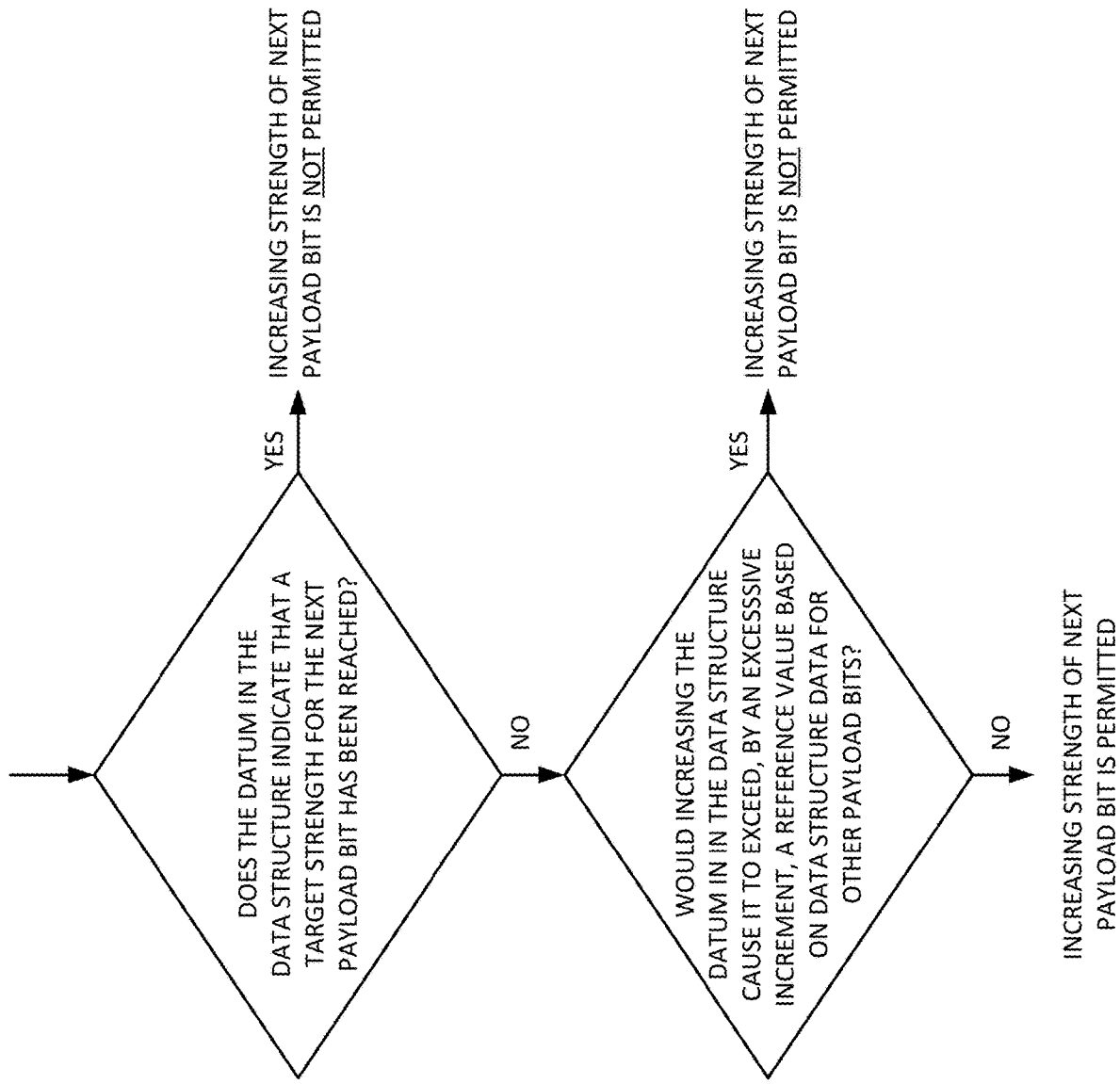

The flow charts of FIGS. 33 and 33A illustrate certain aspects of the foregoing. Blocks 331 and 332 define a method at a high level. Block 331 can be performed by creating a dense code as detailed elsewhere herein, or simply by reading a code from a memory, where it was previously stored. It should be noted that this code may be a payload code, alone; it needn't include a reference signal component.

Elements 332a-332i define particular algorithmic acts by which the function of block 332 can be achieved. FIG. 33a further defines algorithmic acts associated with block 332g.

In sum, this aspect of the present technology seeks to represent each payload bit substantially equally, in terms of strength, in the sparse output code. Substantially, as used in such method, here means within 10%, 20% or 50% of the average strength value for all payload bits.

Varying Amplitudes of Reference Signal Components to Aid Signal Robustness

This specification teaches various ways to increase the information efficiency and reliability of sparse signal encoding. Underlying all is the notion that black marks in the output signal frame are precious, and each should be utilized in a manner optimizing some aspect of signaling.

A limit to the amount of information that can be conveyed by sparse marking (or the robustness with which it can be conveyed) is the density of dots that are acceptable to customers, e.g., in blank areas and backgrounds of labels. Such labels are commonly applied to food items, and a customer perception that a label is "dirty" is antithetical to food marketing. This aesthetic consideration serves as a persistent constraint in sparse marking of such labels.

Applicant has found that, if the aesthetics of the marking are improved, then customers will accept a greater density of dots on the label. If dots can have a structured, rather than a random, pattern appearance, then the dots are regarded less as "dirtiness" and more as "artiness," and more of them can be printed.

In the prior art, the reference signal has been composed of multiple sine waves, of different spatial frequencies and (optionally) different phases, but of uniform amplitudes. Applicant has found that, surprisingly, individual spectral components of the reference signal can be varied in amplitude, without a significant impairment on detectability. By varying amplitudes of different components of the reference signal, different visual patterns can be produced in the sparse pattern.

Figure 34:
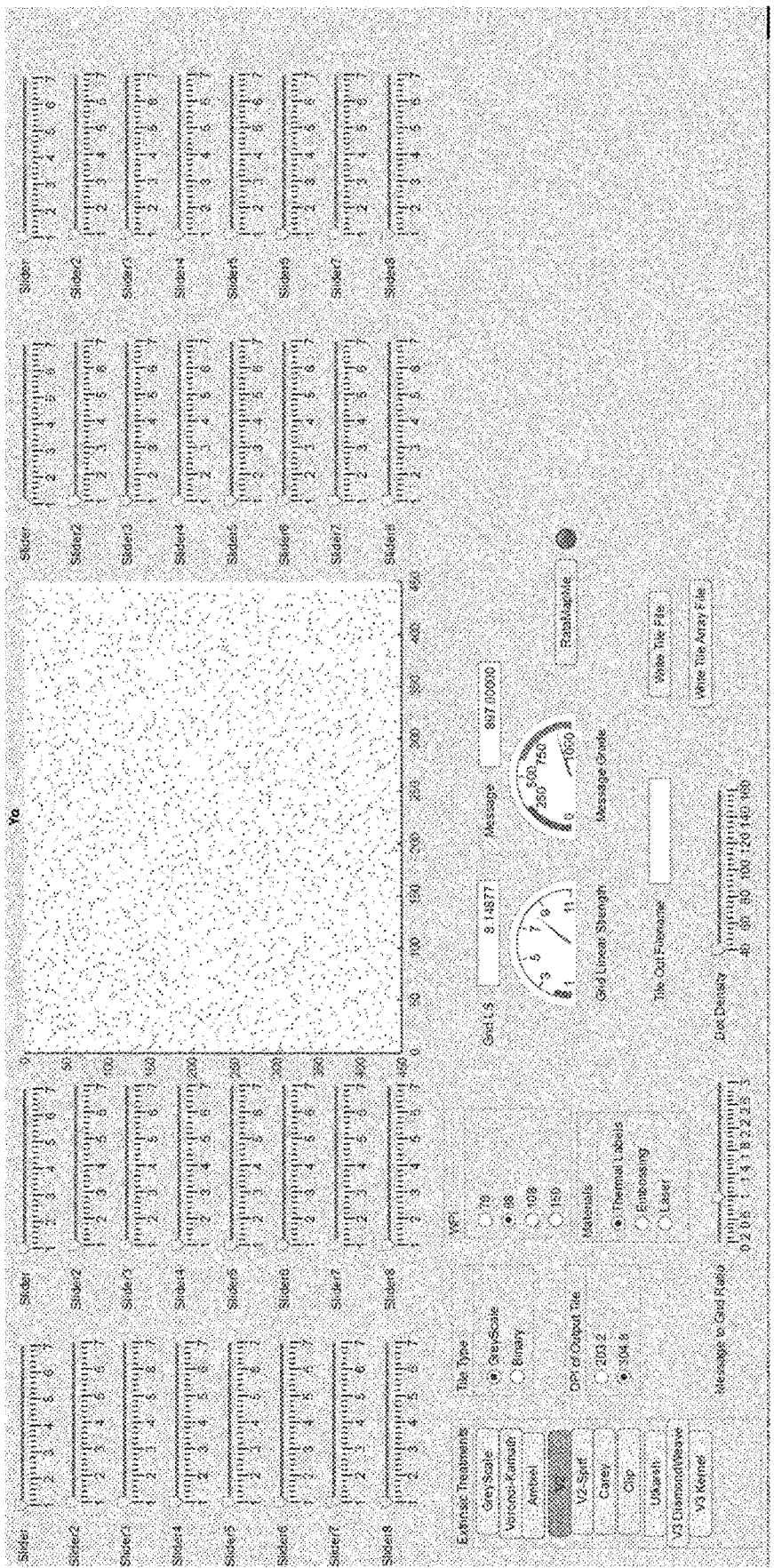
FIG. 34 shows a user interface of a software tool enabling the reference signal component of a composite mark to be tailored, resulting in a sparse mark that can include a visually-pleasing structure.

FIG. 34 shows the user interface (UI) of a software tool by which the visual appearance of sparse markings can be tailored. At the center of FIG. 34 is a rendering of the sparse mark presently being designed. The depicted sparse mark has a random aspect, because all the sliders (at upper right and left) are at their left-most positions.

To tailor the visual appearance of the sparse mark, a user operates these slider bars. Each slider bar controls the amplitude of a different one (or more) of the sinusoids that, collectively, define the reference signal.

At a slider's left-most position, a corresponding sinusoid signal is combined into the reference signal with weight (amplitude) of one. As the slider is moved to the right, the weight of that component signal is increased, providing a range that varies from 1 to 50. (In a different embodiment, a range that extends down to zero can be employed, but applicant prefers that all reference signal components have non-zero amplitudes.) As the sliders are moved, the rendering of the sparse mark at the center of FIG. 34 changes, correspondingly.

The buttons on the lower left enable the designer to select from between different extrinsic treatments. These buttons apply, e.g., different of the strategies detailed in this specification for combining the reference and payload signal components, and for selecting pixel locations from a composite mark for use in the output signal tile.

The gauges in the lower center of the UI indicate the strength of the reference signal and the message signal, as same are produced by models of the scanning and decoding process. (Same are detailed, e.g., in pending application Ser. No. 15/918,924, filed Mar. 12, 2018, the disclosure of which is incorporated herein by reference.)

To implement the illustrated GUI, applicant employed the GUI Development Environment (GUIDE) of the popular Matlab software suite.

Some reference signals include sinusoid components of spatial frequencies that are too high to be perceptible to humans under normal viewing conditions (e.g., a distance of 18 inches, with illumination of 85 foot-candles), due to the human contrast sensitivity function. No sliders are usually provided for such higher frequency components, as their amplitudes do not noticeably effect the visible pattern. Instead, controls are provided only for the lower frequency reference signal components—those whose spatial frequencies are humanly perceptible. (The median amplitude value of the lower frequency sinusoids may be determined, and the amplitudes of these higher frequency sinusoids may be set to this median value.)

Figure 35:
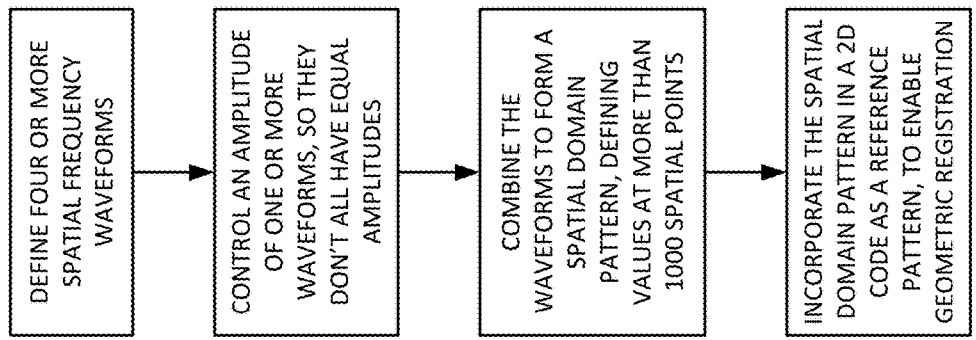
FIG. 35 is a flow chart associated with the technology of FIG. 34.

FIG. 35 shows a flow chart detailing aspects of this part of the technology.

Figure 36:
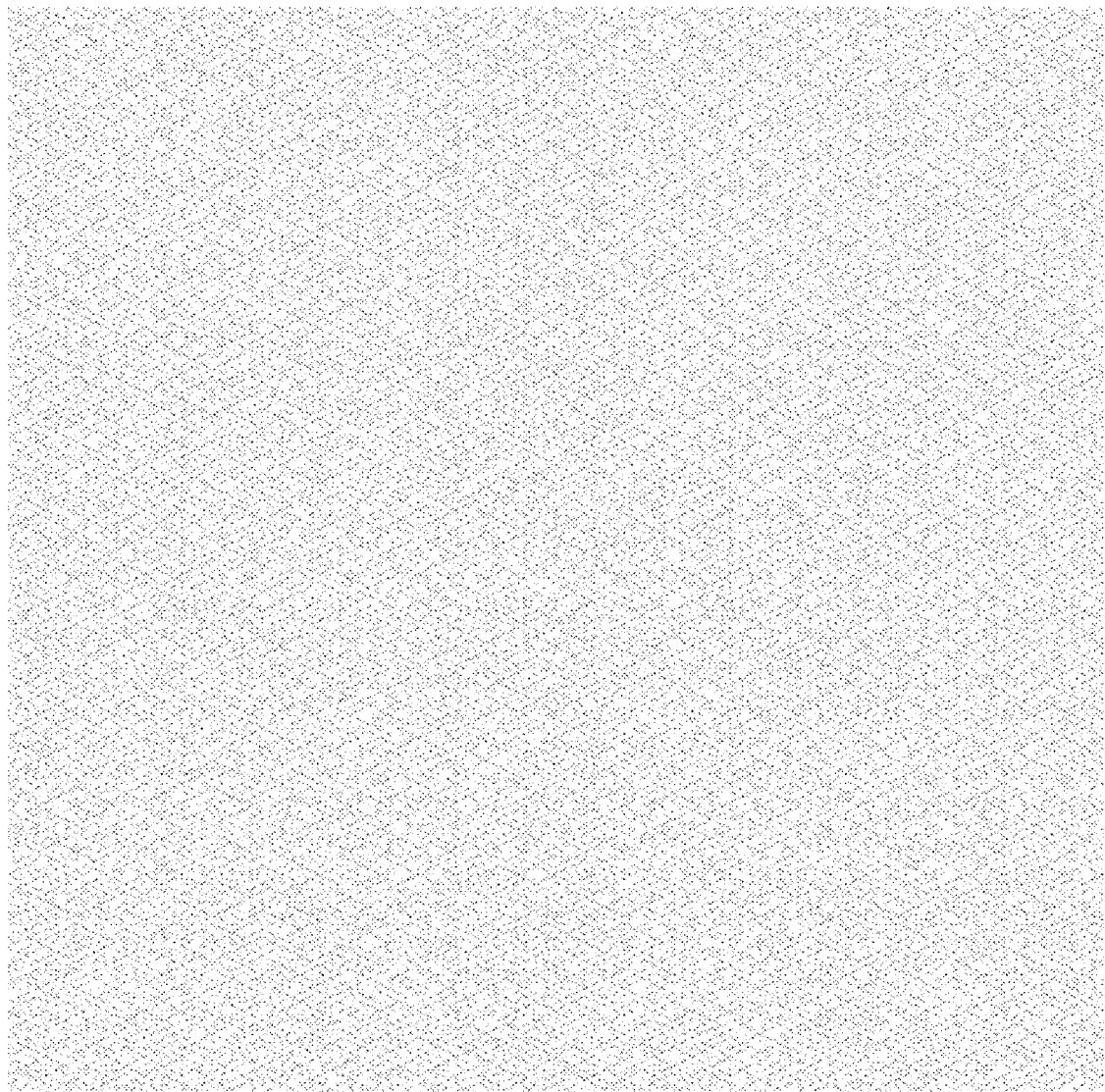
FIG. 36 shows a sparse mark produced by the software tool of FIG. 34.
Figure 36A:
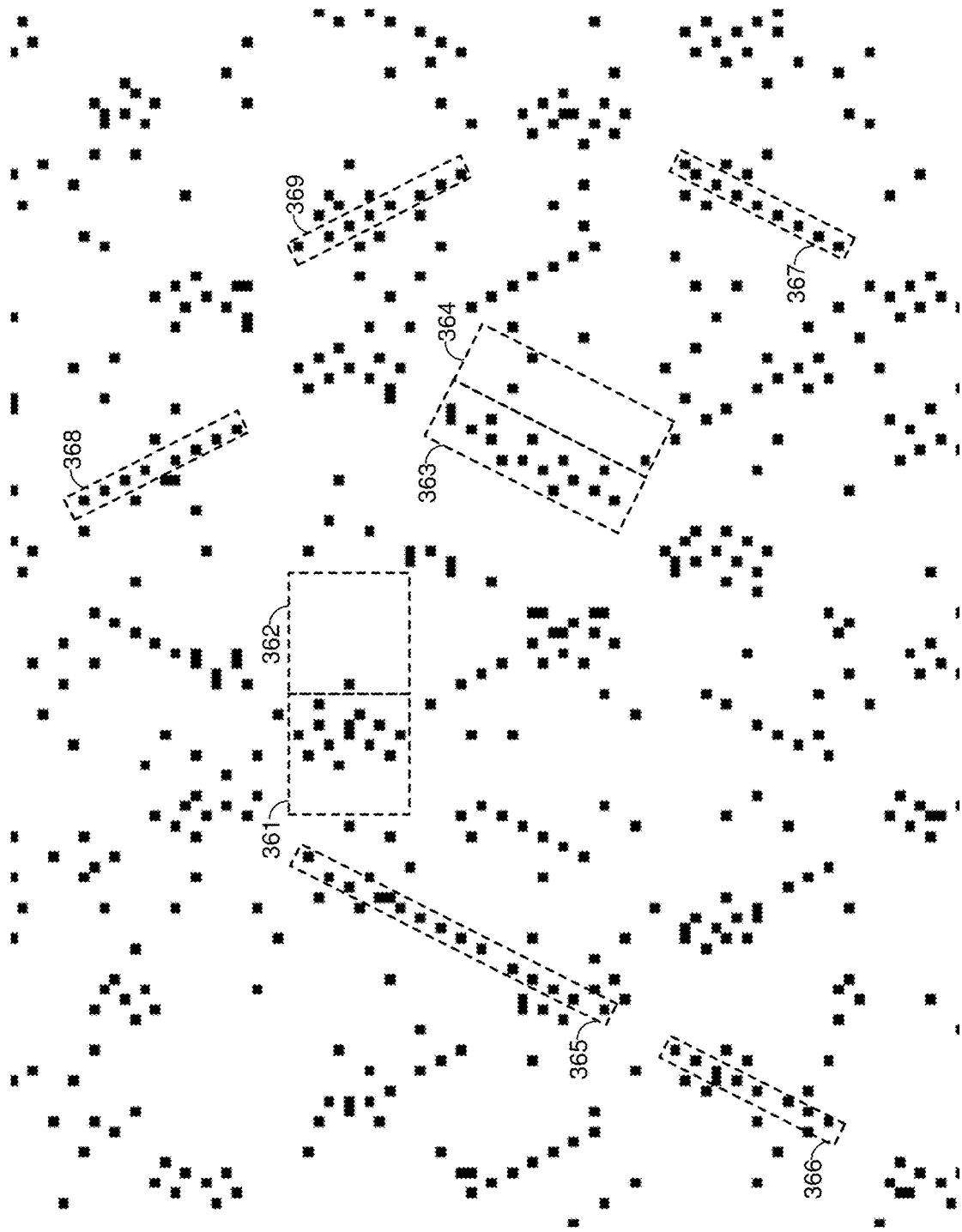
FIG. 36A is an enlargement taken from the upper left corner of FIG. 36.

FIG. 36, and FIG. 36A (which shows an enlarged excerpt from the upper left corner of FIG. 36), show an exemplary sparse mark resulting from unequal sinusoid amplitudes. As can be seen, the pattern is no longer purely random, but has diagonal patterning—akin to a herringbone weave. Instead of being perceived as "dirty," such an array of dots is often perceived as a textured background pattern that serves to contribute, more than detract, from a label's aesthetics.

The non-randomness of the markings in FIG. 36 can be quantified by counting the number of dots within adjoining areas of equal size. For example, square area 361 in FIG. 36A encompasses 13 dots. The adjoining square area 362 encompasses only one.

Likewise with the rectangular area 363 in FIG. 36A. It encompasses 15 dots, whereas the adjoining area 364 of same size encompasses only three.

Generally, a sparse pattern can be regarded as avoiding an appearance of randomness if a first rectangular area within the pattern encompasses a number, A, of dots and a second, adjoining rectangular area encompasses a number, B, of dots, where A is at least ten, and A is at least 200% of B. (Often A is 400% or 800% of more of B; in some cases B is zero.) These rectangular areas can be square, or one side can be longer than the other (e.g., at least three times as long—as in areas 363 and 364).

In many instances, the resulting sparse structure exhibits a diagonal effect. That is, the long sides of plural rectangles, 365, 366 and 367, that are sized and positioned to encompass the greatest number of dots in the smallest area, are parallel to each other, and are not parallel to any edge of the substrate to which the marking is applied. Often the diagonal effect is mirror-imaged about a central axis, leading to similarly dense groupings of marks aligned in rectangles of mirror-imaged orientation, as exemplified by rectangles 368 and 369 in FIG. 36A.

By a histogram function in Adobe Photoshop, the mean pixel value of an area of imagery can be found. For the FIG. 36A excerpt, it is 243.49, indicating that an aggregate 4.5% of the area is printed with black.

Figure 37:
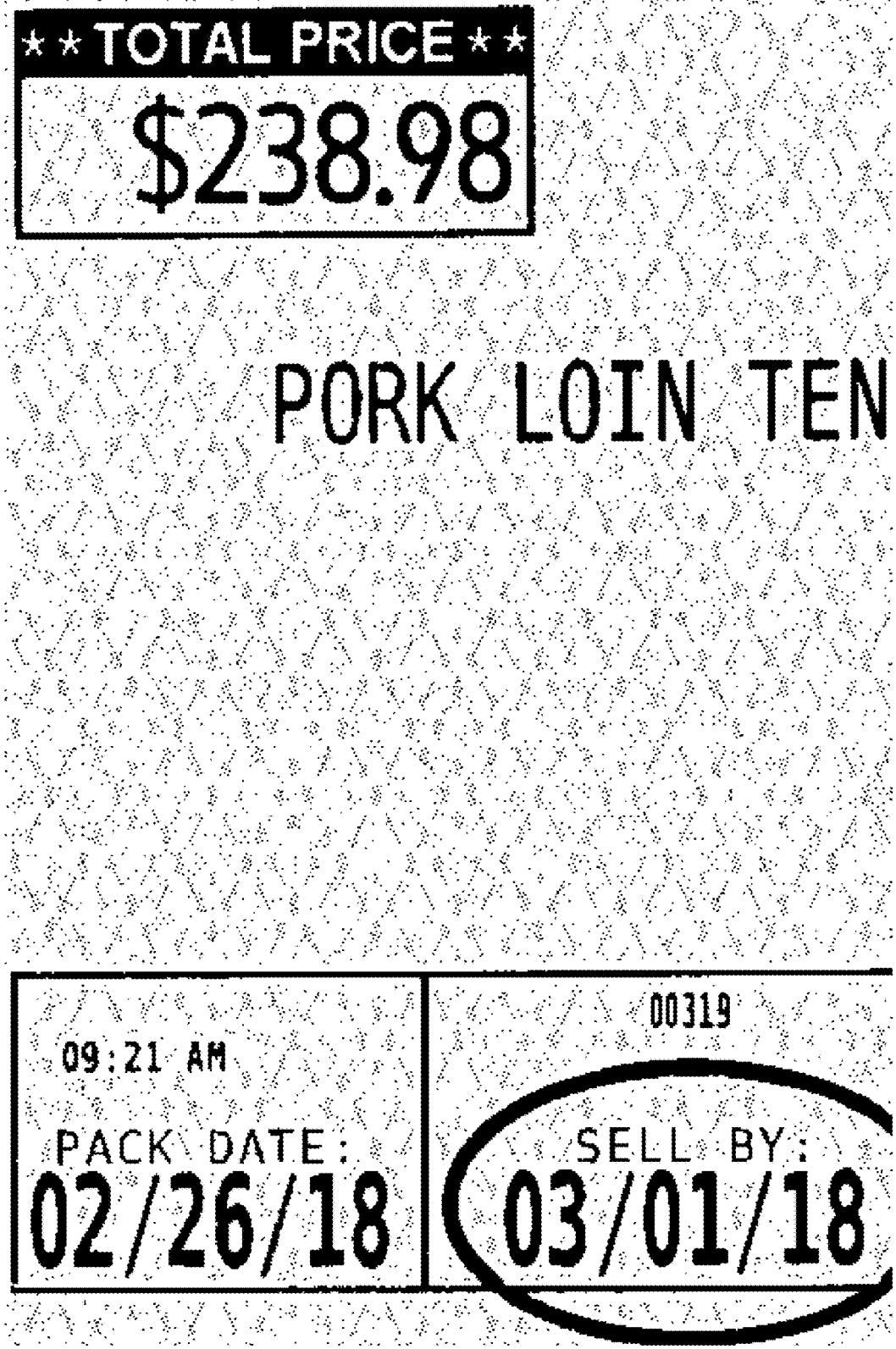
FIG. 37 is an enlarged excerpt of an adhesive label printed with a pattern produced by the software tool of FIG. 34.
Figure 42:
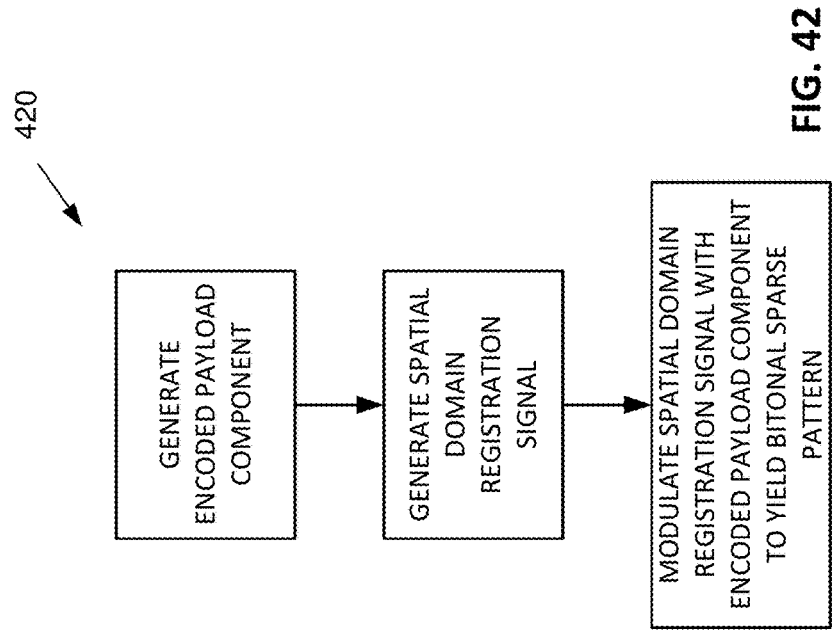
FIGS. 41 and 42 illustrate methods incorporating certain aspects of the present technology.
Figure 41:
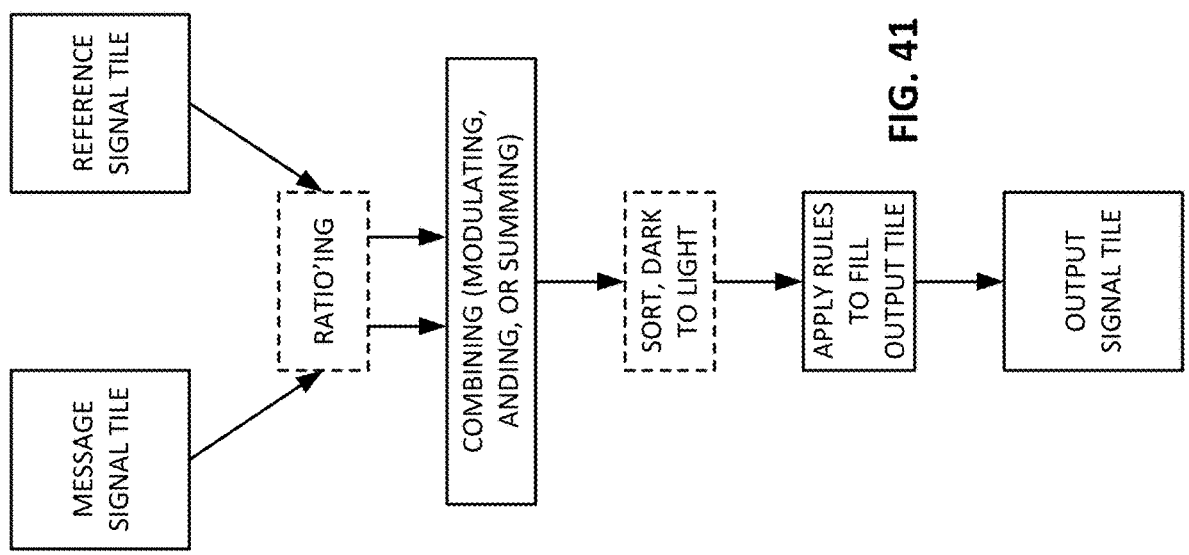

FIG. 37 depicts an excerpt of a thermally-printed adhesive label including such a background marking. As can be appreciated, the marking is more decorative than dirty. Yet it conveys—redundantly and robustly—a payload that represents not only the item's GTIN identifier, but also its weight, its price, and its sell-by date (more information, by about twice, than the UPC-A barcode with which food items are commonly marked). If part of the label is damaged, the full information can nonetheless be recovered.

The FIG. 37 label includes clear borders ("keep-out zones" or "guard bands"), of several unprinted dots in width, around each of the text character strokes. By this strategy, the patterning does not impair readability of the text.

For a random pattern (like that shown in FIG. 34) to be as un-objectionable to shoppers as the pattern shown in FIG. 37, it would need to be much lighter in tint—often twice as light (half as dark). Even then, the preference of most consumers is for the structured pattern.

It will be recognized the signals illustrated in FIGS. 34, 36, 36A and 37 include both payload and reference signal components. The two components can be combined in any of the manners detailed in this specification. The tuning of the structured appearance is achieved by tailoring the reference signal component.

By using a reference signal comprised of sinusoids of not just different spatial frequencies but also of different amplitudes, information can be conveyed with a greater signal to noise ratio (i.e., a greater ink density) than would otherwise be commercially practical. Structured patterns with more than 10% ink coverage can be employed on text-bearing labels, with good consumer acceptance.

Data Signal Mapping

FIG. 38 is a diagram illustrating a method of mapping data signal elements to locations within host image artwork. In this embodiment, the optimized data signal components 136 from the earlier-discussed signal generation are mapped to host image artwork locations 138. In processing module 140, graphic elements are generated and/or adapted at the artwork locations.

Applying the method of FIG. 6, the payload is formatted into a binary sequence, which is encoded and mapped to the locations of a tile. For illustration, we describe an implementation of an N by M array of bit cells. The parameters, N and M are integers, and the tile is comprised of an N by M array of bit cells. The size of the tile is configurable and depends on application requirements, such as payload capacity per unit area, robustness, and visibility. Payload capacity increases per unit area with the increase in bit cells per unit area. This additional capacity may be used to improve robustness by redundantly encoding the payload in plural bit cells. Visibility tends to decrease with higher spatial resolution (higher spatial density of bit cells), as the HVS is less sensitive to changes at higher spatial frequencies. Examples of bit cell array sizes include 64 by 64, 128 by 128, 256 by 256 and 512 by 512. While each of these is square and has a dimension that is power of 2, the tile need not be so limited. The bit cells correspond to spatial locations within a tile. In particular, the spatial locations correspond to pixel samples at a configurable spatial resolution, such as 75-600 DPI. The payload is repeated in contiguous tiles of host image artwork. An instance of the payload is encoded in each tile, occupying a block of artwork having a size that depends on the number of bit cells per tile and the spatial resolution. The tile is redundantly encoded in several contiguous tiles, providing added robustness, as the detector accumulates signal estimates for a payload across tiles. Additionally, the entire payload may be extracted from a portion of a tile in configurations where it is redundantly encoded in sub-tile regions.

A few examples will help illustrate these parameters of a tile. The spatial resolution of the bit cells in a tile may be expressed in terms of cells per inch (CPI). This notation provides a convenient way to relate the bit cells spatially to pixels in an image, which are typically expressed in terms of dots per inch (DPI). Take for example a bit cell resolution of 75 CPI. When a tile is encoded into an image with a pixel resolution of 300 DPI, each bit cell corresponds to a 4 by 4 array of pixels in the 300 DPI image. As another example, each bit cell at 150 CPI corresponds to a region of 2 by 2 pixels within a 300 DPI image and a region of 4 by 4 pixels within a 600 DPI image. Now, considering tile size in terms of N by M bit cells and setting the size of a bit cell, we can express the tile size by multiplying the bit cell dimension by the number of bit cells per horizontal and vertical dimension of the tile. Below is a table of examples of tile sizes in inches for different CPI and number of bit cells, N in one dimension. In this case, the tiles are square arrays of N by N bit cells.

TABLE 1

Examples of Tile Size for Different Cells Per Inch (CPI)

| Tile Size (N) | 75 | 100 | 120 | 150 | 300 | 600 |
|---|---|---|---|---|---|---|
| 32 | 0.43 | 0.32 | 0.27 | 0.21 | 0.11 | 0.05 |
| 64 | 0.85 | 0.64 | 0.53 | 0.43 | 0.21 | 0.11 |
| 128 | 1.71 | 1.28 | 1.07 | 0.85 | 0.43 | 0.21 |
| 256 | 3.41 | 2.56 | 2.13 | 1.71 | 0.85 | 0.43 |
| 512 | 6.83 | 5.12 | 4.27 | 3.41 | 1.71 | 0.85 |

These examples illustrate that the tile size varies with bit cells per tile and the spatial resolution of the bit cells. These are not intended to be limiting, as the developer may select the parameters for the tile based on the needs of the application, in terms of data capacity, robustness and visibility.

There are several alternatives for mapping functions to map the encoded payload to bit cell locations in the tile. In one approach, prioritized signal components from the above optimization process are mapped to locations within a tile. In another, they are mapped to bit cell patterns of differentially encoded bit cells as described in U.S. Pat. No. 9,747, 656, incorporated above. In the latter, the tile size may be increased to accommodate the differential encoding of each encoded bit in a pattern of differential encoded bit cells, where the bit cells corresponding to embedding locations at a target resolution (e.g., 300 DPI).

For explicit synchronization signal components, the mapping function maps a discrete digital image of the synchronization signal to the host image block. For example, where the synchronization signal comprises a set of Fourier magnitude peaks or sinusoids with pseudorandom phase, the synchronization signal is generated in the spatial domain in a block size coextensive with the tile. This signal component is weighted according to the priority relative to the payload component in the above-described optimization process.

In some cases, there is a need to accommodate the differences between the spatial resolution of the optical code elements and the spatial resolution of the print or other rendering process. One approach is to generate the optical code signal at a target output resolution of the rendering process, as illustrated previously.

Another is to adapt or shape sparse optical code signal elements to transform the optical code resolution to the output resolution. Consider a case where the rendering device is a thermal printer with a spatial resolution of 203 DPI for label printing. FIG. 39 shows examples of how to accommodate different optical code resolutions for an output resolution of 203 DPI. In this example, the general term introduced above, CPI, is expressed as waxels per inch (WPI), where the bit cell is referred as a "waxel." On the far left, an optical code resolution of 203 WPI is a one-to-one mapping to the output resolution of the thermal printer at 203 DPI. In next case, an optical code resolution of approximately 101 WPI is obtained by mapping a dot in a bit cell of the optical code to one of the two by two pixel locations at the corresponding location in the output image at 203 DPI. In the next example, an optical code resolution of about 68 WPI is achieved by mapping a dot in a bit cell of the optical code to the center of the corresponding three by three pixel region in the output image at 203 DPI. The far right example shows a case of approximating a 51 WPI optical code resolution in the output image at 203 DPI.

The dot size of an optical code element is another variable that may be optimized in the above process. In implementations, we vary the dot size by building a dot in the output image from one, two by two or larger cluster of dots. For example, in this case the dot size is expressed as the width of a dot in the output image at the output image DPI.

FIG. 40 illustrates dot pattern variation to achieve improved visual quality and robustness. In addition to varying dot size, the configuration of a dot may be altered to improve visual quality or robustness. The dot size of the dot configuration on the left is a size 2, meaning that it is comprised of a cluster of two-by two dots at the output resolution of the optical code. The desired spatial resolution may be obtained with better visual quality by varying the configuration as a function of spatial position in the tile. For example, the middle and right dot clusters of FIG. 40 encode the same optical code element as the two by two cluster on the left, yet do so with a different dot cluster configuration that provides a higher visual quality. Additionally, this variation achieves similar robustness, even as thermal print elements fail, because at least a portion of the dot cluster will remain in the event of failure of a print element that prints one of the columns of dots passing through this dot cluster.

Additional Disclosure

Referring to FIGS. 41, 42, 32, 44A, 44B, 45 and 46, the following discussion further elaborates on one particular embodiment 420 of the arrangements described earlier.

As in the arrangement of FIG. 5, two signal components—payload and reference—are first determined. One is used to modulate the other. However, rather than modulate phases of reference signal components (or on/off-keying of such components), embodiment 420 identifies positions of local extrema in the spatial domain reference signal, and forms marks (dots) in an output signal block at such positions—depending on a value of a spatially-corresponding element of the payload signal.

Figure 43:
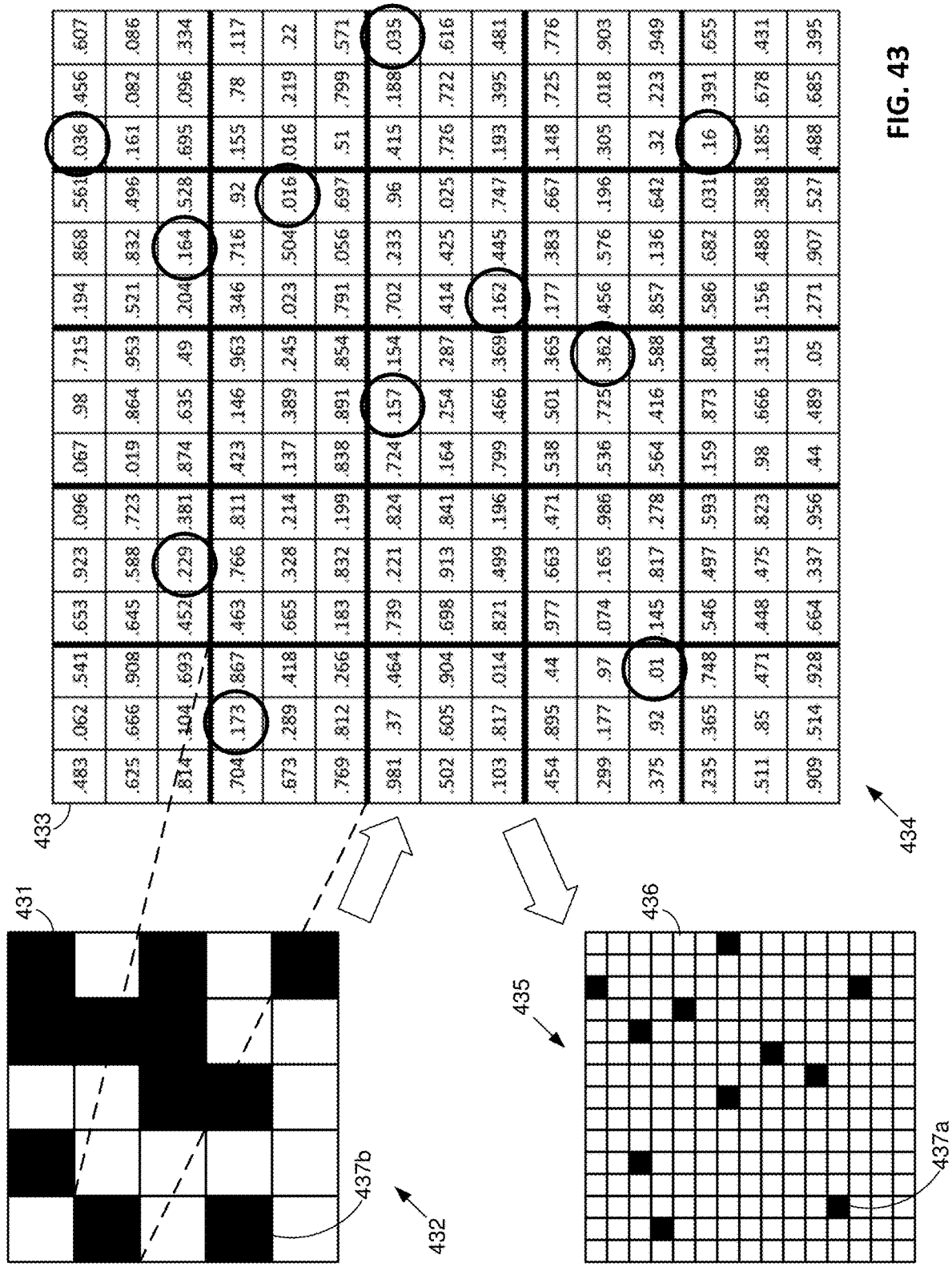
FIG. 43 illustrates modulation of a reference signal component with a payload signal component, according to one aspect of the technology.

FIG. 43 illustrates an excerpt 431 of an encoded payload component block 432 (which may also be termed a message data array). This part is comprised of an array of signal elements, each drawn from a set of two possible values (e.g., {0,1}, {−1,1} or {black,white}). The depicted excerpt spans an area of just 5×5 elements, but the full payload component block is typically much larger, e.g., having 16, 32, 64 128 or 256 elements (e.g., pixels) on a side. The payload component block is commonly square, but need not be. More generally, it may be regarded as having dimensions of I×J signal elements.

FIG. 43 also shows an excerpt 433 of a reference signal block 434 (sometimes termed a spatial registration data array). This block comprises a 2D array of real numbers, here ranging from 0 to 1. As earlier noted, the reference signal can comprise the summation of multiple sine wave components of different frequencies, which may have different phases. The illustrated numbers are determined by summing these spatial sine wave components at regularly-spaced points across the reference signal block 434. Where the waves destructively interfere (yielding a trough), the sum is smaller—nearer zero. Where these sine waves constructively interfere (yielding a peak), the sum is larger—nearer one.

(It will be recognized that excerpt 433 of the reference signal block is similar to excerpt 72 shown in FIG. 7. However, in FIG. 7, the reference signal is composed of values ranging from 0 to 255, and are quantized to integer values, yielding the depicted greyscale representation. Dark pixels in FIG. 7 would be represented by real numbers nearer zero in FIG. 43; light pixels would be represented by real numbers nearer one.)

Again, the reference signal block 434 is typically square, but need not be so. More generally, it may be regarded as having dimensions of M×N elements. M is typically larger than the I dimension of the payload component block 432, and N is typically larger than the J dimension of the payload component block.

Since the reference signal block here employs non-integer data, its element values may be stored as floating point data in the memory of a computer system performing the detailed method.

Ultimately, corresponding spatial portions of the payload component block 432 and the reference signal block 434 are processed together to produce a spatial portion of an output signal block 435. The spatial correspondence between portions of the payload component block and the reference signal block can be regarded as a mapping, in which each element of the payload component block maps to a location in the reference signal block. In the FIG. 43 example, each element of the payload component block maps to nine elements in the reference signal block, as shown by the dashed lines linking excerpt 431 and 433 (and by the bold lines in excerpt 433—demarking 3×3 regions of elements). In the detailed embodiment, the output signal block is of the same dimensions as the reference signal block, i.e., M×N elements.

In an exemplary embodiment, the payload component block may be 128×128 elements (i.e., I=J=128), and the reference signal block (and the output signal block) may be 384×384 elements (i.e., M=N=384).

In accordance with a particular embodiment, each dark element in the output signal block 435 is due to a corresponding dark element in the payload component block 432. For example, dark signal element 437a in the output signal block is due to dark signal element 437b in the payload component block.

More particularly, for each of plural dark signal elements 437b in the payload component block, this particular method performs the following acts:

(a) determining the location in the M×N registration data array to which the dark signal element in the payload component block spatially corresponds;

(b) identifying K neighboring elements in the M×N registration data array nearest this determined location, where K≥4 (e.g., K=9);

(c) identifying which of these K elements in the reference signal block has an extremum value (e.g., a minimum value);

(d) identifying among these K (9) neighboring positions in the 384×384 element reference signal block, a first position at which the extreme value is located (and conversely, identifying the other eight positions as locations where this extreme value is not located); and (e) in the 384×384 element output block, setting to one value (e.g., dark) an element at the identified first position, and setting to a different value (e.g., light) elements at the eight other, second positions.

In a preferred embodiment, these acts are performed for every dark element in the payload component block. Thus, the number of dark elements in the 128×128 payload component block 432 is the same as the number of dark elements in the 384×384 element output block 435. In other embodiments, however, a subset of the dark elements in the payload component block can be so-processed, yielding fewer dark elements in the output block than in the payload component block.

The just-detailed process forms a 2D output code that represents both the message data and the reference signal data. These two components are represented in a proportion that favors the message data. This makes the resulting output code particularly suited for printing on items that have other structures that can aid in establishing spatial registration, e.g., physical edges or printed borders that are parallel to edges of the output signal blocks that can serve as references to help establish the rotation and translation of the output signal blocks, and overt patterns (e.g., logos or text) whose scale in captured imagery can be used to help estimate the scale of the output signal blocks.

In a particularly preferred embodiment, the I×J (e.g., 128×128) message data (payload) array comprises equal numbers of elements having the first and second values. For example, there may be 8192 dark elements and 8192 light elements. In such embodiment, the above-detailed acts (a)-(e) are performed for each of the 8192 dark elements.

Since half of the elements of the message array are light, half of the 3×3 neighborhoods of elements in the output code are also light. Of the other 3×3 neighborhoods in the output code, each has one dark element out of nine. Overall, then, one-eighteenth of the elements in the output code are dark (and $17/18$ths are light).

In other embodiments, essentially equal—or approximately equal—numbers of elements in the message data array are light and dark. ("Essentially" equal, as used herein, means within 5%; "approximately" equal means within 20%).

In FIG. 43, there is an integer relationship between dimensions of the message data array 432, the reference signal tile 434, and the output signal tile. In particular, each element in the message data array corresponds to nine elements in both the reference signal tile and the output signal tile.

Of course, other integer relationships can be employed. For example, each element in the message data array can correspond to four elements, or 25 elements, in both the reference signal tile and the output signal tile, etc.

In still other embodiments, non-integer relationships can be used. That is, M need not be an integer multiple of I (nor N be an integer multiple of J).

Figure 44A:
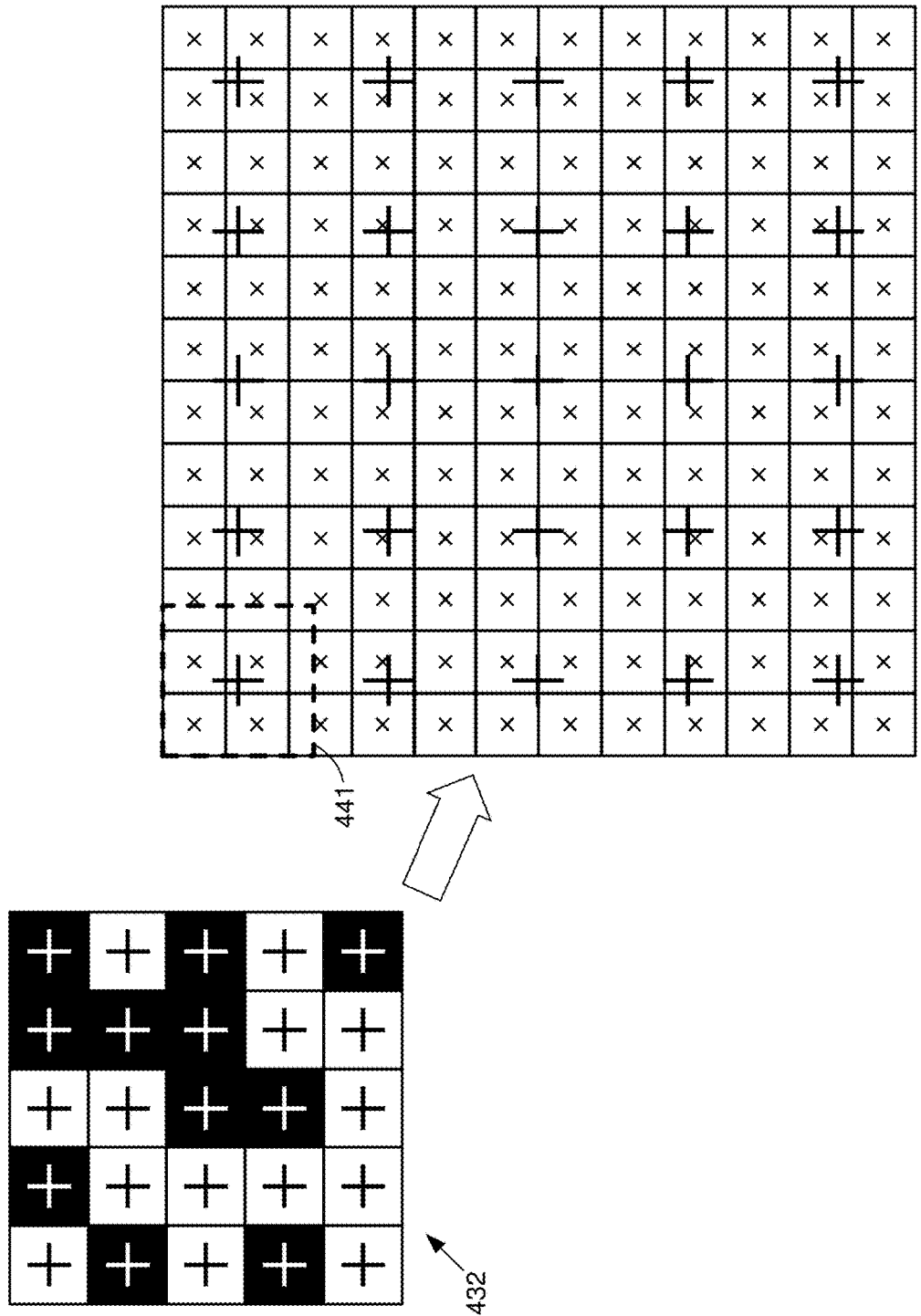
FIGS. 44A and 44B illustrate a variant of the FIG. 43 arrangement.
Figure 44B:
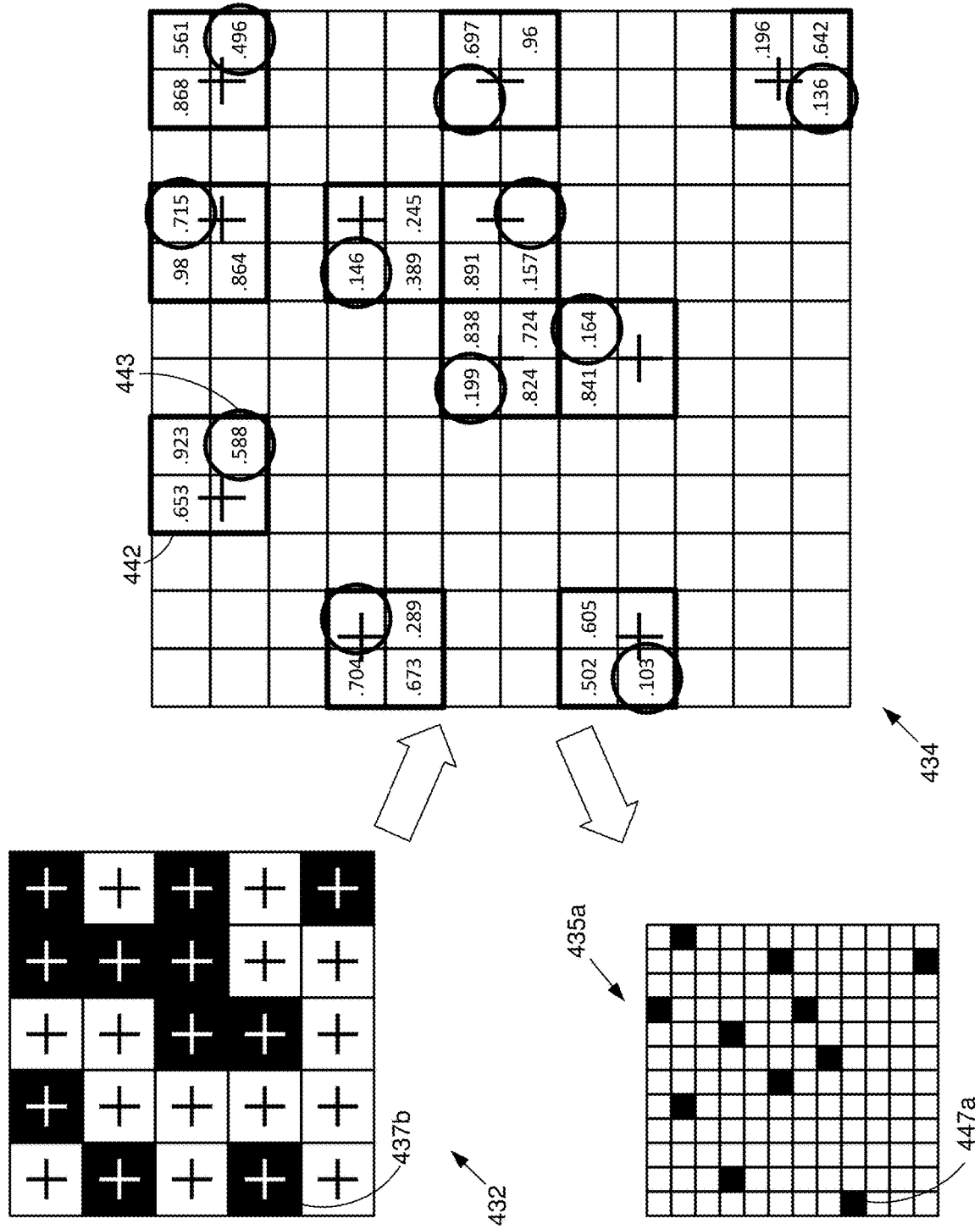

FIGS. 44A and 44B show such an embodiment. M is 2.4 times I (and N is 2.4 times J). Each element of the message signal array thus spatially corresponds to 5.76 elements in both the reference signal tile and the output signal tile. This spatial correspondence is shown by "+" markings in the center of each element in the message signal array 432, and its mapping onto a corresponding location in the reference signal tile 434. A dashed box 441 surrounds an element area in the reference signal tile that corresponds to a single element in the message signal array.

In such embodiment, the extremum value (per act (b) above) is taken from a 2×2 set of neighboring element values in the reference signal tile. One of these four elements is the element in which the mapped "+" sign falls. The others are the three elements nearest the "+" signs. One set of four elements 442, and the extremum (minimum 443) from such set, are labeled in FIG. 44B. (The values of the reference signal elements in FIG. 44B are taken from the upper left portion of the corresponding reference signal elements in FIG. 43.)

Applying acts (a)-(e) for each of the dark elements in the message signal array 432 of FIG. 44B, yields the output signal tile 435a. As before, each dark element in output signal tile 435a (e.g., 447a) has a counterpart dark element in the message tile array 432 (e.g., 437b).

FIG. 45 compares the portion (436) of the output signal tile 435 produced from the FIG. 43 arrangement (mapping each message signal element to 9 elements from the reference signal array), with the corresponding portion (436a) of the output signal tile 435a produced from the FIG. 44B arrangement (mapping each message signal element to 5.76 elements from the reference signal array). Each dark element in one portion has a counterpart in the other. But there are more elements in portion 436, so it is printed with a lighter density ($1/18^{th}$, or 5.55%) than portion 436a (which is printed with a density of 1/(2*5.76) or 8.68%).

The density of dots in the printed output can thus be varied by changing the ratio between the number of elements in the message signal array, and in the reference signal array. In usual practice, the message signal array is of a fixed size (e.g., 64×64 elements, or 128×128 elements). The reference signal tile, in contrast, can be set to any size, simply by adjusting the interval with which the continuous functions of which it is composed (e.g., sine waves) are sampled. If all the arrays are square (I=J and M=N), then the print density (tint) can be determined by the equation:

$$PrintDensity = 1/(2*(M/I)^2)$$

If the M/I ratio can be set arbitrarily, then the print density can be tailored to any desired value by the equation:

$$M/I = SQRT(1/(2*Print\ Density))$$

Thus, if the message signal array is 128×128 elements, and a print density of 5% is desired, then the continuous reference signal should be sampled to produce an array of 405×405 elements. If a print density of 10% is desired, then the reference signal should be sampled to produce an array of 202×202 elements. Etc.

There is, additionally, the issue of mapping the signal tile to the print environment, which can place certain constraints on the implementation. As noted, a printer for adhesive labels may employ a linear array of thermal elements spaced at a density of 203 per inch (dpi). One approach picks a desired number W of code elements (waxels) per inch for the message array. The full message tile then measures, e.g., 128/W inches on a side (if the message tile is 128×128 waxels). A prime number can be used for W, such as 89. In this case, the full message tile measures 128/89, or 1.438 inches on a side. At 203 dpi, this requires (1.438 inch*203 dots/inch)=292 dots on a side for the output tile. The reference signal can be sampled to produce a 292×292 array, to which the 128×128 message array is mapped. The center of each element in the message array is then mapped to a point in the reference signal array as shown in FIG. 44B. Values of the four nearest elements in the reference signal array are examined to identify a minima, and a corresponding position in the output signal tile is then marked, as described above and shown in FIG. 44B.

In the example just-given, M/I=292/128, so the print density is 9.6%

Comparing the two output signal excerpts in FIG. 45, it will be seen that positions of the dark elements are relatively shifted in output signal portion 436a vs. output signal portion 436. For example, dark elements 437a and 447a both correspond to the same element in the message signal array. But one is on the border of the output signal excerpt, and the other is not. This is because this element of the message signal array is mapped to different regions of the reference signal array, due to the different scale of the mappings.

Exemplary Matlab code to perform the above-detailed algorithm is detailed in FIG. 46.

As indicated, the present technology can be used in printing adhesive labels for application to supermarket items (e.g., bakery, deli, butcher, etc.). Such labels are characterized by straight, perpendicular edges. They often commonly include printed straight lines—either as borders or as graphical features separating different of the printed information. They also typically include one or more lines of printed text. All of these printed features are composed of closely-spaced black dots, printed in regularly-spaced rows and columns (e.g., spaced 203 rows/columns to the inch). Due to their regular arrangement, such printing exhibits characteristic features in the spatial frequency domain, which are evident if an image is captured depicting the printed label (a "query image"), and such image data is transformed by a fast Fourier transform.

The spatial frequency data resulting from such an FFT applied to a query image ("query FFT data") can be compared to a template of reference FFT data for labels of that sort. This template can comprise spatial frequency data resulting when a label image of known orientation (edges parallel to image frame), and of known scale, is transformed by an FFT. By comparing the query FFT data with the reference FFT data, the affine distortion of the query FFT data can be estimated, which in turn indicates the affine distortion of the query image. A compensating counter-distortion can be applied to the query image, to place the image squarely in the frame at a known scale. This counter-distorted query image can then be submitted to a decoding algorithm for further refinement of the image pose (using the reference signal component), and for decoding of the plural-bit payload. (Refinement of pose can employ the least squares techniques detailed in our publication 20170193628, or the AllPose techniques detailed in our published application 20180005343 and our application 62/643,101, filed Mar. 14, 2018. These documents are incorporated herein by reference.)

Figure 47:
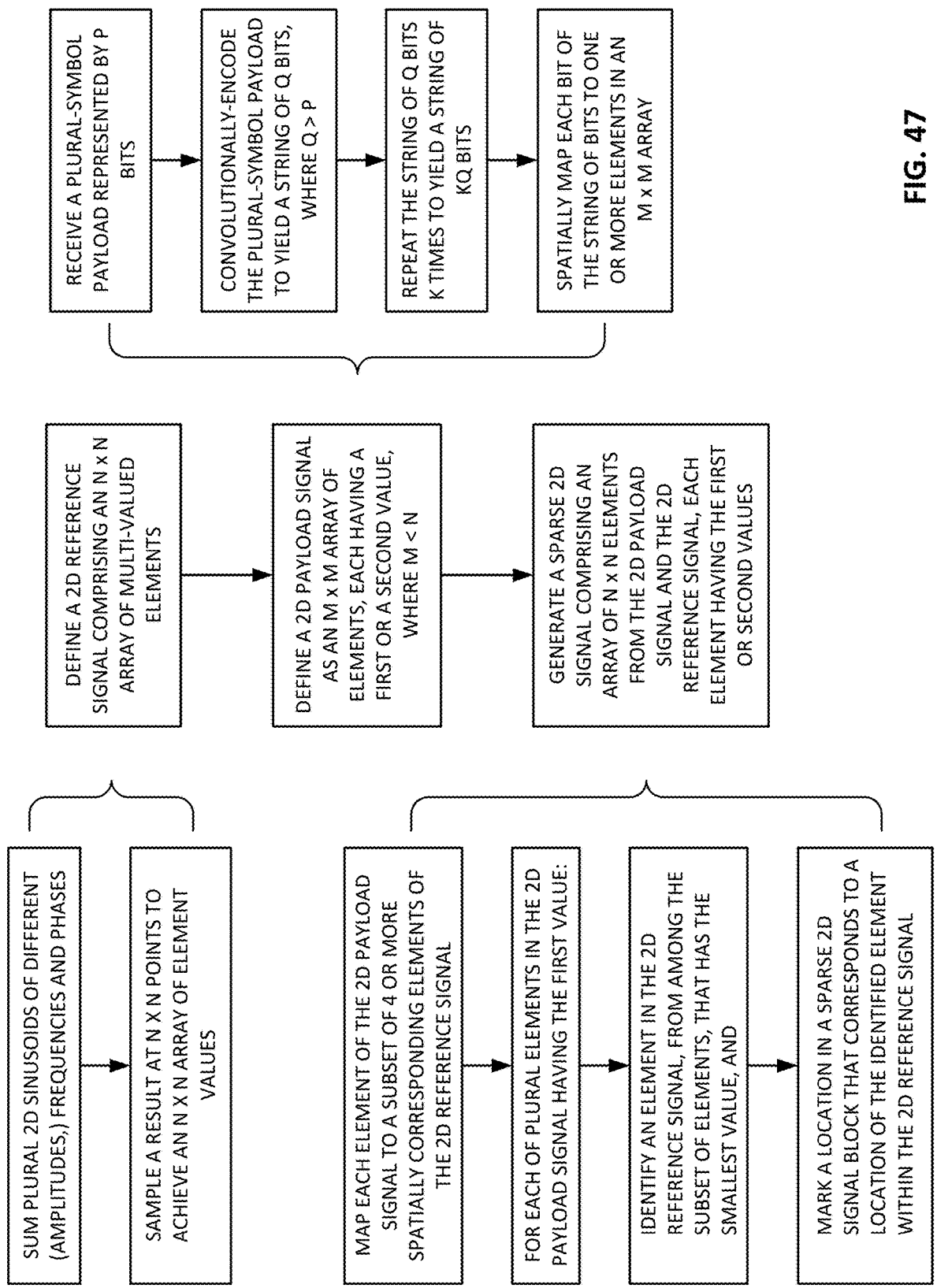
FIG. 47 is a flow chart illustrating aspects of the technology.

FIG. 47 includes flowcharts illustrating aspects of the foregoing. The central three blocks identify high level steps. The bracketed flow charts to the sides detail particular algorithmic acts that can be used to perform the corresponding steps.

For brevity's sake, the foregoing discussion has not repeated details provided elsewhere in the specification, e.g., concerning formation of the encoded payload component, formation of the reference (registration) signal component (optionally with a structured appearance), controlling dot density and placement constraints, resizing signal arrays, inverting the signal using holes in a darker surround, etc., etc., which artisans will recognize are equally applicable in the just-detailed arrangements.

Use of Sparse Marks in Approximating Greyscale Imagery

As is familiar, greyscale newspaper photographs can be represented in bitonal fashion using black dots on a white background, or vice versa. This is often termed half-toning. So, too, can greyscale photographs be rendered with sparse marks.

This section builds on work earlier detailed in our U.S. Pat. No. 6,760,464. That patent teaches that a digital watermark may be embedded into a halftone image by using the digital watermark signal as a halftone screen. In one particular embodiment, watermark blocks are created at different darkness levels by applying different thresholds to a dense watermark block having a mid-grey average value (i.e., 128 in an 8-bit system). At each pixel in the host image, the gray level corresponds to a threshold, which in turn, is applied to the dense watermark signal at that location to determine whether to place a dot, or not, at that location.

In one embodiment of the present technology, various sparse blocks of different dot densities (ink coverages) are pre-computed and stored in look up tables. At each pixel in the host image, a corresponding block is accessed from the lookup tables, and a pixel—indexed by pixel location within the block—is copied to an output image. That is, dot density of a sparse code is locally varied in accordance with greyscale image data.

Figure 48A:
FIG. 48A shows a greyscale image of a chair.
Figure 48B:
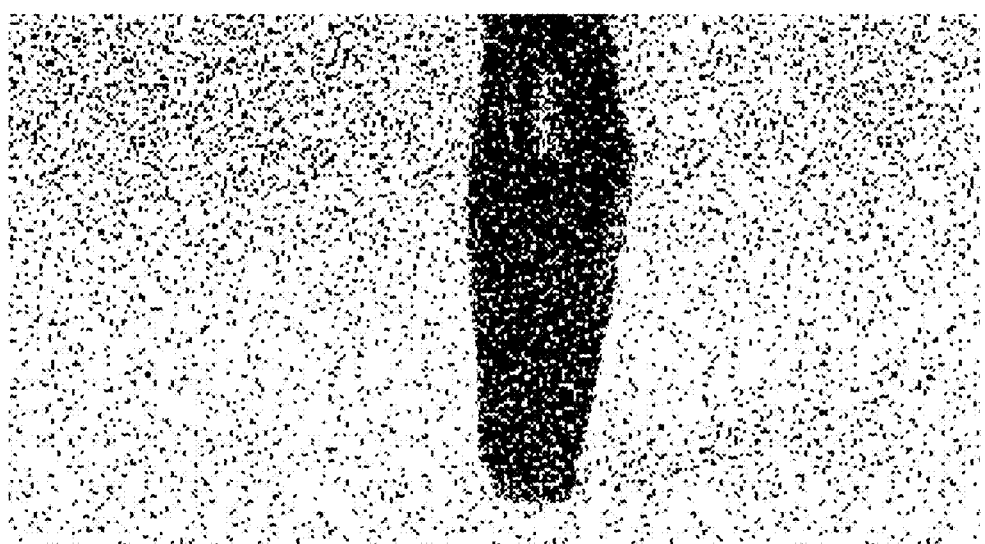
FIG. 48B shows an excerpt of this image as rendered with sparse code signals.

FIG. 48A shows an exemplary grey scale image of a chair. (Due to limitations of patent drawing reproduction, this is actually not a greyscale image, but the effect is similar) FIG. 48B shows an enlarged excerpt showing the chair's leg, rendered by the present method from sparse blocks. Each greyscale pixel in the original image is associated with a position within a tiled array of sparse blocks. A dot, or not, is written to an output frame by examining that position within a sparse mark in the lookup table having a dot density corresponding to that pixel (greyscale) level.

Figure 49:
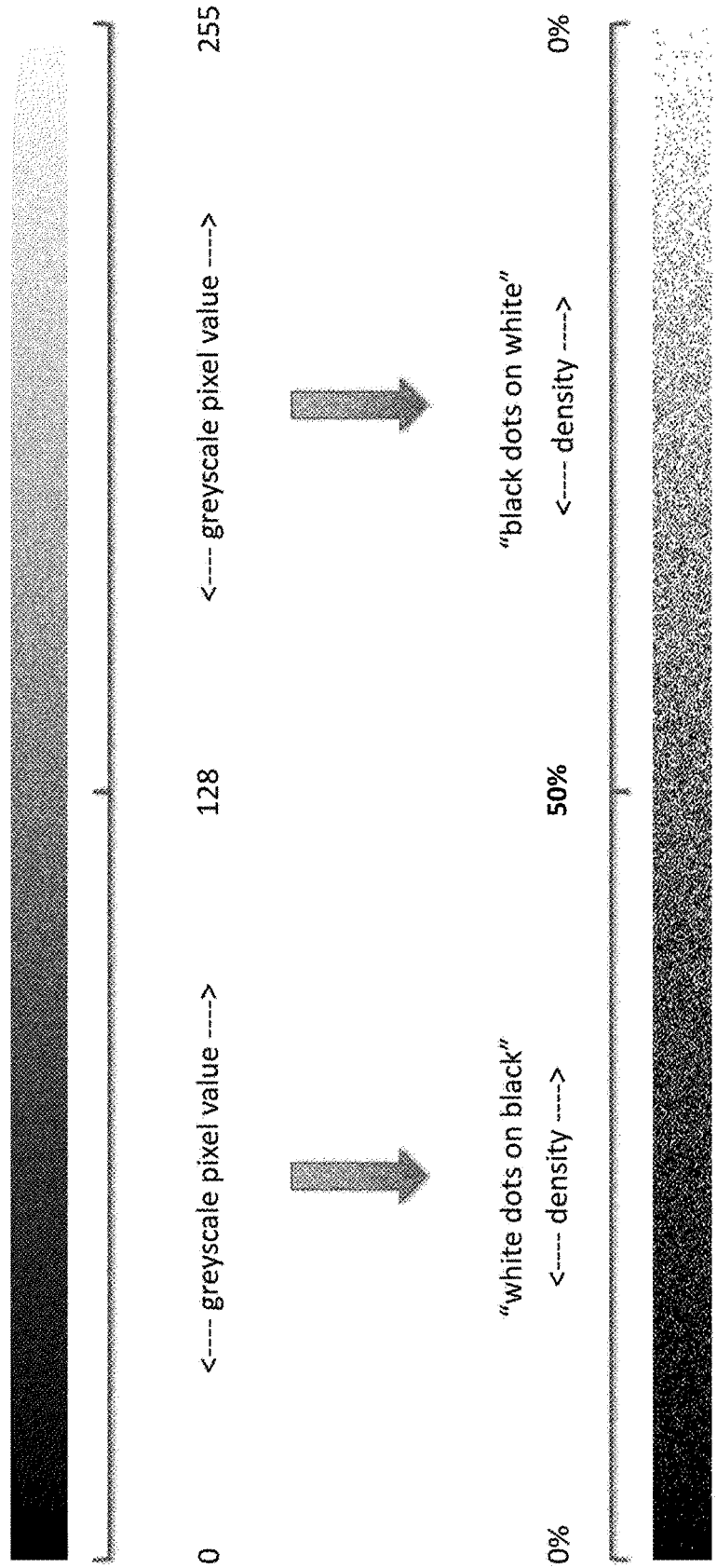
FIG. 49 shows how greyscale values relate to different sparse patterns.

FIG. 49 shows the correspondence between grey scale levels and sparse markings. Greyscale levels between 0 and 127 are formed by white dots on a black background (ranging from 0% to 50% dot coverage). Greyscale levels between 128 and 255 are formed by black dots on a white background (ranging from 50% to 0% dot coverage). There may be a different sparse pattern for each of the 254 greyscale values between 1 and 254. Or plural greyscale values may map to a single sparse pattern. For example, greyscale values of 0-15 may map to the darkest sparse pattern (e.g., with an average ink coverage of 97%); values 16-31 may map to the next-darkest sparse pattern (e.g., with an average ink coverage of 91%), and so forth, up til values of 240-255, which map to the lightest sparse pattern (e.g., with an average ink coverage of 3%).

Returning to FIG. 48A, it will be recognized that at very dark tones, and at very light tones, there is not much signal. Thus, if a camera is zoomed-in to capture an image comprising just the dark area around reference numeral 481, decoding may be difficult or impossible. Likewise the light area around reference numeral 482. However, if the camera captures an area that includes other regions, then the payload can be readily recovered.

The fidelity of reproduction by this method depends, in part, on the elemental size of the sparse mark dot. FIG. 50A shows an excerpt of a greyscale lion photograph, converted to sparse form, with each dot being a single pixel. FIG. 50B shows the same excerpt, but with each dot being a 4×4 cell of pixels. (The former is sometimes termed "bump size 1" and the latter is sometimes termed "bump size 4.") Although, aesthetically, the smallest bump size may be desired, it packs the block into the physically-smallest spatial extent. As such, it requires that the camera be placed relatively close to the printed subject for signal detection/decoding. Often human factors of, e.g., smartphone, interaction with printed objects, indicate a greater reading distance should be used, leading to common use of bump sizes 2 and 3.

More on Use of Sparse Marks in Approximating Greyscale Imagery

In a further embodiment, a reference signal and a message signal are combined in a desired weighting, as discussed above in connection with FIGS. 10-22, to yield a dense greyscale signal. N different levels of print density can be defined. For example, N can be 19, corresponding to ink coverages of 5%, 10%, 15%, . . . 95%. The 5% print density is achieved by selecting the lowest value pixels, subject to a keep-out distance constraint, until 5% of the pixels have marks. Similarly for 10%, 15%, etc.

The 95% coverage is achieved by selecting the highest value pixels (the whitest) for marking on a black background, subject to the keep-out distance constraint, until 5% of the pixels are white-marked. Similarly for 90%, 85%, etc.

In a particular embodiment, different print densities are achieved by setting different keep-out distances. At a 5% print density, a keep-out distance D1 is maintained. At a 10% density, a keep-out distance D2 is maintained, where D2≤D1. At a 15% density, a keep-out distance D3 is maintained, where D3≤D2. Etc.

Things are reciprocal at the other end of the print density spectrum, where white marks are formed on a dark background. At a 95% print density, a keep-out distance D19 is maintained. At a 90% print density, a keep-out distance D18 is maintained, where D18≤D19. And so forth.

In some but not all embodiments, D1=D19; D2=D18; etc.

To implement such arrangement, the pixel values in the dense greyscale signal are sorted by value, and are associated with their respective locations. A 5% print density region may be achieved by setting the keep-out distance to the value D1. The lowest-valued greyscale pixel in the dense signal is copied, as a dark mark, to a corresponding position in the output frame. The next-lowest valued pixel in the dense signal is examined to determine whether it is at least D1 pixels away from the previous pixel. If so, it is copied, as a dark mark, to a corresponding position in the output frame; else it is skipped. The next-lowest valued pixel in the dense signal is next examined to determine whether it is at least D1 pixels away from the previously-copied pixel(s). If so, it is copied, as a dark mark, to a corresponding position in the output frame; else it is skipped. This process continues until 5% of the pixel locations in the output frame have been marked.

A 10% print density region is achieved by setting the keep-out distance to D2 pixels. A similar process follows, to generate a print density region marked with 10% ink coverage. A 15% print density region may be similarly achieved by setting the keep-out distance to D3 pixels, and repeating the process.

The keep-out distance constraint becomes difficult for 50% print density, and nearby values. A 50% density requires equal numbers of dark and white marks; some must adjoin—if only diagonally. The most-sparse 50% pattern is a checkerboard, or its inverse.

In converting mid-grey values to sparse, the designer can go different routes. One is to simply adopt a conventional dither pattern (e.g., a uniform 50% checkerboard), and encode no information in such regions. Another is to put dark marks at the darkest 50% of the locations in the dense signal block, without regard to adjacencies. This can result in a splotchy effect, but provides a strong encoded signal. In other arrangements, the two methods can be used in combinations—with some areas using a dither pattern selected for its regular-looking appearance, and other areas marked based on the darkest 50% of the dense signal—without regard for spatial uniformity.

In the former case, the signal strength, as a function of print density, has an M-shaped curve, with little signal strength at print densities of 1-3% and 97-99%; none at 50%; and peaks between these two values. In the latter case the signal strength is single-lobed, with a maximum at 50%, and tapering to 0 at 0% and 100%.

While keep-out regions are commonly conceived as circular in extent, they need not be so. Applicant has found that other keep-out regions often offer better control of simulated grey tones. FIGS. 51, 52A, 52B, 53 and 54 illustrate why.

Figure 51:
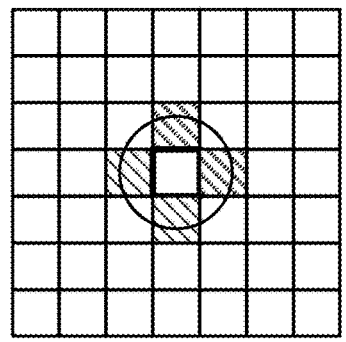
FIGS. 51, 52A, 52B, 53 and 54 illustrate the number of pixel locations excluded from marking by different keep-out distances.

FIG. 51 shows, in cross-hatching, four pixels excluded from marking by a keep-out distance of 1.2 pixels. (In this discussion, a pixel is excluded if its center falls less than the threshold distance from the center of the to-be-marked pixel, shown in bold.)

Figure 52A:
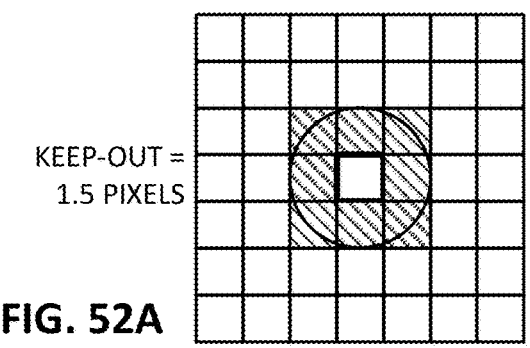
Figure 52B:
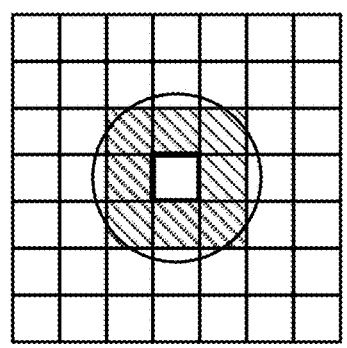

As shown in FIGS. 52A and 52B, if the keep-out distance is increased slightly, to 1.5 pixels, then the number of excluded pixels jumps by four, to eight. And if the keep-out distance is further increased, to 1.8 pixels, the number of excluded pixels is unchanged (still eight).

Figure 53:
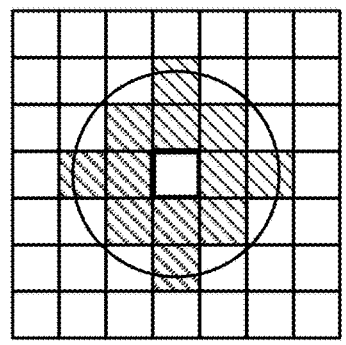
Figure 54:
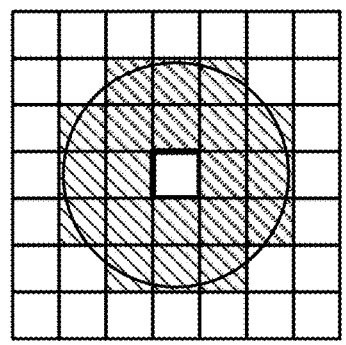

A further increase of the keep-out distance, to 2.2 pixels, causes the number of excluded pixels to rise to 12—a further jump of 4, as shown in FIG. 53. Another small increase of the keep-out distance, to 2.4 pixels, causes the number of excluded pixels to rise to 20—a jump of 8.

Thus, it can be seen that circular keep-out regions offer a very coarse control of the number of pixel locations excluded from marking. No change in the number occurs with some increases in keep-out distance, and then a further increase causes the number of excluded pixels to jump by four or eight—symmetrically around the center pixel.

Figure 55:
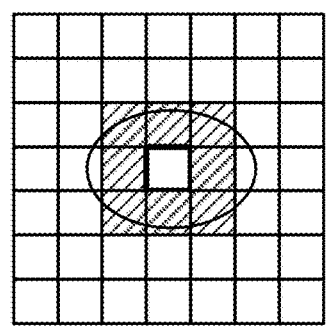
FIGS. 55 and 56 illustrate the number of pixel locations excluded from marking by different elliptical keep-out zones.
Figure 56:
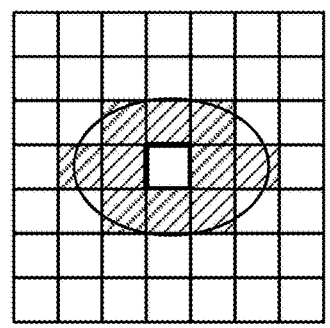

If an elliptical keep-out region is employed, then finer control granularity can be achieved. FIG. 55 shows an ellipse with a ratio of 0.7 between its minor and major axes. With a major axis length of 1.9, this ellipse excludes 8 pixels from marking. As its size increases to have a major axis length of 2.2 (FIG. 56), it excludes 10 pixels from marking. As the size expands, it variously encompasses additional pairs of pixels to the top and bottom, additional pairs of pixels to the left and right, and additional quartets of pixels. It will be recognized that such elliptical shape provide a control granularity that is twice that of a circular keep-out region. (In some embodiments, the ratio of major to minor axes is fixed; in others it is varied as the area of the ellipse is changed.)

To achieve still further control granularity, patterns tailored to exclude specific numbers of nearby pixels from marking can be employed.

FIGS. 57A, 57B, 57C and 57D show keep-out patterns tailored to exclude 1, 2, 3 and 4 pixels, respectively. These are just a small assortment of suitable patterns. Rotations of these patterns (by 90, 180, and 270 degrees) can also be employed, as can mirror-images of all rotations. Most such patterns have no axis of symmetry passing vertically or horizontally through the center pixel. (Although not shown, other such patterns can be formed to exclude additional numbers of nearby pixels, e.g., 5-25.)

As before, when a pixel is selected for marking in an output frame, one or more pixels near it are excluded from marking, based on the pattern chosen.

This arrangement of FIGS. 57A-D, etc., provides a fine-grained mechanism to achieve different print densities by excluding certain pixels from marking. Still finer control can be achieved by randomly selecting among two or more of the keep-out patterns, e.g., excluding different numbers of pixels from marking. For example, the first and second pixel locations selected (e.g., from a sorted list) for marking in an output frame can use the top keep-out pattern of FIG. 57B, and the third-selected location can use the top keep-out pattern of FIG. 57C. This sequence can be repeated, with the fourth and fifth-selected pixel locations employing the keep-out pattern of FIG. 57B, with the sixth-selected location using the pattern of FIG. 57C, and so on. By such arrangement, each mark may be associated—on average—with a non-integer number of nearby pixel locations that will be excluded from marking (i.e., 2.33 in the just-given example). Very fine simulation of grey scale image tones may thereby be achieved.

Figure 57A:
FIGS. 57A, 57B, 57C and 57D show different patterns by which 1, 2, 3 or 4 nearby pixel locations can be excluded from marking, respectively.
Figure 57B:
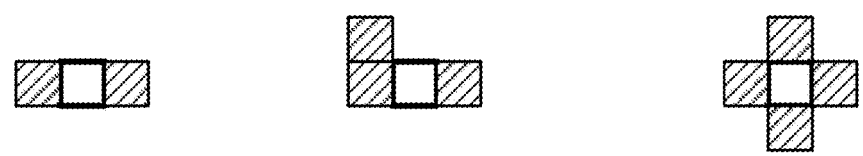
Figure 57C:
Figure 57D:

(Even if a desired print density can be achieved by use of a single keep-out pattern, such as one of those in FIG. 57C, there can be aesthetic advantages from randomly varying between two or more different patterns, such as from FIGS. 57B and 57D, excluding less and more nearby marks, to achieve the same average print density effect.)

In contrast to the earlier discussion, in the just-discussed arrangement, different print densities are not achieved by setting different keep-out distances (e.g., a keep-out distance D1 for a 5% print density), but rather by setting different keep-out location exclusion counts. For a 5% print density, a pattern that excludes 9 nearby locations can be employed.

For a 10% print density, a pattern that excludes 5 nearby locations can be employed. For a 15% print density, a pattern that excludes 3 nearby locations can be employed (e.g., as shown in FIG. 57C). For a 20% print density, a combination of patterns that excludes, on average, 2.5 nearby locations can be employed. Etc. Different renderings of greyscale images can be achieved by varying the mapping by which different print densities (greyscale levels) correspond to different numbers of nearby excluded pixel locations.

Reading a Payload from Captured Images

Figure 58:
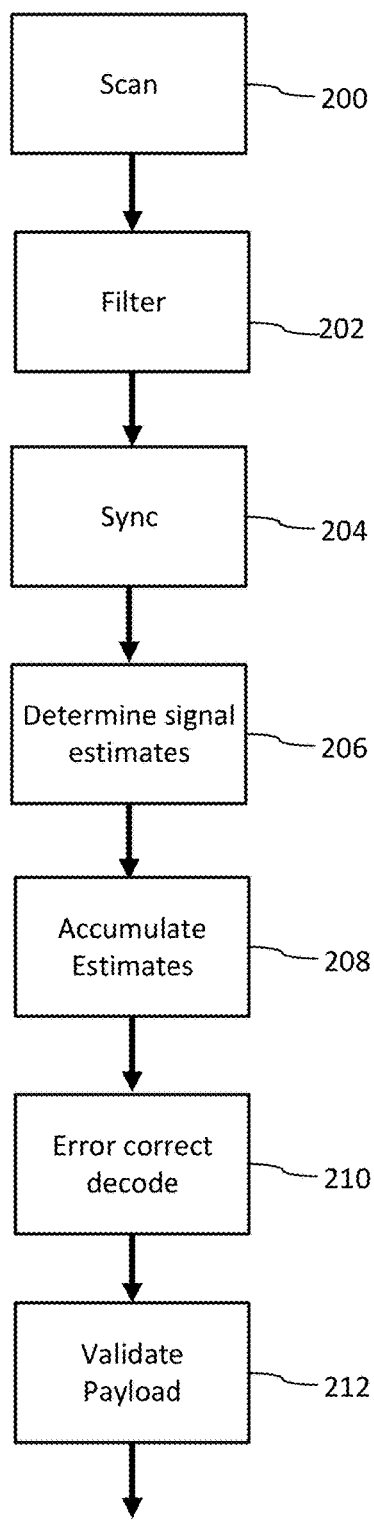
FIG. 58 is a flow diagram illustrating a method for decoding an optical code from an image signal captured from an object.

FIG. 58 is a flow diagram illustrating a method for decoding an optical code from an image signal captured from an object.

In an image capture process (e.g., scan 200 of FIG. 58), the image is captured at a resolution preferably near the resolution at which the encoded payload signal has been encoded within the original image (e.g., 300 DPI, 100 DPI, etc.). An image up-sampling or down-sampling operation may be performed to convert the image supplied by the digital camera or scanner to a target resolution for further decoding.

At least part of one or more blocks of encoded data signal are captured within the scan.

In the initial processing of the decoding method, it is advantageous to select frames and blocks within frames that have image content that are most likely to contain the encoded payload. The block size is desirably selected to be large enough to span substantially all of a complete tile of encoded payload signal, and preferably a cluster of neighboring tiles. However, because the distance from the camera or scanner may vary, the spatial scale of the encoded payload signal is likely to vary from its scale at the time of encoding. This spatial scale distortion is further addressed in the synchronization process.

The first stage of the decoding process filters the incoming image signal to prepare it for detection and synchronization of the encoded payload signal (202). The decoding process sub-divides the image into blocks and selects blocks for further decoding operations. A first filtering stage converts the input color image signal (e.g., RGB values) to a color channel or channels where the auxiliary signal has been encoded by applying appropriate color weights. See, e.g., patent publication 20100150434 for more on color channel encoding and decoding. The input image may also be a single channel image (one pixel value per pixel) corresponding to capture by a monochrome sensor in the presence of ambient or artificial illumination, such as a typical red LED with a wavelength around the center of its spectral band around 660 nm.

A second filtering operation isolates the data signal from the host image. Pre-filtering is adapted for the data payload signal encoding format, including the type of synchronization employed. For example, where an explicit synchronization signal is used, pre-filtering is adapted to isolate the explicit synchronization signal for the synchronization process.

As noted, in some embodiments, the synchronization signal is a collection of peaks in the Fourier domain. Prior to conversion to the Fourier domain, the image blocks are pre-filtered. See, e.g., the LaPlacian pre-filter detailed in U.S. Pat. No. 6,614,914, incorporated above. A window function is applied to the blocks, followed by a transform to the Fourier domain—employing an FFT. Another filtering operation is performed in the Fourier domain. See, e.g., pre-filtering options detailed in U.S. Pat. Nos. 6,988,202 and 6,614,914, and US Publication 20120078989, which are incorporated by reference.

The input imagery is typically filtered with a predictive "oct-axis" filter, as noted previously. This filter acts to suppress the underlying host image (which typically shows relatively high local correlation), and thereby accentuate the noise signal that conveys the code signal components.

Next, synchronization process (204) is executed on a filtered block to recover the rotation, spatial scale, and translation of the encoded signal tiles. This process may employ a log polar method as detailed in U.S. Pat. No. 6,614,914, or a least squares or AllPose approach, as detailed earlier, to recover rotation and scale of a synchronization signal comprised of peaks in the Fourier domain. To recover translation, the phase correlation method of U.S. Pat. No. 6,614,914 is used, or phase estimation and phase deviation methods of 20120078989 are used.

Alternative methods perform synchronization on an implicit synchronization signal, e.g., as detailed in U.S. Pat. No. 9,747,656.

Next, the decoder steps through the bit cell locations in a tile, extracting bit estimates from each location (206). This process applies, for each location, the rotation, scale and translation parameters, to extract a bit estimate from each bit cell location (206). In particle, as it visits each bit cell location in a tile, it transforms it to a location in the received image based on the affine transform parameters derived in the synchronization, and then samples around each location. It does this process for the bit cell location and its neighbors to feed inputs to a detection filter (e.g., oct axis or cross shaped), to compare a sample at embedding locations with neighbors. The output (e.g., 1, −1) of each compare operation is summed to provide an estimate for a bit cell location. Each bit estimate at a bit cell location corresponds to an element of a modulated carrier signal.

The signal decoder estimates a value of each error correction encoded bit by accumulating the bit estimates from the bit cell locations of the carrier signal for that bit (208). For instance, in the encoder embodiment above, error correction encoded bits are modulated over a corresponding carrier signal with 16 or 32 elements (e.g., multiplied by, or XOR'd with, a binary antipodal signal). A bit value is demodulated from the estimates extracted from the corresponding bit cell locations of these elements. This demodulation operation multiplies the estimate by the carrier signal sign and adds the result. This demodulation provides a soft estimate for each error correction encoded bit.

These soft estimates are input to an error correction decoder to produce the payload signal (210). For a convolutional encoded payload, a Viterbi decoder is used to produce the payload signal, including the checksum or CRC. For other forms of error correction, a compatible decoder is applied to reconstruct the payload. Examples include block codes, BCH, Reed Solomon, Turbo codes.

Next, the payload is validated by computing the check sum and comparing with the decoded checksum bits (212). The check sum matches the one in the encoder, of course. For the example above, the reader computes a CRC for a portion of the payload and compares it with the CRC portion in the payload.

At this stage, the payload is now passed to other requesting processes, e.g., application programs or software routines that use its contents in subsequent processing.

In an embodiment where the encoded payload is conveyed in the phase of sine waves, the decoder executes a similar first stage synchronization on reference signal components, such as a subset of the sine waves. This sub-set of sine waves form peaks in the spatial frequency domain. After synchronization, the decoder extracts an estimate of an encoded payload element at each reference signal that carries the payload. The phase shift is directly measured relative to an un-modulated state using phase estimation and deviation methods of US Publication 20120078989. The decoder applies the geometric transform coordinates of a sine wave component in the spatial frequency domain. It then estimates phase of this component in the image by weighting the neighboring complex components at neighboring integer coordinates base on weights derived from a point spread function. This estimate of phase is then compared to the expected phase (e.g., phase that would represent a 1, 0 or −1, or 1 or 0, in ternary or binary encoding schemes). The bit value extracted at this component is the one that corresponds to the estimated phase. This process repeats for each sine wave component that carries payload signal. The resulting sequence of symbols are then error correction decoded and processing proceeds error detection as described above.

Pre-Marked Media

In another aspect of the present technology, a roll of thermal adhesive labels is pre-marked—typically with ink (rather than thermal discoloration)—to convey a signal component. This pre-marking commonly occurs before the roll of labels is delivered to the user (e.g., grocery store), and before it is installed in the thermal printer.

In one illustrative embodiment, each label on the roll is pre-marked with a reference signal component comprising a printed pattern, e.g., of dots. The dots, however, are not black. Rather, they are of a color to which the human eye is relatively less sensitive when printed on white media (as compared to black), yet a color that provides a discernible contrast when imaged with red light illumination (e.g., 660 or 690 nanometers) from a point of sale scanner. One such ink color is Pantone 9520 C. (For more information about marking with Pantone 9520 C and related issues, see our co-pending application Ser. No. 15/851,143, filed Dec. 21, 2017 (now U.S. Pat. No. 10,580,103), which is incorporated herein by reference.)

The pattern of dots can be created from the multi-valued reference signal (e.g., 70 in FIG. 10), by placing dots in an output signal block at positions that first correspond to the darkest lowest-valued) pixels in signal 70, and continuing to select successively less dark pixels, until a reference pattern of sufficient detection robustness is achieved. In one particular embodiment, a dot density of 5% is used; in another a dot density of 20% is employed. In some embodiments, a placement constraint is employed, as described elsewhere, to limit clumping of dots together. This reference signal block can then be tiled and printed across the full extent of the label, or only across particular regions.

In one particular embodiment, such a pattern of reference signal dots is printed on the roll of adhesive labels by an offset printing press that also applies other pre-printed markings, e.g., a store logo. (Such other markings are typically applied using a different ink color.) In another embodiment, ink jet printing is used. (Of course, such printing can be applied to the label substrate before it is formed into rolls, and before adhesive is applied and/or before the label is adhered to its release backing.)

In a different embodiment, the reference signal is printed with a visible ink, but in a patterned fashion depicting, or reminiscent of, an overt pattern—such as a corporate logo.

Figure 59:
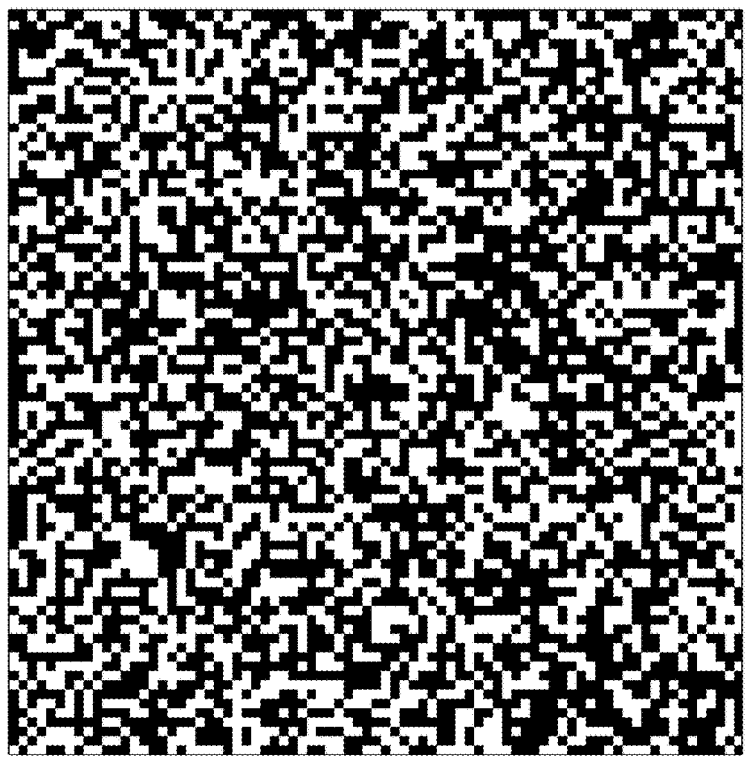
FIG. 59 shows an excerpt of a bi-tonal message signal block.

With the reference signal pre-printed on the adhesive label stock, the printer need thermally print only the message signal. In the illustrative system, the message signal is a bi-modal signal, e.g., a block of 128×128 elements, with half (8,192) having one value (e.g., black) and half having the other value (e.g., white). FIG. 59 shows an 80×80 excerpt of such a pure bi-modal message signal. As with the other embodiments, a subset of the black marks can be employed (e.g., on the order of 500 of the 8192 black marks), while still assuring reliable signal recovery.

Figure 60:
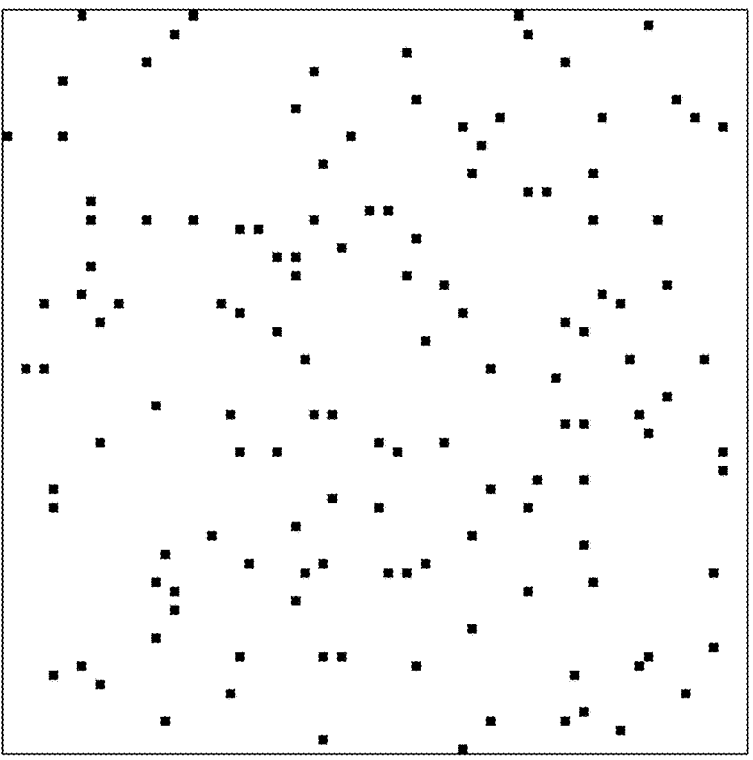
FIG. 60 shows a sparse selection of marks copied from the FIG. 59 message signal block.

In one particular embodiment, black marks are randomly selected from the pure message signal block of FIG. 59, subject to a placement constraint, until a desired percentage of the black marks have been selected. These are then copied from the pure message signal block to corresponding locations an output block. Such a resulting array is shown in FIG. 60. If 10% of the marks are selected for copying to the output block (i.e., 819 marks), this reduces the print density from 50% to 5%. A greater or lesser percentage of marks can be so-selected, to yield different sparseness.

In other embodiment, the marks aren't selected randomly from the pure message signal of FIG. 59. Instead, they are selected preferentially from certain areas, so as to give a patterned appearance to the resulting array of marks in the output block. For example, blocks from most of the block can be selected at one rate (e.g., 5%), but within an outline corresponding to a corporate logo, a denser selection of marks can be picked (e.g., 10%), to yield a logo-patterned sparse block.

FIGS. 61 and 62 show such an arrangement. A corporate logo, illustrated by the star in FIG. 61, serves as a selection mask. Within black regions of this mask, marks are selected at a greater density than within white regions of this mask. A sparse pattern echoing the corporate logo is thereby produced, as shown in FIG. 62, and can be tiled across the label. An array of such blocks, depicted at a scale at which they may appear on an actual label, is shown in FIG. 63. Naturally, with greater or lesser print densities inside the mask region, patterns of greater or lesser overtness can be formed.

(A dot placement constraint may be employed within the darker density excerpts, or not. In FIGS. 62 and 63, no such constraint is employed.)

While described in the context of a message signal-only marking, it will be recognized that selection of dots at different densities, in different regions, can achieve results like that shown in FIGS. 62 and 63 in other marking arrangements, e.g., in embodiments in which both reference and message signal components are formed by thermal black marks.

To read the message from the imagery captured by a point of scale scanner, the affine distortion of the captured image relative to the printed original (due to the pose at which the object is presented to the scanner) must be determined. The reference signal, detected from the pre-printed dots, enables the scale and rotation of the imaged pattern, relative to the original pattern, to be established. The translation, however, also needs to be determined.

One way of establishing translation (e.g., finding the upper left corner of the message signal block in the captured image) is to thermally print an indicium, such as a fiducial marking, at a known location relative to the message signal block, as part of the message signal. The fiducial can be a known pattern, such as a bulls-eye marking, a diamond, a plus symbol, or a logo. Alternatively, the indicium can be a distinctive 2D pattern of sparse dots, on which the signal decoder can sync—such as by spatially correlating the known 2D pattern with excerpts of imagery until a match is found. In some embodiments, the distinctive pattern is achieved by setting certain of the payload bits to fixed values, and printing some or all of the dots corresponding to such pattern. The location of the known pattern relative to the reference signal defines the translation of the message signal, enabling decoding to proceed.

Such arrangement, employing a fiducial printed by the label printer, permits the message signal to be applied in any spatial relationship to the pre-printed reference signal, with the detector thereafter determining the unknown translation offset based on the position of the detected fiducial relative to the detected reference signal. In another embodiment, tolerances of the printing mechanism are sufficiently precise that the thermally-printed message signal reliably appears at a known spatial position on the label, e.g., with an upper right corner of a message signal block coincident with the upper right corner of the label (or where such label corner would be if its corners were not rounded). Since the reference signal can be pre-printed on the label with high precision (e.g., as is commonly required in offset presses to achieve alignment of different plates and screens), the reference signal and message signal can be printed in a spatial alignment rivaling that of arrangements in which both signal components are printed in a common operation. At worst, a small brute force 2D correlation search, e.g., based on fixed bits of the encoded message, can correct for any small offset. Decoding of the message from the captured imagery can then proceed in the usual manner.

In still another arrangement, the thermal printer is equipped with an optical sensor that captures image data from the pre-printed label before thermal printing, and determines—from the sensed data—the location of the upper left corner of a block of the reference signal. This enables the printer to print the message signal in registered alignment with the reference signal, so that no sleuthing of translation is required.

In one such embodiment, the optical sensor includes a 2D camera that captures an image including the reference signal. The image reveals the pattern's position, enabling the printer to apply the message signal in registered alignment. In a simpler embodiment, the optical sensor is simply a photodiode and photodetector arrangement, positioned to sense a tic mark that was pre-printed on the margin of the label, in the same pre-printing operation as the reference pattern. Again, by locating the position of the tic mark, the printer can print the message signal in registered alignment with the reference signal.

In a variant arrangement, a synchronization mark or pattern for sensing by the optical sensor in the printer is not pre-printed on the label area itself, but rather is formed on an adjoining medium—such as a trim piece to the side of the label (a piece that is left behind when the label is peeled from its backing), or a backing or trim piece that is between labels.

Message Signaling by Reference Signal Dot Selection

The signaling arrangement described below is advantageous in that it more closely approaches the Shannon limit for information transfer (at a given reliability), than prior art arrangements. In a particular embodiment, only 1024 dark marks are employed in a 128×128 signal block. The marks all represent the reference signal, but their selection represents the message signal.

The method starts with a reference signal block—such as the one from which signal 74 in FIG. 7 is excerpted. At each location in the reference signal block (e.g., in a 128×128 element block), the reference signal has a corresponding signal value, e.g., ranging from 0 (black) to 255 (white). The elements (e.g., 16,384 of them) are sorted by value to generate a ranked list, including the 2048 darkest elements. Each entry in the list is associated with an ordinal position (0, 1, 2 . . . ), and {X,Y} data specifying the element's position within the block, by column and row. Table 2 shows an excerpt of such a list:

TABLE 2

| Rank | Value | {X, Y} |
| --- | --- | --- |
| 0 | 6 | {18, 22} |
| 1 | 7 | {72, 32} |
| 2 | 7 | {1, 33} |
| 3 | 9 | {26, 82} |
| 4 | 10 | {14, 7} |
| 5 | 10 | {33, 73} |
| 6 | 12 | {19, 83} |
| 7 | 13 | {1, 123} |
| 8 | 13 | {78, 23} |
| 9 | 14 | {26, 121} |
| 10 | 14 | {100, 15} |
| 11 | 16 | {119, 99} |
| 12 | 16 | {70, 34} |
| 13 | 17 | {87, 65} |
| 14 | 19 | {34, 108} |
| 15 | 19 | {98, 73} |
| . . . | . . . | . . . |
| 2047 | 101 | {79, 89} |

The payload, e.g., of 64 bits, is processed by convolutional encoding and, optionally, repetition, to yield a message that is 1024 bits in length. Each bit in the message is associated with a successive pair of reference signal elements in the ranked list. If the bit is even-valued (i.e., 0), then the even-numbered element from the pair determines a location in the output signal block that is darkened. If the bit is odd-valued (i.e., 1), then the odd-numbered element of the pair determines the location in the output block that is darkened. Thus, 1024 of the elements from the list of 2048 elements are selected, based on the bit values of the 1024 message bits, and define 1024 locations in the output signal block that are darkened.

To illustrate, consider a message that starts 10110001 . . . . . In such case, the elements in the output signal block identified in Table 3 are darkened:

TABLE 3

| {72, 32} |
| --- |
| {1, 33} |
| {33, 73} |
| {1, 123} |
| {78, 23} |
| {100, 15} |
| {119, 99} |
| {87, 65} |
| {34, 108} |
| . . . |

Each of the 1024 dots in the output signal block corresponds to one of the darkest values in the original reference signal block. Each such dot also represents a corresponding bit of the 1024 message bits.

In decoding a captured image depicting such a sparse pattern, the affine transformation of the image is first determined by reference to the reference signal, as described elsewhere. The image is then typically counter-distorted to restore the pattern to its original presentment. (More precisely, the received image is re-sampled in accordance with a coordinate system that is defined from the determined affine transformation, as detailed in publication 20170193628.)

To interpret the message, the detector uses its own copy of data from Table 2. (This table is consistent for all marks employing the particular reference signal, and occupies negligible memory in the detector code.) The detector examines the counter-distorted imagery to determine the pixel values at the two locations specified by the first two entries in the table (i.e., ranks 0 and 1). Ideally, one is dark and one is light. The dark one indicates the value of the first message bit. The detector then examines the imagery to determine the pixel values at the third and fourth entries in the table (i.e., ranks 2 and 3). Again, ideally one is dark and the other is light. The dark one indicates the value of the second message bit. And so on.

In actual practice, the two locations examined by the detector—in considering each possible bit of the message—may be far apart in value (indicating confidence in the bit determination) or may be closer together in value (indicating less confidence). To quantify the confidence associated with each message bit determination, a score is computed based on the values of the pixels at the locations indicated by the odd- and even-numbered entries of the pair in the table. One suitable score is:

$$\text{Score} = \text{Log}_2 \text{ (value of pixel at odd location/value of pixel at even location)}$$

In the above example, if the value of the pixel at the odd location {72,32} is 30 and the value of the pixel at the even location {18,22} is 240, the score is a negative 3, indicating that the first bit of the message has value 1. (Any negative value indicates the bit value is 1.)

Considering the next bit, the detector may find the value of the pixel at the odd location {26,82} to be 130, and the value of the pixel at the even location {1,33} to be 101. In this case the score is 0.364. The positive score indicates the corresponding bit value is 0. The absolute magnitude of the score, however, is low (e.g., relative to the absolute value of the first bit score: 3). This indicates less confidence in this determination.

The string of message bits obtained by this procedure (after considering all 2048 candidate locations in the counter-distorted imagery), together with the confidence score for each, is applied to a soft decoder, such as a Viterbi, Reed-Solomon, or Turbo decoder. From these raw bit determinations and confidence scores, the decoder returns the original 64-bit payload.

The just-described arrangement pairs extrema points in the reference signal based on adjacency in a sort order. The detailed arrangement is preferred because the alternate locations for each payload bit representation are of similar reference signal strength. But this is not essential. Pairing can be done in any fashion, e.g., randomly within a subset of elements having values below a threshold value.

It will be recognized that the just-detailed decoding procedure is different than that used with the other sparse encodings of the message signal detailed in this specification (because the message encoding procedure is different). In some embodiments, the decoder makes an initial determination of how the message signal is represented, and it applies a corresponding decoding method.

In one such embodiment, the different encoding is signaled by the presence or absence of certain spatial frequency peaks in the reference signal. As noted, this signal typically comprises several dozen peaks. A few more (e.g., 1-10) can be added (or omitted) to serve as a flag, to a compliant detector, indicating that the encoding procedure detailed in this section is being used, and that a corresponding decoding method should likewise be used. That is, such a detector examines the reference signal to determine whether these flag spatial frequencies are present (or absent) in the reference signal, and applies a decoding method corresponding to the output of such determination. The presence or absence of such frequencies does not interfere with the reference signal's purpose of enabling synchronization of the decoder to the message signal, since that synchronization process is robust to various distortions of the reference signal.

(The just-described arrangement can be used to signal between use of many different encoding techniques, by corresponding sets of extra (or omitted) spatial frequency components. The detector can sense which encoding technique is being used from the spatial frequency components that are detected in the reference signal, and apply a corresponding decoding algorithm.)

In another embodiment, the decoder begins by applying the above-detailed decoding method (after compensation for affine distortion in the captured imagery, as determined by use of the reference signal). If the decoder concludes that dark marks (or no marks) are found at both locations of some threshold number K of the first few pairs in the ranked list of Table 2, then it abandons the decoding approach described in this section, and instead applies the decoding approach detailed elsewhere herein, including the documents incorporated by reference.

To review, in this particular embodiment, the message consists of plural bits, each having a first or a second value (e.g., 0 or 1) at a respective position in the string. A list of M (e.g., 2048) 2D reference signal elements is ranked by value, so that each has an ordinal position in the list, and each is associated with a location in the 2D reference signal. The list thus defines plural pairs of elements, having ordinal positions of 2N and 2N+1, for N=0, 1, 2, . . . (M/2)−1. Each pair of elements includes an element with an even ordinal position and an element with an odd ordinal position. Each position in the message signal is associated with a pair of elements in the ranked list. A mark is provided in the output signal block at a location corresponding to the location of the even element in a pair, when the associated position in the message signal has the first value (e.g., 0). Similarly, a mark is provided in the output signal block at a location corresponding to the location of the odd element in a pair, when the associated position in the message signal has the second value (e.g., 1).

In an alternate embodiment, data from the ranked list of reference signal values and locations is not stored. Rather, it is computed on the fly as needed. In such case, real-valued samples of the continuous reference signal may be computed at each point in the 2D signal block to determine the rank ordering, to avoid ambiguities that can be caused by integer values (as used in Table 2).

In some embodiments, the extrema of the reference signal are filtered to enforce a distance constraint (keep-out region), so that no two extrema are closer than a threshold distance from each other.

Operating Environment

The above methods are implemented in software instructions or digital circuitry organized into modules. These modules include an optical code optimizer, generator, inserter and decoder. Notwithstanding any specific discussion of the embodiments set forth herein, the term "module" refers to software instructions, firmware or circuitry configured to perform any of the methods, processes, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in MATLAB, C, C++, Visual Basic, Java, Python, Tcl, Perl, Scheme, Ruby, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hardwired circuitry, programmable circuitry such as computer processors comprising one or more individual instruction processing cores, state machine circuitry, or firmware that stores instructions executed by programmable circuitry.

Implementation can additionally, or alternatively, employ special purpose electronic circuitry that has been custom-designed and manufactured to perform some or all of the component acts, as an application specific integrated circuit (ASIC). To realize such an implementation, the relevant module(s) (e.g., encoding and decoding of optical codes within host image content) are first implemented using a general purpose computer, using software such as MATLAB (from Mathworks, Inc.). A tool such as HDLCoder (also available from MathWorks) is next employed to convert the MATLAB model to VHDL (an IEEE standard) or Verilog. The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

HDLCoder may also be used to create a Field Programmable Gate Array implementation. The FPGA may be used to prototype the ASIC or as an implementation in a FPGA chip integrated into an electronic device.

Figure 64:
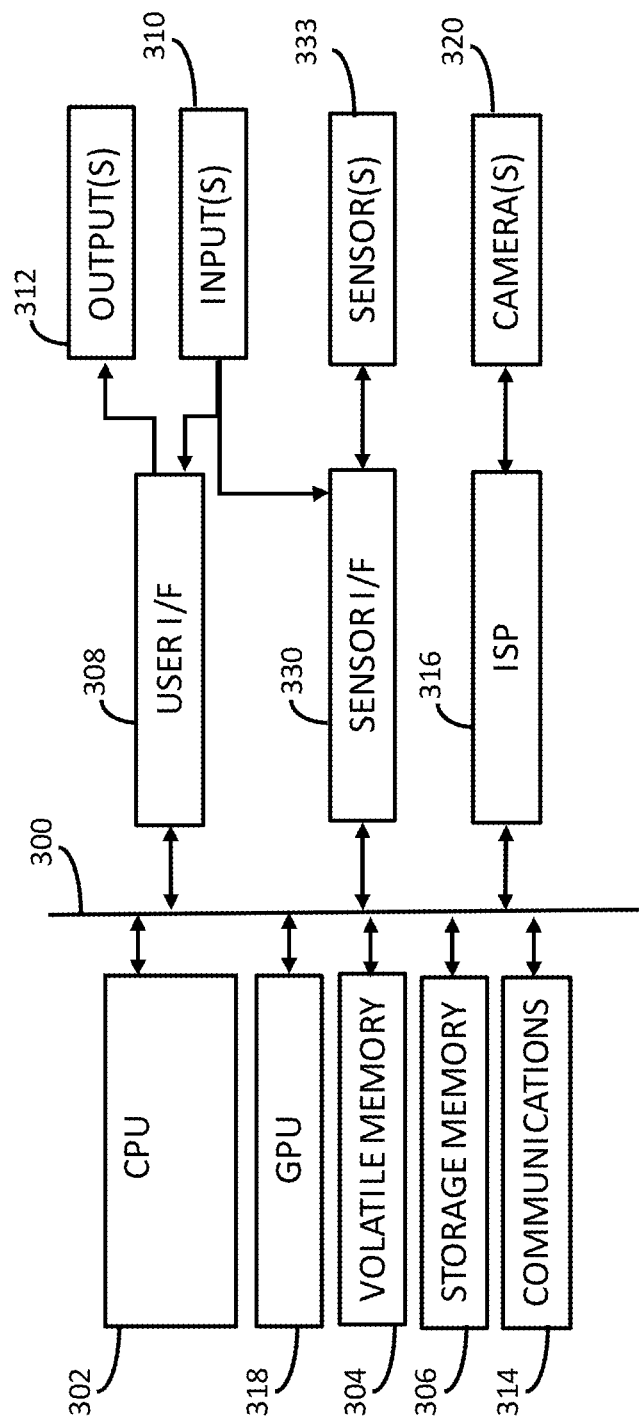
FIG. 64 is a diagram of an electronic device in which the components of an optical code generator, inserter, optimizer and/or decoder, as detailed herein, may be implemented.

For the sake of illustration, FIG. 64 is a diagram of an electronic device in which the components of the above optical code generator, inserter, optimizer and decoder embodiments may be implemented. It is not intended to be limiting, as the embodiments may be implemented in other device architectures or electronic circuitry. For example, it represents a computer in which program instructions for generating, optimizing, inserting and decoding optical codes are stored and executed to carry out methods described in this document. It also represents special purpose computer systems like scales with thermal label printers, label printers, and barcode scanners. It also represents headworn apparatus, such as virtual- and augmented-reality eyewear and headsets. Like more general purpose computers and mobile devices (e.g., smartphones and tablets), these devices also include memory for storing firmware implementations of these methods and processors for executing them. They may also include above-referenced FPGA or ASIC implementations of the optical code optimizer, generator, inserter and/or decoder.

Referring to FIG. 64, a system for an electronic device includes bus 300, to which many devices, modules, etc., (each of which may be generically referred to as a "component") are communicatively coupled. The bus 300 may combine the functionality of a direct memory access (DMA) bus and a programmed input/output (PIO) bus. In other words, the bus 300 may facilitate both DMA transfers and direct CPU read and write instructions. In one embodiment, the bus 300 is one of the Advanced Microcontroller Bus Architecture (AMBA) compliant data buses. Although FIG. 64 illustrates an embodiment in which all components are communicatively coupled to the bus 300, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 302. The CPU 302 may be a microprocessor, mobile application processor, etc., known in the art (e.g., a Reduced Instruction Set Computer (RISC) from ARM Limited, the Krait CPU product-family, a X86-based microprocessor available from the Intel Corporation including those in the Pentium, Xeon, Itanium, Celeron, Atom, Core i-series product families, etc.). The CPU 302 runs an operating system of the electronic device, runs application programs and, optionally, manages the various functions of the electronic device. The CPU 302 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device.

The electronic device may also include a volatile memory 304 electrically coupled to bus 300. The volatile memory 304 may include, for example, any type of random access memory (RAM). Although not shown, the electronic device may further include a memory controller that controls the flow of data to and from the volatile memory 304.

The electronic device may also include a storage memory 306 connected to the bus. The storage memory 306 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the invention, the storage memory 306 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof.

Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like.

Also connected to the bus 300 is a user interface module 308. The user interface module 308 is configured to facilitate user control of the electronic device. Thus the user interface module 308 may be communicatively coupled to one or more user input devices 310. A user input device 310 can, for example, include a button, knob, touch screen, trackball, mouse, microphone (e.g., an electret microphone, a MEMS microphone, or the like or any combination thereof), an IR or ultrasound-emitting stylus, an ultrasound emitter (e.g., to detect user gestures, etc.), one or more structured light emitters (e.g., to project structured IR light to detect user gestures, etc.), one or more ultrasonic transducers, or the like or any combination thereof.

The user interface module 308 may also be configured to indicate, to the user, the effect of the user's control of the electronic device, or any other information related to an operation being performed by the electronic device or function otherwise supported by the electronic device. Thus the user interface module 308 may also be communicatively coupled to one or more user output devices 312. A user output device 312 can, for example, include a display (e.g., a liquid crystal display (LCD), a light emitting diode (LED) display, an active-matrix organic light-emitting diode (AMOLED) display, an e-ink display, etc.), a printer, a loud speaker, or the like or any combination thereof.

Generally, the user input devices 310 and user output devices 312 are an integral part of the electronic device; however, in alternate embodiments, any user input device 310 (e.g., a microphone, etc.) or user output device 312 (e.g., a speaker, display, or printer) may be a physically separate device that is communicatively coupled to the electronic device (e.g., via a communications module 314). A printer encompasses different devices for applying images carrying digital data to objects, such as 2D and 3D printers (thermal, intaglio, ink jet, offset, flexographic, laser, gravure, etc.), and equipment for etching, engraving, embossing, or laser marking.

Although the user interface module 308 is illustrated as an individual component, it will be appreciated that the user interface module 308 (or portions thereof) may be functionally integrated into one or more other components of the electronic device (e.g., the CPU 302, the sensor interface module 330, etc.).

Also connected to the bus 300 is an image signal processor 316 and a graphics processing unit (GPU) 318. The image signal processor (ISP) 316 is configured to process imagery (including still-frame imagery, video imagery, or the like or any combination thereof) captured by one or more cameras 320, or by any other image sensors, thereby generating image data. General functions typically performed by the ISP 316 can include Bayer transformation, demosaicing, noise reduction, image sharpening, or the like or combinations thereof. The GPU 318 can be configured to process the image data generated by the ISP 316, thereby generating processed image data. General functions performed by the GPU 318 include compressing image data (e.g., into a JPEG format, an MPEG format, or the like or combinations thereof), creating lighting effects, rendering 3D graphics, texture mapping, calculating geometric transformations (e.g., rotation, translation, etc.) into different coordinate systems, etc. and sending the compressed video data to other components of the electronic device (e.g., the volatile memory 304) via bus 300. Image data generated by the ISP 316 or processed image data generated by the GPU 318 may be accessed by the user interface module 308, where it is converted into one or more suitable signals that may be sent to a user output device 312 such as a display, printer or speaker.

The communications module 314 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR- or visible-light communication), sonic or ultrasonic communication, etc.), or the like or any combination thereof. In one embodiment, the communications module 314 may include one or more microprocessors, digital signal processors or other microcontrollers, programmable logic devices, or the like or combination thereof. Optionally, the communications module 314 includes cache or other local memory device (e.g., volatile memory, non-volatile memory or a combination thereof), DMA channels, one or more input buffers, one or more output buffers, or the like or combination thereof. In some embodiments, the communications module 314 includes a baseband processor (e.g., that performs signal processing and implements real-time radio transmission operations for the electronic device).

Also connected to the bus 300 is a sensor interface module 330 communicatively coupled to one or more sensors 333. A sensor 333 can, for example, include a scale for weighing items (such as in a scale used to weigh items and print labels in retail or food manufacturing environment). Although separately illustrated in FIG. 64, any camera 320 can also be considered a sensor 333. Generally, a sensor 333 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 333 coupled to the sensor interface module 330 are an integral part of the electronic device; however, in alternate embodiments, one or more of the sensors may be physically separate devices communicatively coupled to the electronic device (e.g., via the communications module 314). To the extent that any sensor 333 can function to sense user input, then such sensor 333 can also be considered a user input device 310.

The sensor interface module 330 is configured to activate, deactivate or otherwise control an operation (e.g., sampling rate, sampling range, etc.) of one or more sensors 333 (e.g., in accordance with instructions stored internally, or externally in volatile memory 304 or storage memory 306, ROM, etc., in accordance with commands issued by one or more components such as the CPU 302, the user interface module 308). In one embodiment, sensor interface module 330 can encode, decode, sample, filter or otherwise process signals generated by one or more of the sensors 333. In one example, the sensor interface module 330 can integrate signals generated by multiple sensors 333 and optionally process the integrated signal(s). Signals can be routed from the sensor interface module 330 to one or more of the aforementioned components of the electronic device (e.g., via the bus 300). In another embodiment, however, any signal generated by a sensor 333 can be routed (e.g., to the CPU 302), before being processed.

Generally, the sensor interface module 330 may include one or more microprocessors, digital signal processors or other microcontrollers, programmable logic devices, or the like or any combination thereof. The sensor interface module 330 may also optionally include cache or other local memory device (e.g., volatile memory, non-volatile memory or a combination thereof), DMA channels, one or more input buffers, one or more output buffers, and any other component facilitating the functions it supports (e.g., as described above).

Other suitable operating environments are detailed in the incorporated-by-reference documents.

CONCLUDING REMARKS

Having described and illustrated the principles of the technology with reference to specific implementations, it will be recognized that the technology can be implemented in many other, different, forms.

For example, while certain of the detailed techniques for generating sparse marks involve filling a blank output tile with dots until a desired print density is reached, a different approach can be used. For instance, a too-dark output signal tile can be initially generated (e.g., by including too many dark dots), and then certain of the dark dots can be selectively removed based on various criteria.

For example, if a 10% print density is desired, the darkest 15% of pixels in a dense greyscale composite signal 78 can be copied as dark dots in an initial output signal frame. The frame can then be examined for the pair of dots that are most-closely spaced, and one of those two dots can be discarded. This process repeats until dots have been discarded to bring the print density down from 15% to 10%. The remaining array of dark dots has thereby been enhanced to increase the average inter-pixel distance, improving the visual appearance compared to the earlier-described naïve approach. (For example if the above-described naïve approach has an inter-pixel spacing constraint of 6 pixels, then many pixel pairs will have this threshold spacing. But if the output tile is initially overpopulated, and is thinned by the detailed procedure, then fewer of the remaining dots will be at this threshold spacing from their nearest neighbor. The tradeoff, here, can be signal strength, but in many applications signal strength is less important than visual aesthetics.)

Similarly, an initially-overpopulated output frame can be thinned based on criteria such as optimizing information efficiency (e.g., enhancing signal due to white pixels), and attaining approximately uniform distribution of signal strength among different bit positions of the payload, as discussed above.

Unless otherwise indicated, the term "sparse" as used herein refers to a bitonal code in which 50% or less of the substrate is marked to produce a contrasting mark (e.g., ink on a white substrate, or a light void surrounded with contrasting ink). More typically, a sparse mark has less than 30% of the substrate so-marked, with a print density of 2-15% being most common.

While the specification describes the reference signal component as being comprised of sinusoids of different spatial frequency, the reference signal can alternatively or additionally comprise orthogonal patterns. These, too, can be varied in amplitude using the FIG. 34 arrangement, to obtain patterns of different appearances.

Although the detailed technologies have been described in the context of forming codes by printing black dots on a white background (or vice-versa), it will be recognized that the codes can be formed otherwise. For example, a clear varnish or other surface treatment can be applied to locally change the reflectivity of a surface, e.g., between shiny and matte. Similarly, the code can be formed in a 3D fashion, such as by locally-raised or depressed features. Laser engraving or 3D printing are some of the technologies that may be employed. Laser ablation is well suited for producing sparse data markings on the skins of fruits and vegetables, e.g., to convey an identifier, a pick date, a use-by date, and/or a country of origin, etc. (Sparse marks, as detailed herein, cause less damage to fruits/vegetables than linear 1D barcodes, which are more likely to breach the skin due to their elongated elements.)

Still other forms of marks can also be used. Consider plastic and cellophane food wrappers, which may be perforated to prevent condensation from forming and being trapped within the wrapper. The pattern of perforations can convey one of the sparse marks detailed herein. Or the perforations can convey extrema of the reference signal, and a message signal can be marked otherwise—such as by ink. The perforations can be made by a shaped roller pressured against the plastic, puncturing it with holes sized to permit air, but not food particles, out.

While the specification has focused on sparse marks formed by black dots on white substrate, it will recognized that colored marks can be used, on a white background, or on a background of a contrasting color (lighter or darker). Similarly, light marks can be formed on a black or colored background. In some embodiments, the colors of sparse markings can vary over a piece of host artwork, such as a label. For example, dots may be cyan in one region, black in a second region, and Pantone 9520 C in a third region.

In arrangements in which light dots are formed on a dark background, "light" pixels should be substituted for "dark" elements (and high signal values substituted for low signal values) in the algorithmic descriptions herein.

The thermal printers commonly used for label printing have a finite life that is dependent—in large part—on thermal stresses due to the number of times the individual print elements are heated and cooled. While it is preferable, in some embodiments, to avoid clumping of dots, in other embodiments some clumping is advantageous: it can extend the useful life of thermal printheads.

As discussed earlier, e.g., in connection with FIGS. 39 and 40, the configuration of a dot can be altered to improve visual quality or robustness. There are several different configurations that can be used.

FIG. 65A shows a 4×4 configuration of marking locations, of which three are printed. A single thermal element prints all the locations in a single column—indicated by the arrows. In FIG. 65A, there are six thermal wear events—three when a thermal element is heated to form a mark on a printer row, and three when the thermal element is cooled to not form a mark on a following row. These thermally-stressful events are shown by circles. One printhead element is left unstressed in this example.

FIG. 65B shows an alternate cell (dot) configuration. Again, three marks are made, but their positions are selected to as to reduce thermal stresses on the printhead elements. Here there are just four thermally-stressful events. Two printheads are left unstressed.

FIG. 65C shows a further example. Again, three marks are made, but their positions are selected so that the cell is printed with just two thermally stressful events. Three printheads are left unused.

Returning to FIG. 40, in contrast to the right-most 2×2 patterns, a less thermally-stressful 2×2 pattern is to mark two vertically-adjoining locations, and to leave the two horizontally-adjoining locations unmarked. Such arrangement in shown in FIG. 65D. Such a signal block is particularly advantageous with certain thermal printers that print at a resolution higher than 203 dpi (e.g., 300 dpi). At such higher resolution, a single dot may not convey as much signal (in a single-to-noise sense) as is desired, yet a full 2×2 mark (as in the left-most FIG. 40 example) is so dark as to be visually unappealing. In such case, the pattern of FIG. 65D can provide the best balance between signal and unobtrusiveness, while giving priority to printer life.

A thermal stress score for a label can be produced by counting the total number of printhead element heating and cooling events involved in printing the data marking, across the entirety of the label. Software used to design the label can include a slider control to establish a degree to which printhead life should be prioritized in deciding where marks should be placed (versus prioritizing avoidance of clumping). As discussed above in connection with FIG. 34, the user interface can include a preview panel showing the pattern being designed. The label designer can use the slider, in conjunction with the preview panel, to achieve a marking pattern (e.g., cell dither patterns, as in FIG. 40 and FIGS. 65A-D) that yields the lowest thermal stress score, while still providing visually satisfactory results.

Exemplary thermal printers are detailed in U.S. Pat. Nos. 9,365,055, 7,876,346, 7,502,042, 7,417,656, 7,344,323, and 6,261,009. Direct thermal printers can use cellulosic or polymer media coated with a heat-sensitive dye, as detailed, e.g., in U.S. Pat. Nos. 6,784,906 and 6,759,366.

The specification refers to optimizing parameters related to visual quality and robustness, such as spatial density, dot spacing, dot size and priority of optical code components. It will be recognized that this is an incomplete list, and a variety of other parameters can be optimized using the teachings herein, e.g., the strength with which each payload bit is represented, the number of pixels that convey desired information, visual structure of the resulting mark, etc.

While the specification sometimes refers to pixels, it will be recognized that this is shorthand for "picture elements." A single such element may be comprised of plural parts, e.g., a region of 2×2 or 3×3 elements. Thus, depending on implementation, a pixel in the specification may be realized by a group of pixels.

The present technology is sometimes implemented in printer-equipped weigh scales, e.g., used by grocery stores in their deli departments. Such weigh scales have modest processors, so various optimizations can be employed to assure that the image processing needed to generate a single-use adhesive label pattern does not slow the workflow.

One such optimization is to pre-compute the reference signal, at the resolution of the print mechanism (e.g., 203 dots per inch). This pattern is then cached and available quickly for combining with the (variable) message payload component.

In some embodiments, the payload component is created as a bitonal pattern at a fixed scale, such as 64×64 or 128×128 elements, and then up-sampled to a grey-scale pattern at the print mechanism resolution (e.g., as shown and described in connection with FIG. 9). This up-sampling can be time-consuming, depending on interpolation algorithm. Bi-cubic interpolation has been found to provide a good tradeoff between computational speed and accuracy, on modest processors.

Some embodiments involve processing pixels, in a composite dense code, in a rank-dependent order, in order to fill an output block with marks. Rather than sort all the pixels by their values, applicant has found it advantageous to apply a threshold-compare operation to identify, e.g., those pixels with a value less than 50 or 100. Such operation is very quick. The subset of pixels that pass the thresholding test are then sorted, and this ranked list is then processed. (The threshold value is determined empirically, based on experience with the values of pixels that are typically required in a particular application.) Alternatively, the pixels can be binned into several coarse value bins, e.g., of uniform spans or binary spans—such as (a) between 0 and 15; between 16 and 31; between 32 and 63; between 64 and 127; and between 128 and 255. Some or all of these bins can be separately sorted, and the resulting pixel lists may be concatenated to yield a ranked list including all pixels.

Sometimes it is preferable is to divide the dense code into parts, e.g., bands having a width of 16, 24 or 32 pixels across the code block, and sort each band separately. For example, if the dense code is 384×384 elements, band #1 can comprise rows 1-24 of elements; band #2 can comprise rows 25-48 of elements, etc., as shown in FIG. 66. Dots can be selected first from one band, and then the adjoining band, and so forth across the block, to achieve the dot desired density. (In an alternate embodiment, dots are selected from the sorted pixels of band #1, and then band #3, and then band #5, etc., until the block has been traversed, and then continuing by selecting dots from the sorted pixels of bands #2, #4, #6, etc., until finished.) Because the statistics of the dense code are generally uniform across space, selecting dots in this fashion yields substantially the same results as would be achieved by sorting the entire block and selecting dots from the resulting data. Yet because the sorting complexity (e.g., using the Quicksort algorithm) is related to n*log$_2$(n), there is a substantial computational efficiency that is gained by sorting, for instance, 16 smaller bands, instead of one large block. Moreover, the sorting operation (and dot selection) can be executed on each of multiple bands in parallel, permitting efficient multi-threaded implementation.

The dot selection process often involves assessing candidate dot locations to assure that a keep-out region around previously-selected dots is observed. Consider a candidate dot at row 11 and column 223. If the keep-out region is a distance of 4 elements (pixels), then one implementation looks to see if any dot has previously been selected in rows 7-15. This set of previously-selected dots is further examined to determine whether any is found in columns 219-227. If so, then the distance between such previously-selected dot and the candidate dot is determined, by computing the square root of the sum of the row difference, squared, and the column distance, squared. If any such distance is less than 4, then the candidate dot is discarded.

Applicant has found that a substantial computational saving can be achieved by a different algorithm. This different algorithm maintains a look-up data structure (table) having dimensions equal to that of the dense code, plus a border equal to the keep-out distance. The data structure thus has dimensions of 392 rows×392 columns, in the case of a 384×384 element dense code (and a keep out of 4). Each element in the data structure is initialized to a value of 0—signifying that the corresponding position in the sparse block is available for a dot.

When a first dot is selected for inclusion in the sparse block, the corresponding location in the data structure—and neighboring locations within a distance of 4—are changed to a value of 1—signifying that they are no longer available for a dot. When a second candidate dot is considered at a given row/column of the sparse signal block, the corresponding row/column of the data structure is checked to see if its value is 0 or 1. If 0, the dot is written to the sparse output block, and a corresponding neighborhood of locations in the data structure are changed in value to 1—preventing any other dots from violating the keep out constraint. This process continues, with the location of each candidate dot being checked against the corresponding location in the data structure and, if still a 0, the dot is written to the sparse output block and the data structure is updated accordingly.

Figures 67A, 67B:
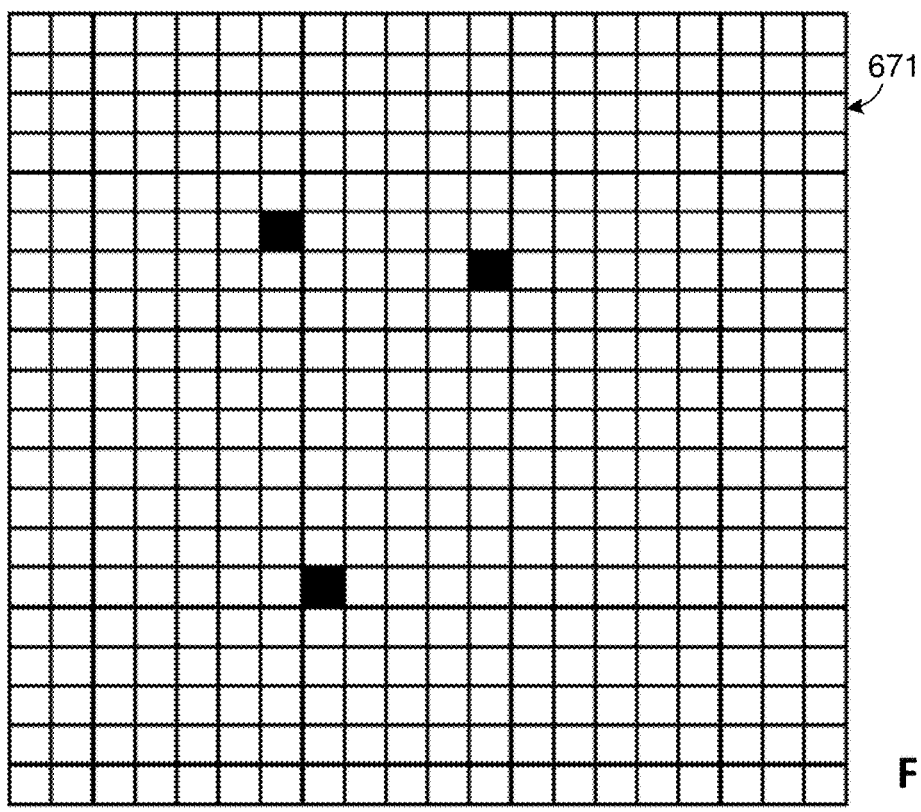
FIG. 67A shows an excerpt of a sparse output block.
FIG. 67B shows an excerpt of a data structure used to enforce a keep out constraint in the block of FIG. 67A.

FIG. 67A shows an excerpt of an output sparse block 671 that has been (so-far) populated with three dots. FIG. 67B shows an excerpt of the just-described data structure 672 corresponding to block 671, showing how values are changed from 0 to 1 within neighborhoods of locations surrounding those where dots are located (shown in bold borders), to enforce a keep out distance of 4 elements.

Naturally, this arrangement can likewise be used for non-circular keep-out regions, as detailed earlier.

Figure 67C:
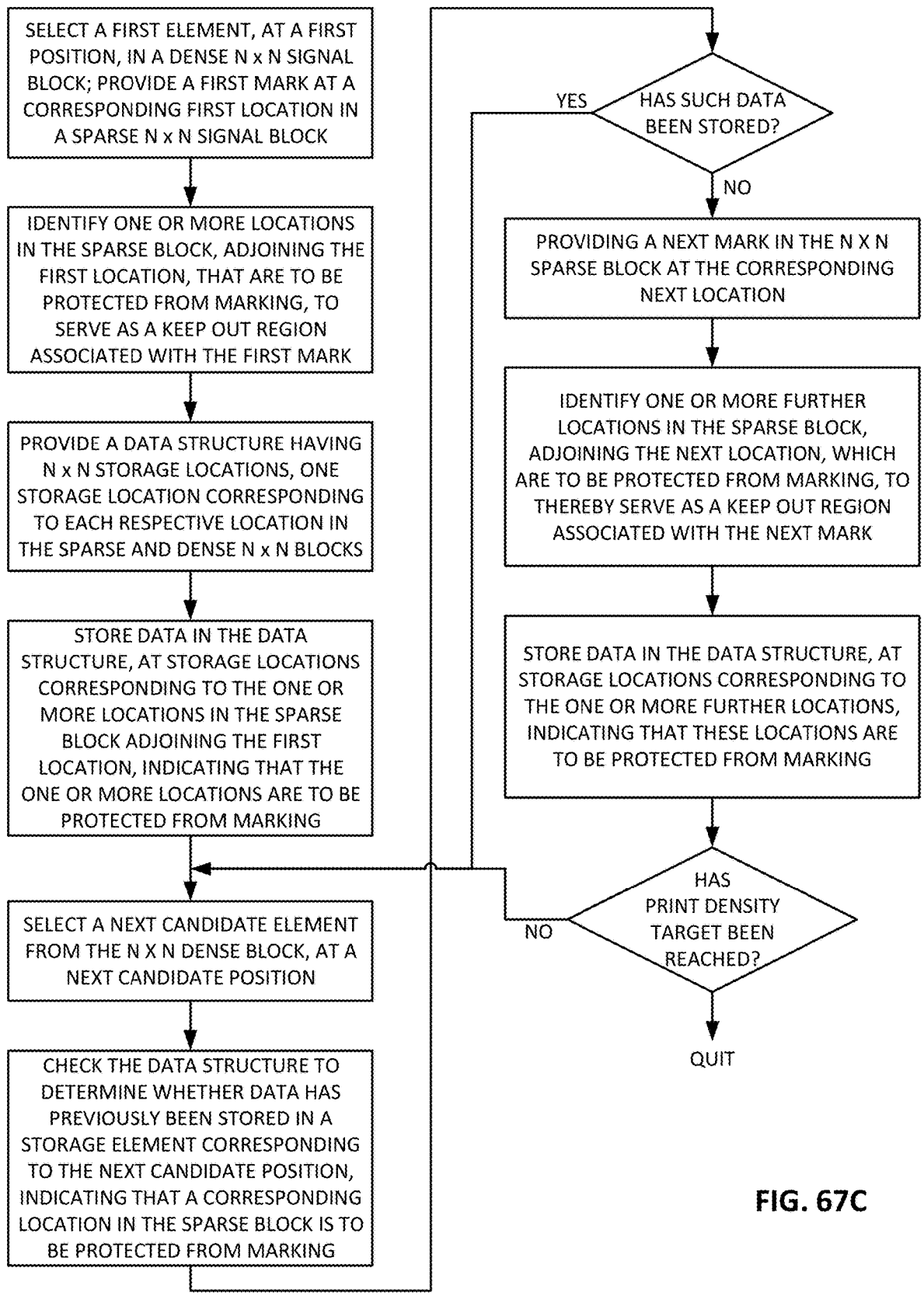
FIG. 67C is a flow chart detailing a method that uses the data structure of FIG. 67B.

FIG. 67C is a flow chart detailing aspects of an embodiment employing the foregoing arrangement.

While reference was frequently made to dot spacing or distance constraints, it will be recognized that this is just one approach to avoiding dot clumping. Other approaches, such as the patterned keep-out regions discussed above, can be substituted.

While the specification has sometimes referred to rolls of adhesive label stock, it will be recognized that label stock can be provided otherwise, such as in a fanfold arrangement, without departing from the other principles of the detailed technologies.

Similarly, while much of the disclosure has focused on labels, it should be recognized that most of the detailed technologies are more broadly applicable. Not just to thermally-printed media (e.g., including receipts and coupons from point of sale terminals), but to media printed otherwise.

One application of the technology assists human workers who frequently consult printed documentation—such as blueprints or manuals. A headworn apparatus, such as a Google Glasses device, can image sparse markings in documentation, and present linked data, such as exploded views of a component, placement diagrams, etc. Gestures of the head can drill-down for additional detail or magnification, or advance an augmentation to a next step in a procedure.

Attached to application 62/673,738 are Wikipedia articles detailing the Quicksort algorithm, and Bicubic Interpolation.

This specification has detailed many arrangements for generating sparse codes from dense codes. While composite dense codes—including payload and reference signals—are most commonly used, the arrangements can variously be applied to dense codes consisting just of payload or reference signals. Further, as noted elsewhere, payload data can be conveyed by a reference signal (e.g., by the presence or absence of certain spatial frequency components). Similarly, reference information can be conveyed by a payload signal (e.g., by use of fixed bits in the payload data, thereby forming an implicit synchronization signal having known signal characteristics, by which a detector can locate the payload signal for decoding).

One arrangement creates a sparse code by applying a thresholding operation to a dense code, to identify locations of extreme low values (i.e., dark) in the dense code. These locations are then marked in a sparse block. The threshold level establishes the print density of the resulting sparse mark.

Another arrangement identifies the darkest elements of a reference signal, and logically-ANDs these with dark elements of the payload signal, to thereby identify locations in a sparse signal block at which marks should be formed. A threshold value can establish which reference signal elements are dark enough to be considered, and this value can be varied to achieve a desired print density.

Still another arrangement employs a reference signal generated at a relatively higher resolution, and a payload signal generated at a relatively lower resolution. The latter signal has just two values (i.e., it is bitonal); the former signal has more values (i.e., it is multi-level, such as binary greyscale or comprised of floating point values). The payload signal is interpolated to the higher resolution of the reference signal, and in the process is converted from bitonal form to multi-level. The two signals are combined at the higher resolution, and a thresholding operation is applied to the result to identify locations of extreme (e.g., dark) values. Again, these locations are marked in a sparse block. The threshold level again establishes the print density of the resulting sparse mark.

Yet another arrangement again employs a reference signal generated at a relatively higher resolution, and a bitonal payload signal generated at a relatively lower resolution. A mapping is established between the two signals, so that each element of the payload signal is associated with four or more spatially-corresponding elements of the reference signal. For each element of the payload signal that is dark, the location of the darkest of the four-or-more spatially corresponding elements in the reference signal is identified. A mark is made at a corresponding location in the sparse block.

A further arrangement is based on a dense multi-level reference signal block. Elements of this signal are sorted by value, to identify the darkest elements each with a location. These darkest elements are paired. One element is selected from each pairing in accordance with bits of the payload. Locations in the sparse block, corresponding to locations of the selected dark elements, are marked to form the sparse signal.

Arrangements that operate on composite codes can further include weighting the reference and payload signals in ratios different than 1:1, to achieve particular visibility or robustness goals.

Each of these arrangements can further include the act of applying a spacing constraint to candidate marks within the sparse block, to prevent clumping of marks. The spacing constraint may take the form of a keep-out zone that is circular, elliptical, or of other (e.g., irregular) shape. The keep-out zone may have two, or more, or less, axes of symmetry (or none). Enforcement of the spacing constraint can employ an associated data structure having one element for each location in the sparse block. As dark marks are added to the sparse block, corresponding data is stored in the data structure identifying locations that—due to the spacing constraint—are no longer available for possible marking.

In each of these arrangements, the reference signal can be tailored to have a non-random appearance, by varying the relative amplitudes of spatial frequency peaks, so that they are not all of equal amplitude. Such variation of the reference signal appearance has consequent effects on the sparse signal appearance.

These arrangements can also include the act of applying a non-linear filter to a multi-level code (e.g., the original dense code) to identify locations at which forming a mark in the sparse block most effectively gives expression to information represented by unprinted sparse elements. These locations are then given priority in selecting locations at which to make marks in the sparse block.

The just-reviewed arrangements are more fully detailed elsewhere in this disclosure.

A means for forming a sparse code from a dense code can employ any of the hardware arrangements detailed herein (i.e., in the discussion entitled Operating Environment), configured to perform any of the detailed algorithms.

This specification has discussed several different embodiments. It should be understood that the methods, elements and concepts detailed in connection with one embodiment can be combined with the methods, elements and concepts detailed in connection with other embodiments. While some such arrangements have been particularly described, some have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect.

Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc. To give but a single example, in the embodiments described as combining the payload and reference signals in a weighted arrangement other than 1:1, a weighting of 1:1 can alternatively be used.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of Applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

The methods, processes, and systems described above may be implemented in hardware, software or a combination of hardware and software. For example, the signal processing operations for generating and reading optical codes are implemented as instructions stored in a memory and executed in a programmable computer (including both software and firmware instructions). Alternatively the operations are implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device).

To provide a comprehensive disclosure, while complying with the Patent Act's requirement of conciseness, Applicant incorporates-by-reference each of the documents referenced herein. (Such materials are incorporated in their entireties, even if cited above in connection with specific of their teachings.) These references disclose technologies and teachings that Applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the invention. Rather, Applicant claims as the invention all such modifications as may come within the scope and spirit of the following claims and equivalents thereof.

The invention claimed is:

1. A method comprising:
    (a) obtaining a 2D payload signal comprising an M×M array of first elements, each having a first or a second value;
    (b) obtaining a 2D reference signal comprising an N×N array of second elements, said second elements being multi-valued, where N>M; and
    (c) a step for generating a sparse 2D output signal block comprising an array of N×N third elements from the 2D payload signal and the 2D reference signal, each of said third elements having the first or second values, said generated signal being sparse due to less than half of the N×N third elements having said first value, said step including interpolating the M×M array of first elements of the 2D payload signal to yield an N×N payload signal, said interpolating also changing the payload signal from M×M binary elements to N×N multi-valued elements.

2. The method of claim 1 in which act (b) comprises summing plural 2D sinusoids of different frequencies and phases, and sampling a result at N×N points to achieve an N×N array of element values.

3. The method of claim 1 in which act (b) comprises summing plural 2D sinusoids of different amplitudes, frequencies and phases, and sampling a result at N×N points to achieve an N×N array of element values.

4. The method of claim 1 in which step (c) further comprises:
    combining the N×N reference signal and the interpolated N×N payload signal to yield a composite code block comprised of N×N multi-valued elements; and
    a step for selecting locations to mark in the sparse N×N output signal block, based on values of elements in the N×N composite code block.

5. The method of claim 4 in which the combining act comprises combining the N×N reference signal and the interpolated N×N payload signal in a weighted ratio to yield the composite code block comprised of N×N multi-valued elements, said ratio being other than 1:1.

6. The method of claim 4 in which the step for selecting locations comprises identifying locations in the N×N composite code block that have element values below a threshold value, and using said locations, or a subset of said locations, as locations to mark in the sparse N×N output signal block.

7. The method of claim 4 in which the step for selecting comprises:
    identifying a first element in the composite code block having an element value below a threshold value;
    evaluating said first element against data stored in a memory, to determine whether a location of the first element is within a keep-out zone, said zone establishing a distance from, or a region adjoining, a graphic element within which marking is to be avoided;
    determining that the first element is not within a keep-out zone, and forming a mark in the sparse output signal block corresponding to the location of said first element within the N×N composite code block;
    identifying a second element in the composite code block having an element value below a threshold value;
    evaluating said second element against data stored in the memory, to determine whether location of the second element is within a keep-out zone; and
    determining that the second element is within a keep-out zone, and not forming a mark corresponding thereto in the sparse output signal block.

8. A system comprising:
    a memory storing a 2D reference signal block comprising an array of N×N elements, each element having a value and an associated location within the N×N block, the elements in the reference signal block being multi-valued;
    a memory storing a 2D payload signal block comprising an array of M×M binary elements each having first or second values, and each having an associated location within the M×M payload signal block, where M<N; and means for producing a sparse output signal block of N×N binary elements from said reference signal block and said payload signal block, said output signal being sparse due to less than half of said N×N element binary elements having a first value, said producing includes interpolating the M×M array of first elements of the 2D payload signal to yield an N×N payload signal, said interpolating also changing the payload signal from M×M binary elements to N×N multi-valued elements.

9. The system of claim 8 in which said means comprises a hardware processor configured by software instructions to perform acts including:
    interpolating the M×M payload signal block to yield an N×N signal block, said interpolating also changing the elements of the payload signal block from binary elements to multi-valued elements;
    combining the N×N reference signal block and the interpolated N×N payload signal block in a weighted ratio to yield a composite code block comprised of N×N multi-valued elements, said ratio being other than 1:1; and
    selecting locations to mark in the sparse N×N output signal block, based on values of elements in the N×N composite code block.

10. The system of claim 9 in which the selecting act performed by the configured hardware processor includes:
    identifying a first element in the composite code block having an element value below a threshold value;
    evaluating said first element against data stored in a memory, to determine whether location of the first element is within a keep-out zone, said zone establishing a distance from, or a region adjoining, a graphic element within which marking is to be avoided;
    determining that the first element is not within a keep-out zone, and forming a mark in the sparse output signal block corresponding to the location of said first element within the N×N composite code;
    identifying a second element in the composite code block having an element value below a threshold value;
    evaluating said second element against data stored in the memory, to determine whether location of the second element is within a keep-out zone; and
    determining that the second element is within a keep-out zone, and not forming a mark corresponding thereto in the sparse output signal block.

11. The system of claim 9 in which said means further comprises a thermal printer configured to print adhesive labels including excerpts from at least two edge-adjoining signal blocks.

12. A method of producing a bitonal 2D optical code output signal block that allows for variable spatial density of marked elements, the 2D optical code output signal comprising a 2D array of element locations, each location having a binary mark or not, wherein less than 50% of the locations have marks, the code including a reference signal component and a payload signal component, the reference signal component having a structure that enables geometric synchronization of the optical code when depicted within camera-captured imagery, the method comprising:
    taking, as inputs, (a) a 2D payload signal block and (b) a 2D reference signal block, the 2D payload signal block comprising an array of M×M binary elements each having first or second values, and each having an associated location within the M×M payload signal block, the 2D reference signal block comprising an array of N×N elements where N>M, each element having a value and an associated location within the N×N block, the elements in the reference signal block being multi-valued;
    interpolating the M×M payload signal block to yield an N×N signal block, said interpolating also changing the elements of the payload signal block from M×M binary elements to N×N multi-valued elements;
    combining the N×N reference signal block and the interpolated N×N payload signal block to yield a composite code block comprised of N×N multi-valued elements;
    sorting elements in the N×N composite code block by value, yielding a sorted list of corresponding element locations; and
    stepping through the list, placing marks at said corresponding locations within an N×N output signal block, until a desired spatial density of marked elements is achieved;
    wherein a variable spatial density of marked elements is achieved by selecting a smaller or larger number of locations to mark in the N×N output signal block.

13. The method of claim 12 in which said act of placing marks comprises stepping through the list and placing marks at said corresponding locations within an N×N output signal block for which there is no mark already within a distance of K elements in the N×N output signal block, until said desired spatial density of marked elements is achieved.

14. The method of claim 12 in which the combining act comprises combining the N×N reference signal block and the interpolated N×N payload signal block in a weighted ratio to yield said composite code block comprised of N×N multi-valued elements, said ratio having been established in accordance with a desired weighting between the reference and payload signal components.

15. The method of claim 12 that further comprises:
    identifying a first element in the sorted list of corresponding element locations;
    determining if the first element location is within a keep-out zone around a previously-placed mark, said zone establishing a distance from or a region adjoining a graphic element within which marking is to be avoided;
    determining that the first element is not within such a keep-out zone, and forming a mark in the output signal block at a location corresponding to the location of said first element within the N×N composite code;
    identifying a second element in the sorted list of corresponding element locations;
    determining if the second element location is within a keep-out zone around a previously-placed mark; and
    determining that the second element is within such a keep-out zone, and not forming a mark corresponding thereto in the output signal block.

16. The method of claim 12 that further includes:
    (i) sorting element values of the composite code block to identify a darkness ordering of the elements;
    (ii) providing a mark in the output signal block at a position corresponding to one of said sorted element values in said darkness ordering;
    (iii) for a next-darkest element in said ordering, checking to confirm that there is no mark already in the output signal block at a position within a distance of K elements of the location of said next-darkest element, and upon such confirmation, providing a mark in the output signal block at a position corresponding to said next-darkest element, and absent such confirmation providing no mark in the output signal block at a position corresponding to said next-darkest element; and (iv) repeating act (iii) with successive elements from said ordering of the darkest elements until a desired print density is achieved.

17. The method of claim 16 in which said weighted ratio is 1:0.7, and K=4.

18. The method of claim 12 that further comprises printing a label that includes said bitonal 2D optical code output signal block.

19. A printed label produced by the process of claim 18.

20. The method of claim 1 that further comprises printing a label that includes said sparse 2D signal.

21. A printed label produced by the process of claim 20.

22. The method of claim 7 in which the keep-out zone is elliptical in shape.

* * * * *